(12) United States Patent
Klein et al.

(10) Patent No.: US 10,095,809 B2
(45) Date of Patent: Oct. 9, 2018

(54) SYSTEMS AND METHODS FOR ASSISTING PERSONS IN STORING AND RETRIEVING INFORMATION IN AN INFORMATION STORAGE SYSTEM

(76) Inventors: Jonathan T. Klein, Concord, MA (US); Lee Weinstein, Arlington, MA (US)

(*) Notice: Subject to any disclaimer, the term of this patent is extended or adjusted under 35 U.S.C. 154(b) by 0 days.

(21) Appl. No.: 13/301,851

(22) Filed: Nov. 22, 2011

(65) Prior Publication Data
US 2012/0303629 A1 Nov. 29, 2012

Related U.S. Application Data

(63) Continuation of application No. PCT/US2010/036422, filed on May 27, 2010.

(60) Provisional application No. 61/217,091, filed on May 27, 2009.

(51) Int. Cl.
*G06F 17/30* (2006.01)
*G06F 9/451* (2018.01)

(52) U.S. Cl.
CPC ........ *G06F 17/30997* (2013.01); *G06F 9/453* (2018.02)

(58) Field of Classification Search
CPC ........... G06F 17/30997; G06F 17/2247; G06F 17/30327; G06F 17/30625; G06F 17/30088; G06F 17/30575; G06F 17/30525; G06F 17/30607; G06F 17/30994; G06F 3/0482; G06F 9/4446; G06F 9/453
USPC ................................................. 707/639, 741
See application file for complete search history.

(56) References Cited

U.S. PATENT DOCUMENTS

| | | | | |
|---|---|---|---|---|
| 4,752,889 A | * | 6/1988 | Rappaport et al. | 706/11 |
| 5,546,529 A | * | 8/1996 | Bowers et al. | 715/848 |
| 7,171,619 B1 | * | 1/2007 | Bianco | G06F 17/30997 |
| | | | | 707/999.007 |
| 7,506,258 B1 | * | 3/2009 | Molander | H04L 41/12 |
| | | | | 709/223 |
| 8,341,176 B1 | * | 12/2012 | Rabsatt | G06Q 30/0603 |
| | | | | 707/767 |
| 2004/0019611 A1 | | 1/2004 | Pearse et al. | |
| 2004/0143590 A1 | * | 7/2004 | Wong | G06F 17/30997 |
| 2004/0177319 A1 | * | 9/2004 | Horn | G06F 17/3002 |
| | | | | 715/205 |

(Continued)

OTHER PUBLICATIONS

Piltz, Anders. The world of medieval learning. Jan. 1, 1981. Blackwell. Revised edition.*

(Continued)

*Primary Examiner* — Evan Aspinwall
(74) *Attorney, Agent, or Firm* — Lee Weinstein

(57) ABSTRACT

A system is disclosed for assisting users in storing and retrieving information in an information storage system. The system includes selection means for permitting a user to choose selected information to be stored; convening means for convening a tagging tribunal, the tagging tribunal providing a graphical aggregation of available tags and information nuggets that may be selected by a user to create an association between at least one selected tag or information nugget and the selected information based on the user's decision to create such an association; and linking means for creating an associative link between the at least one selected tag or information nugget and the selected information, the associative link being part of an associative network.

5 Claims, 30 Drawing Sheets

(56) References Cited

U.S. PATENT DOCUMENTS

| | | | |
|---|---|---|---|
| 2005/0289459 A1 | 12/2005 | Walton | |
| 2006/0101005 A1* | 5/2006 | Yang et al. | 707/3 |
| 2007/0088741 A1* | 4/2007 | Brooks | G06F 8/68 |
| 2007/0198611 A1* | 8/2007 | Prahlad | G06F 17/30528 |
| 2008/0208819 A1* | 8/2008 | Wang et al. | 707/3 |
| 2008/0243908 A1* | 10/2008 | Aasman | G06F 17/30241 |
| 2008/0306921 A1 | 12/2008 | Rothmuller et al. | |
| 2009/0006543 A1* | 1/2009 | Smit | 709/203 |
| 2009/0119572 A1* | 5/2009 | Koivunen | 715/206 |
| 2009/0119576 A1* | 5/2009 | Pepper | G06F 17/30525 715/230 |
| 2010/0054601 A1* | 3/2010 | Anbalagan et al. | 382/180 |
| 2010/0083173 A1* | 4/2010 | Germann | G06F 17/3012 715/810 |

OTHER PUBLICATIONS

International Preliminary Report on Patentability issued in connection with the corresponding PCT Application No. PCT/US2010/36422, dated Dec. 8, 2011.
International Search Report and Written Opinion dated Dec. 24, 2010 in connection with International Patent Application No. PCT/US2010/036422, 10 pages.
Covarrubias, Miguel, "The tree of modern art", Vanity Fair, vol. 40, No. 3, 1933, p. 36.
Barr, Alfred, "Cubism and Abstract Art", Museum of Modern Art, New York, 1936.
Pousette-Dart, Nathaniel, "A Tree of Contemporary American Art", Art and Artistes of Today, 1938.
Reinhardt, Ad, "How to Look at Modern Art in America", PM, Jun. 2, 1946.
Reinhardt, Ad, "How to look at Modern Art in America", ARTnews, vol. 60, No. 4, 1961, pp. 36-37.
Reinhardt, Ad, "The Races of Mankind", 1943.
Reinhardt, Ad, "The Rescue of Art, or a Timeless Political Cartoon", Newsweek, Aug. 12, 1946.
Reinhardt, Ad, "How to Look at Art-Talk", PM, Jun. 9, 1946.
Reinhardt, Ad, "How to Look at a Good Idea", PM, Aug. 4, 1946.
Reinhardt, Ad, "How to Look at Creation, How to look at 3 Current Shows and How to look at a Theme", PM Dec. 15, 1946.
Reinhardt, Ad, Cartoon, circa 1946.
Acrylic, Black, "Ad Reinhardt-Cartoons", Nov. 7, 2013, http://0black0acrylic.blogspot.com/2013/11/ad-reinhardt-cartoons.html, 7 pages.
Pfeifer, Hilary, "How to looks at Modern Art in America", Jul. 6, 2008, http://hilarypfeifer.blogspot.com/2008/07/how-to-look-at-modern-art-in-america.html, 3 pages.
Poundstone, William, "The Tree of Art", Feb. 13, 2012, http://blogs.artinfo.com/lacmonfire/tag/nathaniel-pousette-dart/, 1 page.
Dawson, Jessica, "Canvases to Cartoons: Interview with Rob Storr" Dec. 3, 2013. http://www.artinamericamagazine.com/news-features/interviews/ad-reinhardt-from-canvases-to-cartoons-interview-with-rob-storr-/, 1 page.
Ward, Shelly, "Media Role Models, ver. 2", and Information Card. 2009, 2 pages.
Snider, Grant, "The Treehouse of Adulthood", Dec. 2010, http://www.incidentalcomics.com/2009_12_01_archive.html, 3 pages.
Bush, V., "As We May Think," Atlantic Monthly, Jul. 1945. http://www.theatlantic.com/magazine/archive/1945/07/as-we-may-think/303881/.
Oleksik, G., et al., "Lightweight Tagging Expands Information and Activity Management Practices," Proceedings of the ACM CHI 2009 Conference on Human Factors in Computing Systems, Apr. 4-9, 2009, Boston, MA.

\* cited by examiner

1. Add an element of interest to a *BrainTree* you are building.
1. Work or play as you normally do on your device -- for example, your computer smartphone or netbook.

2. In the course of your work or play, you come across material that interests you in any application. It *fits* into your world view, and you decide it would be good to represent that item in a permanent way in a representation of your world view called a *BrainTree*

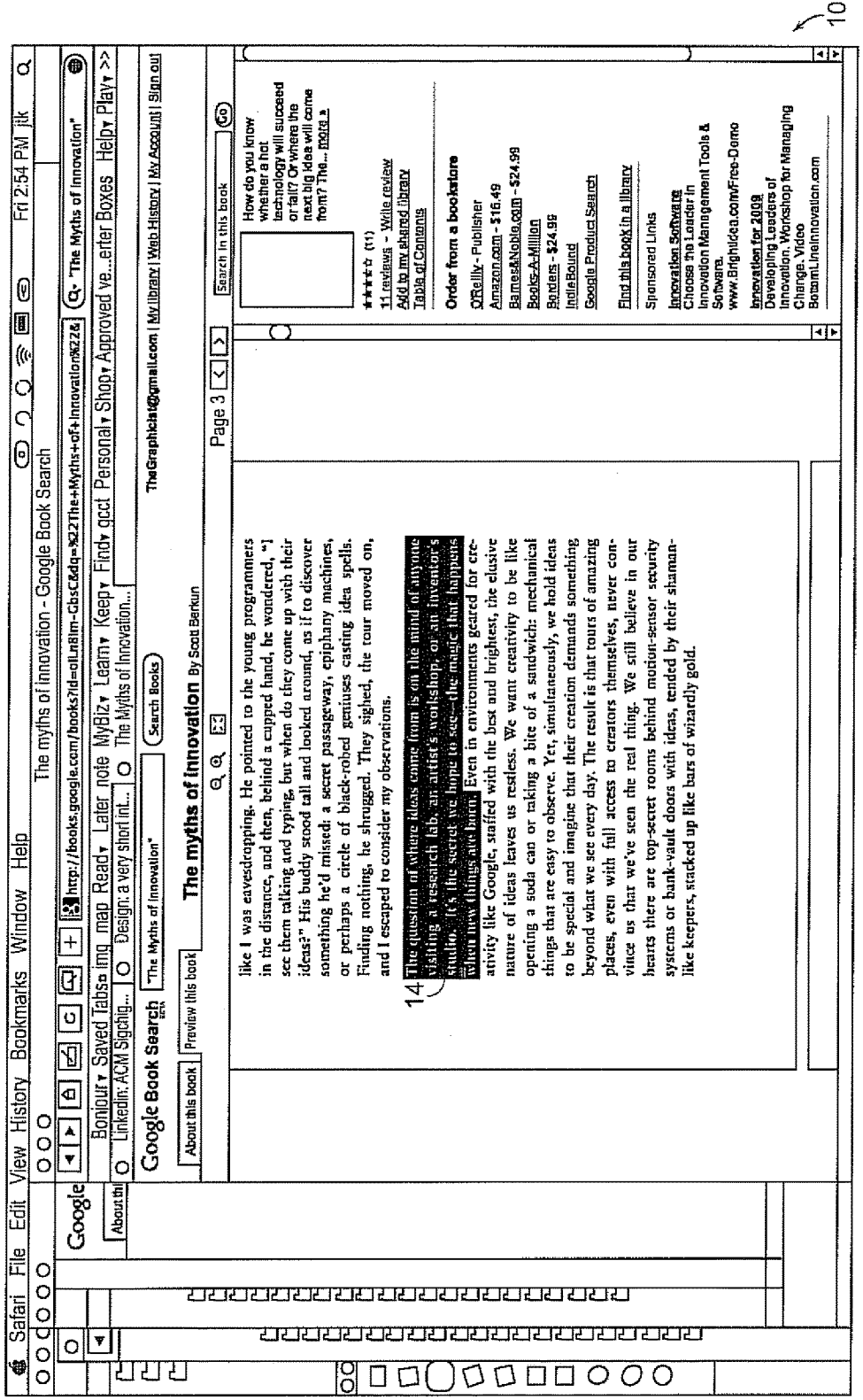
FIG. 1D  Hold down Option + Spacebar to *call a BrainTree Tribunal*. The highlighted material becomes centered in the screen.

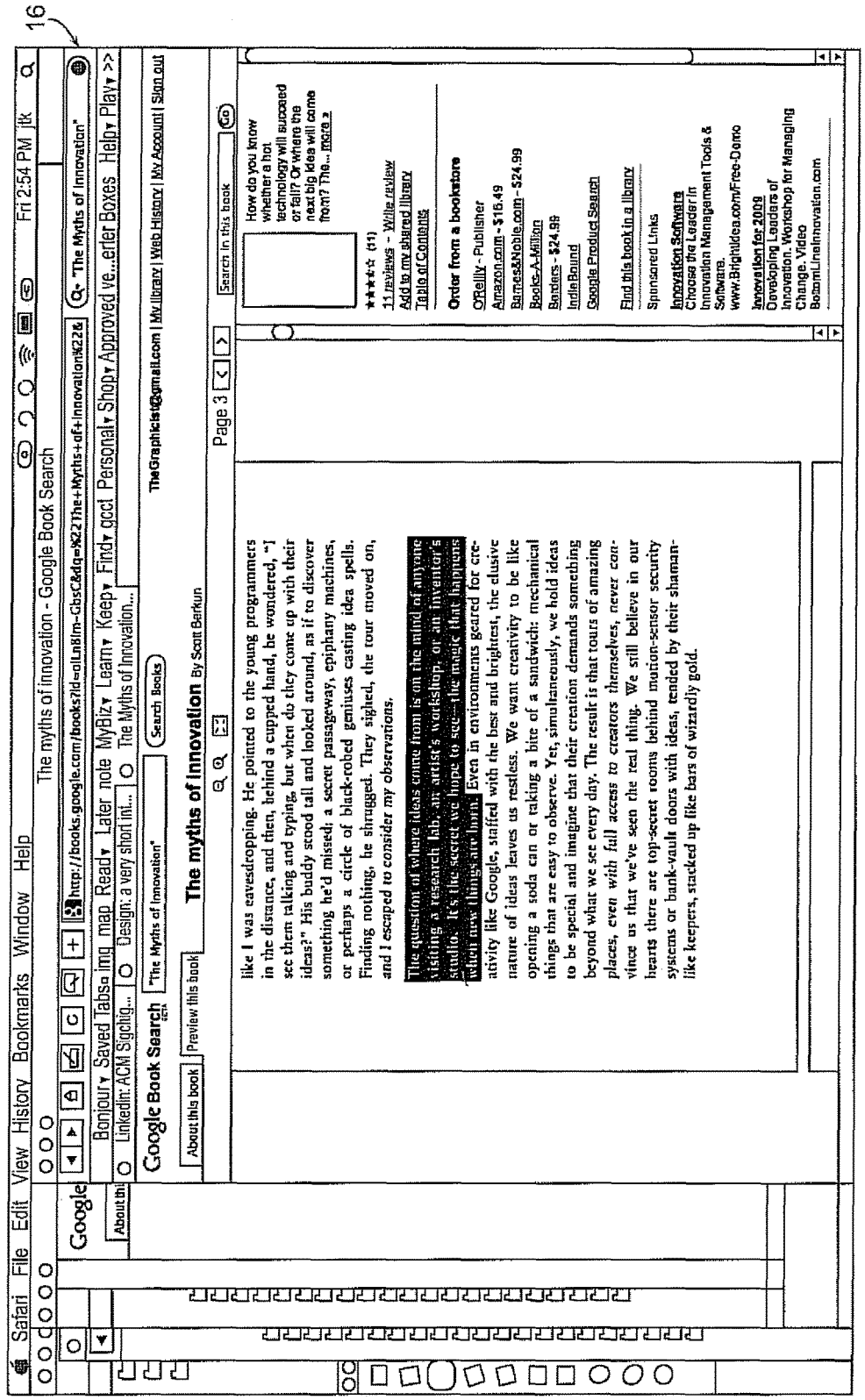
FIG. 2A  Hold down Option + Spacebar to *call a BrainTree Tribunal*. The highlighted material becomes centered in the screen.

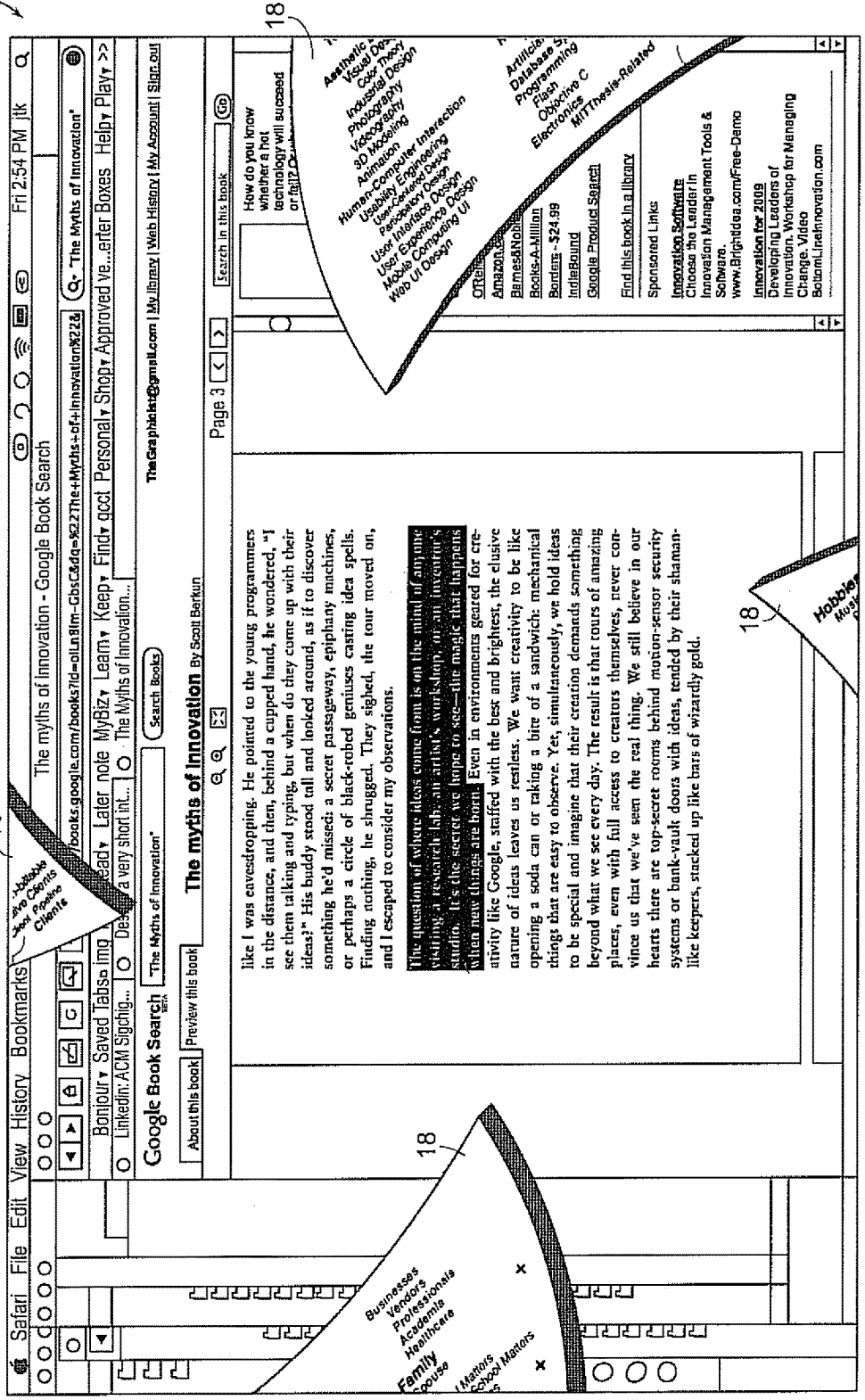
FIG. 2B  Hold down Option + Spacebar, the Tribunal swiftly animates like a camera shutter to fill the space around the item of interest (0.1 seconds after initial hold).

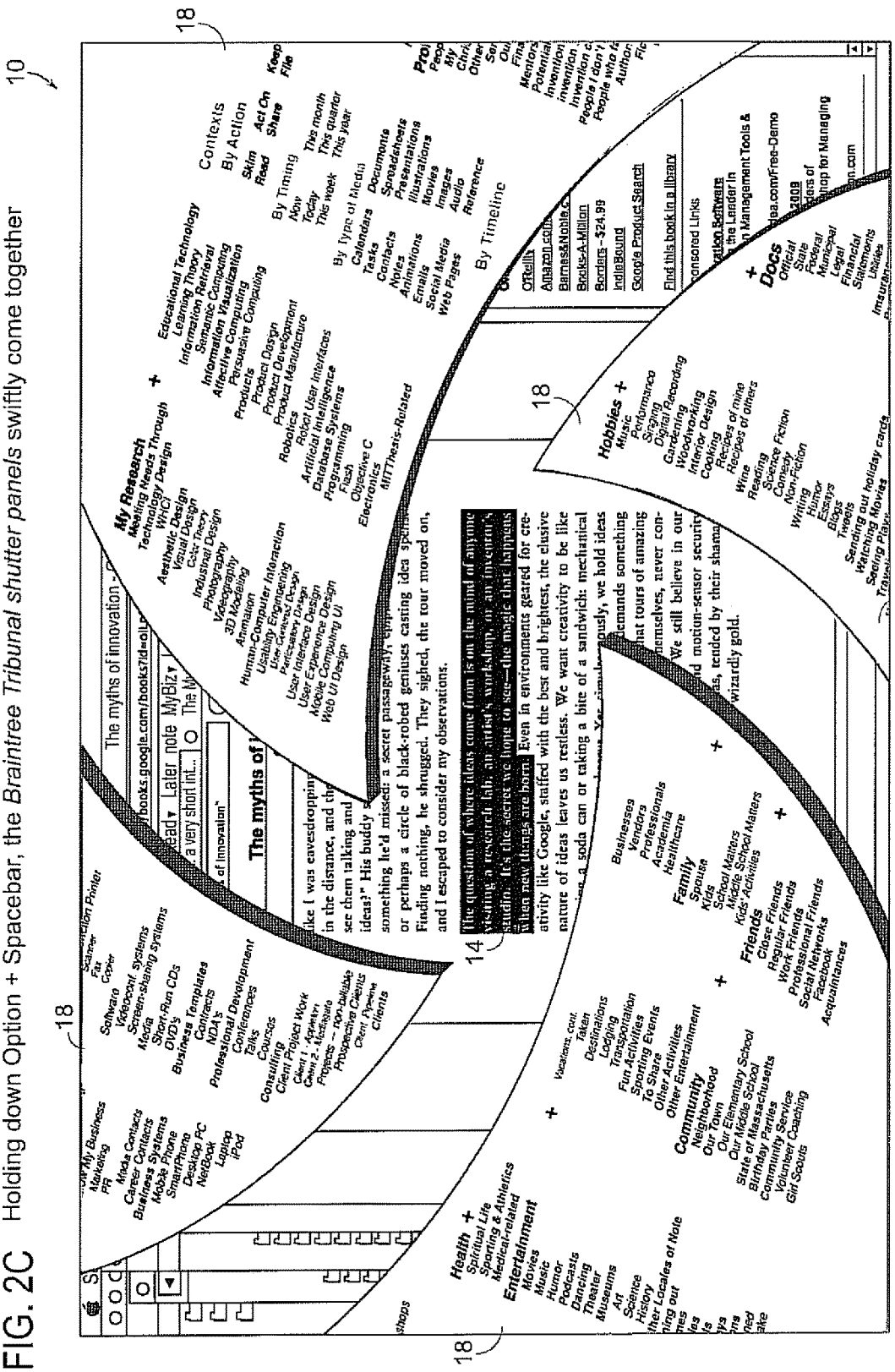
FIG. 2C  Holding down Option + Spacebar, the *Braintree Tribunal* shutter panels swiftly come together

SYSTEMS AND METHODS FOR ASSISTING PERSONS IN STORING AND RETRIEVING INFORMATION IN AN INFORMATION STORAGE SYSTEM

PRIORITY

This application is a continuation application of PCT/US2010/036422 which claims priority to U.S. Provisional Patent Application Ser. No. 61/217,091 filed May 27, 2009, the disclosure of which is hereby incorporated by reference in its entirety.

FIELD OF THE INVENTION

The field of the invention generally relates to information processing systems, and relates in particular to systems that include information storage, information management, information visualization, information retrieval, personal information management, knowledge management, graphical user interfaces, tagging interfaces, three-dimensional interfaces, semantic computing, semantic web, cloud computing, personal computing, mobile devices, and tablet computing.

BACKGROUND

As the accumulated knowledge of humankind continues to grow, and the ease of access to information rapidly increases as it has with the advent of the personal computer (PC), the world-wide web and search engines such as the Google® search engine operated by Google, Inc. of Mountain View, Calif., it is common for people to encounter large amounts of information and data that they may wish to store and access later. This information may be in the form of data (such as numerical information or a document containing such information; a calendar and/or its events; a to do list and/or its tasks; or a contact list and/or its constituent contacts), textual form, graphical form (such as photographs, illustrations, or diagrams), audio form (such as music, audio books, podcasts or recorded teleconferences or lectures), video form, or some multi-media combination of these forms (such as a presentation or a mixed-media web page), or other type of document or group of documents.

As the need has grown for users to quickly and easily store, organize, and retrieve information, various methods and tools have become available to facilitate different types of information storage and retrieval. When web browsers such as the Netscape web browser operated by Netscape Communications Corporation of Mountain View, Calif. and the Internet Explorer web browser operated by Microsoft Corporation of Redmond Wash. first became available, they had a feature that enabled users to bookmark web pages which were of interest, and to which the user might want to return later. Bookmarks could be organized into folders to make it easier to find bookmarks later, but many users have found the process of organizing bookmarks into folders too time-consuming for all but their most frequently used bookmarks and/or generated a huge general folder full of bookmarks.

Once a user has built up hundreds of bookmarks, it can be challenging to locate a relevant bookmark after it has been saved. Even early versions of browsers generally allowed people to search bookmarks for a word or phrase, and this search capability provides an alternate way to locate a bookmark in a large collection of bookmarks. Unfortunately, to benefit from this method of locating a bookmark, the title of the bookmark needs to contain the word or phrase that is to be searched. Many people don't want to edit the title of a bookmark to include all the keywords they might use for a search to find the bookmark later, so modern browsers also include a separate keyword field for each bookmark in addition to the title field. These keywords have come to be known as tags. This browser feature allows users to type such tags in the form of words and phrases (separated by commas) into the tag field at the time of bookmarking a page, and search on these tags later when wanting to find a bookmark. This additional capability of tagging bookmarks has brought a slight advance in the searchability of bookmarks, but many people still find this interface (and the tagging process itself) cumbersome and time consuming. Thus, users tend not to take the time to type in tags when bookmarking. There is a need for a more natural and easier-to-use way to tag bookmarks in browsers.

In recent years, various note taking software has become available which facilitates storing many types of media in one big bucket (such as a single file or database), where each piece of information stored in the bucket may be text or graphical. The Evernote® database sold by Parascript, LLC of Boulder, Colo. lets users capture notes, images, audio files, links, and web pages in a completely freeform database. Users can tag each entry, organize items into notebooks, and search for tags or text. Users can even search for text that appears in images. Like the bookmarking feature of modern browsers, the Evernote® database offers users the option of typing tags into a dedicated field associated with each item of information to be stored, to ease the process of searching for the stored item later. There are several problems however, with users typing in their own tags. One problem is that this process places a high cognitive load on the user: It requires a great deal of mental energy and time from the user to do properly. For example, the process demands that the user try to quickly bring to mind all the ways a piece of information could or should be tagged, including various ways the user (or others) may eventually seek the information when searching for it later. And, while some desired tags may come to mind easily, others may not. Furthermore, it takes time to think up a list of tags that might prove useful later, and depending on the user's state of mind, the list of tags that come to mind may vary from quite comprehensive to substantially less comprehensive. Another problem is errors: one could easily mistype a tag while saving information, and then be unable to find the stored information by searching on the properly typed tag. As a result of these issues, few people end up using the tagging capability of modern browsers. There is a need for innovative methods that provide rapid tagging capabilities that are less error-prone, and aid users in bringing to mind a comprehensive set of appropriate tags.

In recent years, note-taking software that integrates with web browsers has become available. This software allows users to highlight portions of web pages (including both text and graphics) that are of interest, and save the material of interest to the user's PC hard drive or to a server on the web. One such piece of software had been sold under the trademark iLighter™; when a user highlights and saves material from the web using the iLighter™ software, text notes (which may include tags) may be saved along with the information of interest. When saved information is subsequently recalled, the iLighter™ software allowed the user to expand the displayed material to include the entire web page from which the material of interest was originally taken. The tagging features of the iLighter™ software suffered from the same limitations as the tagging features of modern browsers, in that the user must think up and type in the tags when saving the material of interest.

Tagging is also a current area of research in the field of Semantic Computing at the University of California at Berkeley, which addresses the derivation and matching of the semantics of computational content to that of naturally expressed user intentions in order to retrieve, manage, manipulate or even create content, where content may be any material including video, audio, text, processes, services, hardware and networks. In a paper entitled "Lightweight Tagging Expands Information and Activity Management Practices" (Proceedings of the ACM CHI 2009 Conference on Human Factors in Computing Systems, April 2009, by Gerard Oleksik, Max L. Wilson, Craig Tashman, Eduarda Mendes Rodrigues, Gabriella Kazai, Gavin Smyth, Natasa Milic-Frayling, and Rachel Jones) experiments are disclosed to have been done with software called TAGtivity™, which allows users to tag files by dragging them and dropping them on the TAGtivity icon, and also allows users to tag web pages within a web browser, through a TAGtivity menu. TAGtivity expands on modern browsers' tagging function, by allowing users to either type in tags, or choose from a menu of existing tags, which can be sorted either alphabetically or by frequency of use.

Although later retrieval of stored information is aided by tagging systems such as the bookmark-tagging feature of modern web browsers such as Firefox 3, tagging software such as TAGtivity, and the tagging features of note-taking software such as Evernote, these tagging systems do not aid users in browsing stored information. If users take the time to store bookmarks in folders or to store notes and other information in a database, the folder structure or database structure allow for browsing, but today's tagged information storage systems do not easily facilitate browsing. There is a need for innovative associative linking systems that not only provide the search and retrieval capabilities of modern tagged information storage systems, but that also provide browsing capabilities.

Associative linking may be defined as a means of associating two or more information elements with one another by means of pointer-style links made between graphical or textual representations of such elements on a computer or other device screen using a pointing device, keyboard and/or other means. Associative linking should not be confused with hypertext linking, as the latter implies direct transportation from one page of information to another, or from one region on a web page to an area on another web page. Nor should associative linking be confused with creating aliases, since an alias is simply a textual or iconic element that points to a file or application. By contrast, associative linking enables relationships to be made between multiple information elements. These multiple, associated information elements or data elements may then be aggregated and represented in proximity to the original data or information element, displaying their association with the original data or information element. Associative linking also implies multiple means of visualization to view the associated data or information elements in different ways, depending on the task and the nature of the user. Associative linking more closely resembles the way humans remember information (associatively, or through association with other ideas as well as association with people, places, events, emotions, and other external and internal stimuli) than do existing indexing or computer storage systems. Thus, associative linking provides a framework for enabling users to recall information from their memory with a higher degree of accuracy and speed.

The associative nature of human memory explains why, for example, a graphical user interface that contains windows, icons, menus and pointers (such as the Apple Mac OS or Microsoft Windows) has been shown to be easier to learn and use than command-line interfaces (such as Microsoft DOS or traditional UNIX). Put simply, in a command-line interface, the user must recall all the commands (directions) to give to the computer by memory. In contrast, a graphical user interface with menus enables users to recognize the commands instead of recall them. This difference of between recognition and recall has been shown to place a much lower cognitive demand on the user, thus reducing the time and rote memorization it takes to learn to use the computer system. But beyond rudimentary support for recognition instead of recall, modern graphical user interfaces offer little support for the fact that human memory is fundamentally associative in nature.

Users may sometimes try to make use of the associative nature of their memory, despite the paucity of support for it in modern computer systems. For example, the modern graphical user interfaces of Microsoft Windows, Apple Macintosh and other operating systems enable users to create and name folders for their files, represented either textually or iconically, name their files, and place their files in the folders. If users are careful to label their files and folders clearly, they may use the structure and naming conventions they set up to assist them in tracking down older files they seek. Too often, however, files and folders are not labeled clearly enough to withstand the fading nature of memory, the aggregate nature of multiple drafts, and the accretive process of more and more files and folders confusing the very users that constructed these data storage structures in the first place. The result is often time spent, unsuccessfully searching these data structures over and over for a file that eludes the user.

In recent years, the producers of modern operating systems and others have grown to appreciate the difficulty users have in tracking down their own files. Apple Computer, Inc. of Cupertino, Calif. released the Spotlight™ search feature for its Mac OS, Microsoft Corporation of Redmond, Wash. followed with enhanced search of its own, and Google, Inc. released Google Desktop, a search engine dedicated to finding files on one's own machine. These desktop search systems are capable of searching for words or phrases within files, and not just for names of files. Such systems provide some relief for users, but not nearly enough, since users of these systems are still limited by the same issues that have hampered users searching for bookmarks on their web browsers: They require the user to remember details of files that they barely remember in the first place. Meanwhile, users may continue to remember many different kinds of details about the files, such as where and when they encountered them, with whom they were discussed, etc. There is a need for innovative technologies that facilitate users finding things they have saved, faster and with greater ease than is facilitated by the state of the art in information retrieval.

In recent years, Apple Computer, Inc.'s free iTunes desktop software application has enabled its users to maintain a library of digital music files that feature some aspects of associative linking. Users of iTunes can create and name one or more playlists that are lists of audio files that the user may wish to play for various different occasions. Users of iTunes can, for example, specify a list of songs to be played while exercising, another list to be played while studying, and yet another list to be played at parties. Playlists may be created to match a mood, or showcase a favorite artist or composer, or provide background music for any imaginable occasion.

Songs in an iTunes library can belong to multiple playlists, yet remain browsable in the application's master Library. It should be noted that the act of creating or editing playlists is often considered by users to be a form of entertainment in and of itself. It's an act of self-expression in that it is creative to mix and match music together. Song names within a playlist may also be browsed in iTunes by selecting the name of a playlist, which displays the list of songs contained in that playlist. Song titles in iTunes may be seen in multiple contexts, viewed by artist, by album, by date released, or by a whole host of other criteria.

iTunes playlists provide a limited kind of support for associative linking, by enabling a user to find a song based on many user-specified criteria that may involve the user's emotions, such as its context in belonging to one or more playlists specified by the user. Still, when a user is trying to find a particular song, iTunes fails to provide direct support for associative linking by failing to help users who might not remember other details about the song, but remember the person they were with when they heard it, for example, or the location they were in when they were listening to it, or the time of day it was when they heard it, etc. Further, while Apple and others have worked to incorporate elements of iTunes into other applications (such as being able to browse files in the Macintosh operating system using iTunes' Cover Flow, for example), data silos remain, e.g., audio files remain with other audio files, pictures with other pictures, contacts stay in their contact lists, and so on. Associative linking between these data silos remains absent, the walls between data silos stay up, and users have more difficulty than ever finding what they are looking for.

Scientists and engineers have been unable to fully address these basic issues of information retrieval, even though the need has long been recognized. See *As We May Think*, by Vannevar Bush, *Atlantic Monthly*, July 1945 (discussing the challenges inherent in retrieving information from an indexing system while the human mind "operates by association").

Today's relational databases are an advance over the single-index model in use in Vannevar Bush's time. The relational database structure enables users to perform searches based on a wide variety of fields, and even perform searches using Boolean operators. A modern address book software program, for example, may be searched for a name, address, city, state, zip code, phone number, or email address. Still, there is currently no method to easily browse through pictures associated with addresses or cities, or to browse through a list of wines associated with the friends and relatives with whom the user tasted them.

There remains a need, therefore, for systems and methods for a cohesive scalable technique for users of an information system to easily browse their information.

SUMMARY

It is an object of the present invention to provide a tool for easily and rapidly storing information in an intuitive, user-defined, associative manner. It is a further object of the present invention to facilitate rapid user tagging of information being stored. It is a further object of the present invention to facilitate the tagging of information which is to be stored, in a way that minimizes tag errors and leads to a more comprehensive set of tags being used than would likely be used if all tags had to be thought up and typed in each time by the user. It is a further object of the present invention to facilitate the rapid retrieval of user-stored information through a taxonomy that is user-defined and thus intuitive to the user. It is an object of the present invention to provide an associative linking system that not only provides the search and retrieval capabilities of modern tagged information storage systems, but that also provides browsing capabilities. It is a further object of the present invention to enable users to quickly and easily display and refine meaningful, persistent visual representations of their information, using multiple visualization techniques to support this goal.

In accordance with an embodiment, the invention provides a system for assisting users in storing and retrieving information in an information storage system. The system includes selection means for permitting a user to choose selected information to be stored; convening means for convening a tagging tribunal, the tagging tribunal providing a graphical aggregation of available tags and information nuggets that may be selected by a user to create an association between at least one selected tag or information nugget and the selected information based on the user's decision to create such an association; and linking means for creating an associative link between the at least one selected tag or information nugget and the selected information, the associative link being part of an associative network.

In accordance with various embodiments, the tagging tribunal includes available tags that represent leaf information, twig information that includes a plurality of sets of leaf information, branch information that includes a plurality of sets of twig information, limb information that includes a plurality of sets of branch information, trunk information that includes a plurality of sets of limb information; and forest information that includes a plurality of sets of trunk information. In accordance with further embodiments, the system further includes viewing means that permits a user to visually view the leaf information, the twig information, the branch information, the limb information, the trunk information and the forest information at the same time, and/or to change a view as seen by the user of the leaf information, the branch information, the limb information, the trunk information and the forest information.

In accordance with another embodiment, the invention provides a method of assisting users in storing and retrieving information in an information storage system. The method includes the steps of permitting a user to select selected information to be stored; convening a tagging tribunal, said tagging tribunal providing a graphical aggregation of available tags and information nuggets that may be selected by a user to create an association between the at least one selected tag or information nugget and the selected information based on the user's decision to create such an association; and creating an associative link between the at least one selected tag or information nugget and the selected information, said associative link being part of an associative network.

BRIEF DESCRIPTION OF THE DRAWINGS

The following description may be further understood with reference to the accompanying drawings in which:

FIGS. 1A, 1B, 1C, and 1D are illustrative diagrammatic screen-capture depictions of a user display interface while a user browses a document and highlights a section to be tagged in a system in accordance with an embodiment of the present invention;

FIGS. 2A, 2B, and 2C, (as well as FIG. 3A), are illustrative diagrammatic shutter-like time-sequenced screen-capture depictions of a user display interface during a process of convening of a tagging tribunal in a system in accordance with an embodiment of the present invention;

FIG. 3A shows how the screen looks before anything is tagged while FIG. 3B depicts the same tagging tribunal once the user has selected tags, and features an additional capability;

Figure 1A:
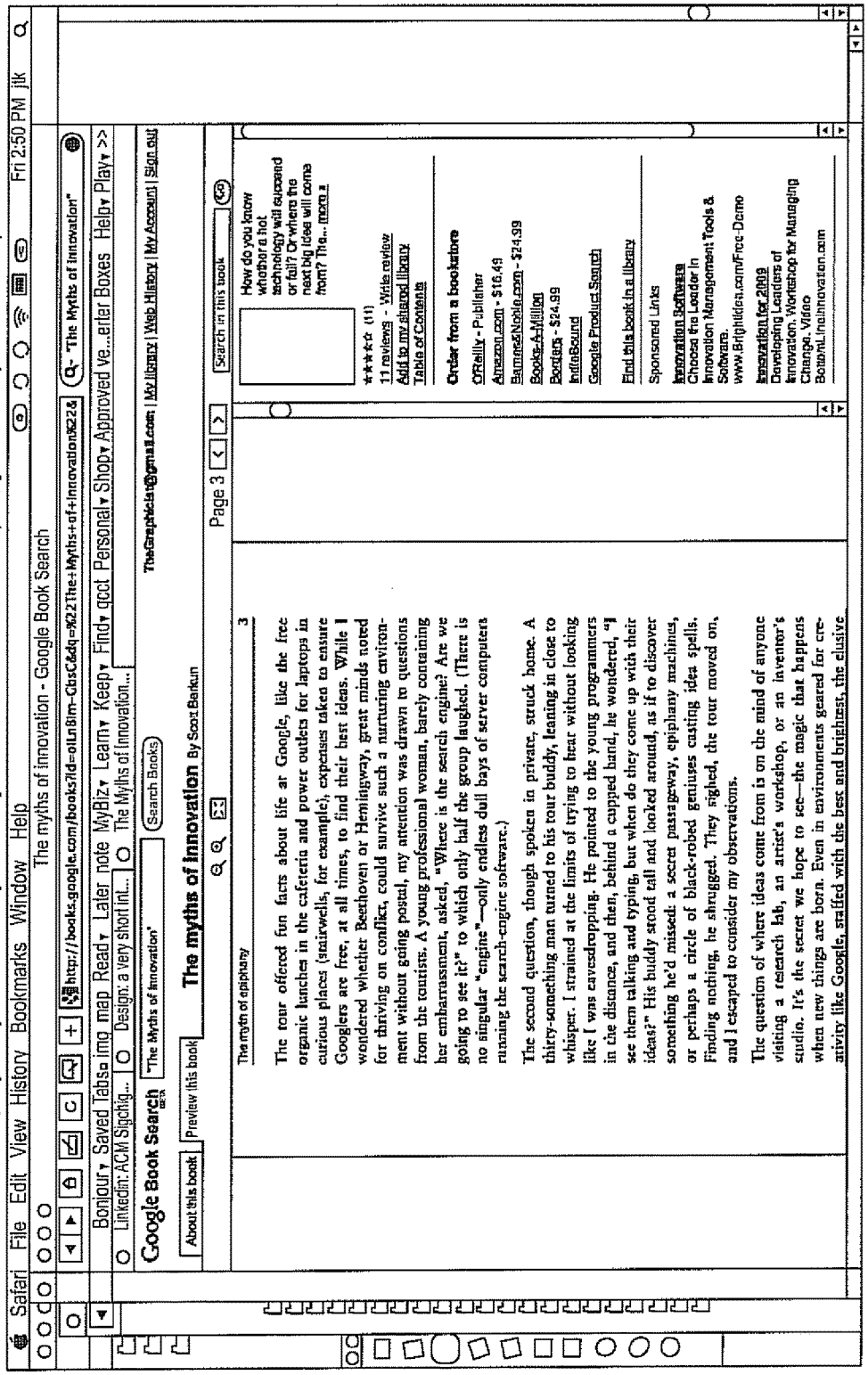

The drawings are shown for illustrative purposes only.

DETAILED DESCRIPTION

The present invention supports users in retrieving stored information quickly and easily through associative linking in accordance with various embodiments. Such a data and information storage system that supports associative linking respects the fact that human memory is associative and contextual in nature—that humans tend to remember information, people, events, dates and facts that are associated with the contexts in which they were first heard, with whom they were discussed, where they were found, etc. Thus the information, people, events, dates and facts relevant to the context of learning, discussion and/or development about a particular piece of information, may be employed to jog the memory of the user to recall a given nugget of information.

For example, a person may not remember the name of a book or its author, but that person can often tell you who they were with, or where they were when they first heard about it. Associative linking enables the user to capture such contextual information quickly and easily, enabling users to build a network of associations connected to their information and data that make it easier to find, easier to remember, and easier to build understanding.

Using systems and methods of the present invention, users may select information of interest as a tag for later retrieval. A unit of information to be tagged is defined herein as an information nugget. An information nugget may be as small as a piece of data such as a contact in the user's address book, or a meme or single idea or quote, or even a single word, or as large as an entire lifetime's opus of work in a given field, or even larger. An information nugget may be any element of data, including a file, folder, photo, photo album, audio or video file or clip, playlist, contact or list of selected contacts, task(s), calendar event(s), note(s), email (s) or email mailbox(es), document(s) or portion of a document, bookmark, section of a web page, piece of metadata, and/or other data type. An information nugget may also be a tag.

Tagging is done by Tagging Tribunal. A Tagging Tribunal is defined herein as a graphical appearance and coming together of a variety of relevant tags on the display of the user's computing device (such as a personal computer, pad computer, smartphone or other device), that organizes around the information to be tagged, which is centered on the user's screen. Tags in a tagging tribunal may be specified by the user and/or provided automatically by the system based on file types, tags and/or other data or metadata that the user has stored on his or her PC digital storage drive, mobile device or web server. An initial list of tags represented in the tagging tribunal may also be provided to a new user in the form of one or more templates that each feature a list of tags offered by the system. Such templates may be generated by computer or by people, by one or more experts, by a social network in the form of a folksonomy, and/or by other means.

A Convening a tagging tribunal is defined herein as a very rapid or immediate coming together of a tagging tribunal around the information to be tagged, for the purpose of the user being able to rapidly specify tags or other information nuggets to associate with the information to be tagged. In an embodiment of the present invention, the user is said to convene a tagging tribunal by pressing a combination of dedicated keystrokes (such as CONTROL+ALT+SPACE-BAR), or by clicking an icon in the Task Bar of as Windows PC (the Menu Bar or the Dock on a Macintosh computer), or by dragging the cursor to a corner of the screen, or similar action. In an embodiment on a touchscreen-enabled pad or tablet computer, mobile phone or other mobile digital device, a tagging tribunal may be convened by means of a unique set of hardware button presses or touch screen gestures, or by means of another unique, fast, simple, purposeful user behavior based on hardware and software capabilities and constraints of the device. The user action may be executed within any application, or outside of an application, in the digital device's File System (on the Desktop or in Windows Explorer or the Windows Shell on a PC, in the Finder or Desktop on a Macintosh computer, or in a Unix Shell on a Unix system, for example) thereby invoking the tagging tribunal to rapidly surround any highlighted or selected element or elements, or around the last position of the cursor if nothing is yet highlighted.

The tagging target area is defined herein as the area of the interface around which the tagging tribunal convenes. It consists of the selected object or objects, as well as the area immediately around the object or objects, space permitting. In an embodiment of the present invention, the tagging target area may zoom in or out of the original background to display the entire object selected to be tagged, or all objects selected to be tagged. Once convened, the tagging tribunal persists on the screen around the tagging target area until the user performs the same action (keystroke combination, icon click, gesture or other action as described above) that convened the tagging tribunal, or performs a different action that is unique and intended to release a tagging tribunal. Once released, the tagging tribunal disappears or quickly fades, or otherwise animates receding from around the highlighted or selected area on the screen, and the interface looks as it did before the tagging tribunal was convened—unless the user adjusted the elements on screen that were highlighted or selected while the tagging tribunal was convened, and/or highlighted or selected new elements to tag during the tagging tribunal. In an embodiment of the present invention, the user may configure a system of the present invention to convene a tagging tribunal in one or more of a variety of graphical and/or textual forms.

In an embodiment of the present invention, while a tagging tribunal is convened, the user may elect to pan around and/or zoom in or out of the tagging target area, to better see and adjust what is selected to be subsequently tagged. While convened, a user may select or deselect one or more items in the tagging target area, until s/he is satisfied that the correct set of target items has been selected or highlighted.

In an embodiment of the present invention, tags may be depicted in text form or graphical form. For instance, if a photo of the user's friend Bob in the mountains was to be tagged, the user might hover his or her mouse over the people area of the tagging tribunal, and sub-menus of friends, work associates, family, etc. might pop up. Clicking on the appropriate sub-menu might bring up a group of thumbnail photos, and a thumbnail photo of Bob could be clicked to apply a tag associating the item to be tagged with Bob. Likewise, the name Bob might be typed into a text box, which might automatically bring up a list of all the people the user knows named Bob. One of those names could be selected as a tag, or a different last name than the ones on the list could be typed (or no last name could be typed), and the typed text field could be selected as a tag.

In accordance with an embodiment, a type of a tagging tribunal interface (e.g., a Type-J interface discussed below) simultaneously offers a variety of menus of associatively organized tags that a user may associate (at the click of a mouse, or by similar graphical pointer selection, or by typing shortcut keys) with the information to be tagged. In the tribunal interface of an embodiment, this variety of associative groupings of possible tags surrounds a textual or graphical representation of the information to be tagged.

The type-J tagging tribunal displays key representative structures and taxa of the user's data coming from all parts of the computer to assemble before the user in order that the user may do quick, associative, drag-and-drop (or point-and-click) linking. Within the systems of certain embodiments, a tribunal may take many different forms, each of which may be more comfortable for different users. In contrast to other forms of tribunals according to the present invention, the type-J tribunal represents an organizational structure of the user's information most similar to traditional file directory structures. Fundamentally different in the present invention, however, is the way information is linked for subsequent organization and retrieval.

In accordance with a further embodiment, not only may information nuggets be linked to one or more relevant categories (or taxa) of information, but the user may drag the information nugget over to the tribunal area of the screen to link to other information nuggets such as contacts (or other people relevant to the user's work or interests), other documents, iconic or textual representations of places and/or activities, as well as timeframes, priority levels, and/or other representations of data relevant to the user. Upon dropping the nugget on the target tag, an association is created which gives the information nugget context meaningful to the user as it relates to the user's own life, memories and experiences—in addition to context in associating it with other information. In an embodiment of the present invention, an alternative to the drag-and-drop association method allows the user to select the information nugget, and then click one or more tags visible within the tagging tribunal interface.

In a further embodiment, if a user decides s/he has selected a tag in error, s/he may undo the selected action by clicking the tag again (if the first click on a tag highlights that tag, for example in yellow, then a second click may un-highlight it, to provide the user feedback that this tag will no longer be considered as a link). In another embodiment, the user may simply select Undo from the Edit Menu, or perform a keystroke sequence such as CONTROL+Z (COMMAND+Z on a Macintosh PC) in order to undo the link. In an embodiment on a touchscreen device, a touch on the screen may select a tag, while another touch may unselect it. Other embodiments may provide alternate means of deselecting a tag during a tagging tribunal.

In certain embodiments of the present invention, the tagging tribunal not only serves as a structure to select from previously stored tags, but also serves as an interface for the user to build associative categories and links over time. For instance, if the user was hovering his or her mouse over the "people" section of a tribunal, and no category mountain climbers yet existed within the people category, clicking a new sub-category icon allows the user to easily create a new sub-category on the fly labeled mountain climbers, and associate a graphical icon with this new sub-category. In an embodiment, when a new category or sub-category is created, a service such as Google Image Search may be automatically employed to give the user an immediate choice of graphical icons to associate with a tag.

A Viewing World, or simply a World, is defined herein as either the primary model, or one of two or more models, that the system provides to the user to graphically display the user's information. For example, most digital calendaring applications provide the user with a Day View, a Week View and a Month View. Each of these views or viewing modes may be useful to the user at different times, to help see different levels or different aspects of the user's information. A Day View may provide more information about each event, but deprive the user of the ability to see more than a single day at a time. Likewise, the Month view in many calendar applications enables the user to see many more days at a time, for a more long-term perspective—but with what are often highly-abbreviated representations of individual events, in order to represent all scheduled events in the cramped box representing each day in a monthly view. The Day View, Week View and Month View of a calendar application would each be considered to be one of three different Viewing Worlds.

In an alternate embodiment, the associative network may be implemented as a viewing world that is comprised of a virtual rendition of a physical place, such as the U.S. Library of Congress in Washington, D.C. The center of the interior of the Library of Congress building is a domed cylinder, featuring myriad arched doors and access points. In this virtual-space-type viewing world, the cylindrical main reading room of the U.S. Library of Congress is represented as a virtual 3D space, in which each door and access point can be a labeled, drag-and-drop (or point-and-click) repository with labels corresponding to the elements listed in the type-J tribunal. Beyond each door or portal may be found a virtual room containing graphical or textual representations of the items linked to that access point. Because it is a virtual space, the user's cursor can fly directly to a portal spot in the main library room. Hovering the cursor over marked regions on the floor of the virtual Library of Congress, for example, enables the room to rotate to reveal areas occluded, or hidden, in the current view. Via these labeled doors or portals, rooms off of the central Library room in this embodiment may be entered in which additional labeled doors and/or portals may be found, for example, with labels in this secondary room representing sub-categories of the category represented by the original portal. A portal in one of these rooms may itself lead to another room with its own portals, giving the library's interior a branching structure. Further, the domed ceiling may be "flown to" and employed by the user, as each rectangular node on the domed ceiling may be labeled with relevant, associated information.

In an alternate embodiment, the associative map of the present invention may be depicted in a viewing world as a tree or a forest of trees, either two-dimensionally or three-dimensionally, such as discussed below in connection with FIG. 6A. In such an embodiment, each tree may be thought of conceptually as representing a subject of interest to the user, and/or a major category of knowledge. Similarly, each branch (which is itself a tag) can be thought of as a category or other grouping of tags, each of which may have sub-groupings in the form of sub-branches or twigs, each also representing tags. The information nuggets themselves are represented as the leaves or fruit of the tree. Each information nugget that is represented as a leaf or fruit is itself able to be used as a tag.

Because any information element may be tagged with numerous tags (for instance, a photo of a person named Bob might be tagged with the tags friend, co-worker, environ- mentalist, and investor), a single piece of information may be represented multiple times in a tree-type or forest-type embodiment of the present invention, with the same information nugget appearing as leaves or fruit on multiple trees, or even as multiple leaves or fruit on the same tree. Similarly, the same piece of information may be found in a number of different rooms or places within a Library-of-Congress-type embodiment of the present invention. Accordingly, additional ways of displaying the user's information, such as in a concept map, outline-type list or tagging tribunal, may also result in multiple representations of the user's information.

Should the user desire to visualize all the tags with which a given nugget of information has been associated, the user may view and edit any one of a variety of representations of this information to make such relationships clear. In an embodiment, a concept map or mind map displays the relationships between the information nugget and the tags with which it has been associated. In a mind map view, the information nugget is represented on the screen as a textual or graphical element, and lines emanating from this element connect the element graphically to textual or graphical elements representing the associated tags, which are labeled as such.

In accordance with certain embodiments, regardless of the form of tagging tribunal chosen by the user at a given time, the tagging tribunal offers functionality in several ways: 1) Defining new tags or deleting tags, 2) Changing defined groupings of tags, 3) Tagging or un-tagging (adding or deleting associations between a given element of information and various tags) and 4) Finding elements of information by navigating through the tag-grouping hierarchy.

In accordance with systems and methods of the present invention, information retrieval may now be associative, and not simply hierarchical or based on tags or other keywords. For example, suppose it is months or years later, and the user wishes to retrieve a quote by former British Prime Minister, Winston Churchill, but remembers neither the exact quote nor who said it. Imagine that the user remembers that it's a quote from a famous person, and remembers that it was Bob. (the mountain climber) who related the quote to her at a nearby restaurant over lunch—but remembers little else of the quote. In an embodiment of the present invention, the user would simply look up Bob in her contact list. Once selected, the entry for Bob not only includes standard contact list information such as address and phone numbers, but also features a pane that points to Bob's name. The pane features lists of information nuggets and other tags that, over time, have been related to Bob.

There is a section on this pane featuring a scrollable list of thumbnail images, representing all the images on the user's computer system that feature Bob. Another list on the pane features thumbnails of images Bob has sent to the user over the years. Yet another area of the pane lists web pages that Bob has pointed the user to over the years, and another features a scrollable list of emails received from and sent to Bob, from all of the user's devices. Yet another area of the pane shows icons representing quotes that Bob has shared with the user over time. Hovering a graphical interface pointer over these icons reveals the text of the quotes, along with the date and location of where Bob uttered the quote. Recognizing the Churchill quote, the user clicks on it. This action brings up a window showing the quote, its creator, and the date it was first uttered, in addition to other associative information. Pointing at this quote is a pane similar to the one described above. This pane, however, lists all of the associative links that have been built up over time around this quote, and quickly reminds the user of the fact that this quote was first relayed to the user over lunch at the restaurant the user remembers, on that cloudy day in June (the pane shows the date and time that the user first heard the quote, as well as the weather on that particular day at that restaurant's location), and shows other tags and images that confirm that this is indeed the correct quote.

Moreover, the user's glance at this pane reminds her at once that this quote was first uttered during World War II, concerned the Battle of Britain, and shows a demonstration of strong leadership in the face of adversity on the part of its speaker. The user is not only able to browse for the information, but she is also able to find the information she was looking for quickly and directly. Furthermore, she is able to quickly remind herself of the context and meaning of the quote, see other quotes by Churchill, other quotes about leadership, and so on. Not only has this information-retrieval task been accomplished, but the context of the retrieved information has been restored and made available to the user for further inquiry as well.

In addition to serving as tagging interfaces, tribunals in the present invention also serve as primary information retrieval interfaces. With a keystroke, one of many tribunals may convene (the type dependent on the specific keystroke or key combination), and enable the user to browse for the sought information in any one of a wide variety of ways. Modifying slightly the above example, let us say that the user was trying to find the Churchill quote again, but only remembered that the quote concerned a campaign involving Great Britain in World War II. In this example, the user selects the forest-type embodiment of the present invention and, much like a bird, flies over the forest of virtual trees that represent subjects that have interested her over the years. She navigates toward a patch of forest entitled History and, recognizing the large tree that represents World War I in her virtual forest, she flies just beyond it to the equally large tree that she recognizes from its shape to represent World War II (the tree is also labeled as such). Alighting on a thick branch entitled major campaigns, she looks down the branch at the variety of choices and catches sight of the Battle of Britain leaf at the end of the European Theater branch. She flits over to this leaf and, clicking on it, sees a pane pop up next to it pointing at this leaf. The pane features the key players in this battle, and the user recognizes Churchill's name, and clicks on it. In the center of the screen, up pops Churchill's name, image and a brief bio, but it is the new pane that is now pointing at Churchill's name that interests the user. She navigates her pointer over to the Famous quotes section of the pane, and, hovering over icons representing quotes that she had earlier labeled "leadership", she finds the quote for which she is looking. Clicking on the quote, a new window pops up showing the quote and the pane pointing to it, as described above. Still unsure if she has the right item, she is now reminded from this screen that it was Bob who first related the quote to her, at that restaurant on that cloudy June day. She is now sure she has the right quote.

In an alternate embodiment, the user may be seeking information for retrieval, and select the type-J Tribunal to browse his or her associative links textually. In this embodiment, the user convenes the type-J Tribunal with nothing selected beforehand. The user then clicks on tags to browse information nuggets and/or other tags that are associated with the selected tags, causing the appearance of a contextual menu of associative links. One or more of these contextual menus may be demarcated by lines to separate different types of associatively-linked elements, such as people, places, images, web pages, documents, etc. In certain embodiments, similar to the branching nature of the tree-type Tribunal or the Library of Congress-type viewing world, the type-J Tribunal's contextual menus may also branch, leading the user to consecutively more and more refined tags, until the desired tag or information nugget is located.

In certain embodiments, a search field is present in the Tribunal area, and words or phrases may be typed into it by the user to quickly locate an item of interest. Using the example above, the user starts typing in the words "Churchill Quote B". As the user begins typing, a listing of possible selections populates beneath the search field, similar to the auto-complete functionality found in the Google search bar in Firefox 3. By the time the user has typed in "Churchill quote B", she sees one of the top auto-complete options to be Quote from W. Churchill related by Bob. Selecting this option makes the aforementioned Finest Hour quote's window appear, along with the associative links pane that points to the quote, enabling the user to confirm the date, time, weather, location, etc. of where she first heard this quote—as well as review all the details relevant to the quote's origins.

Figure 1B:
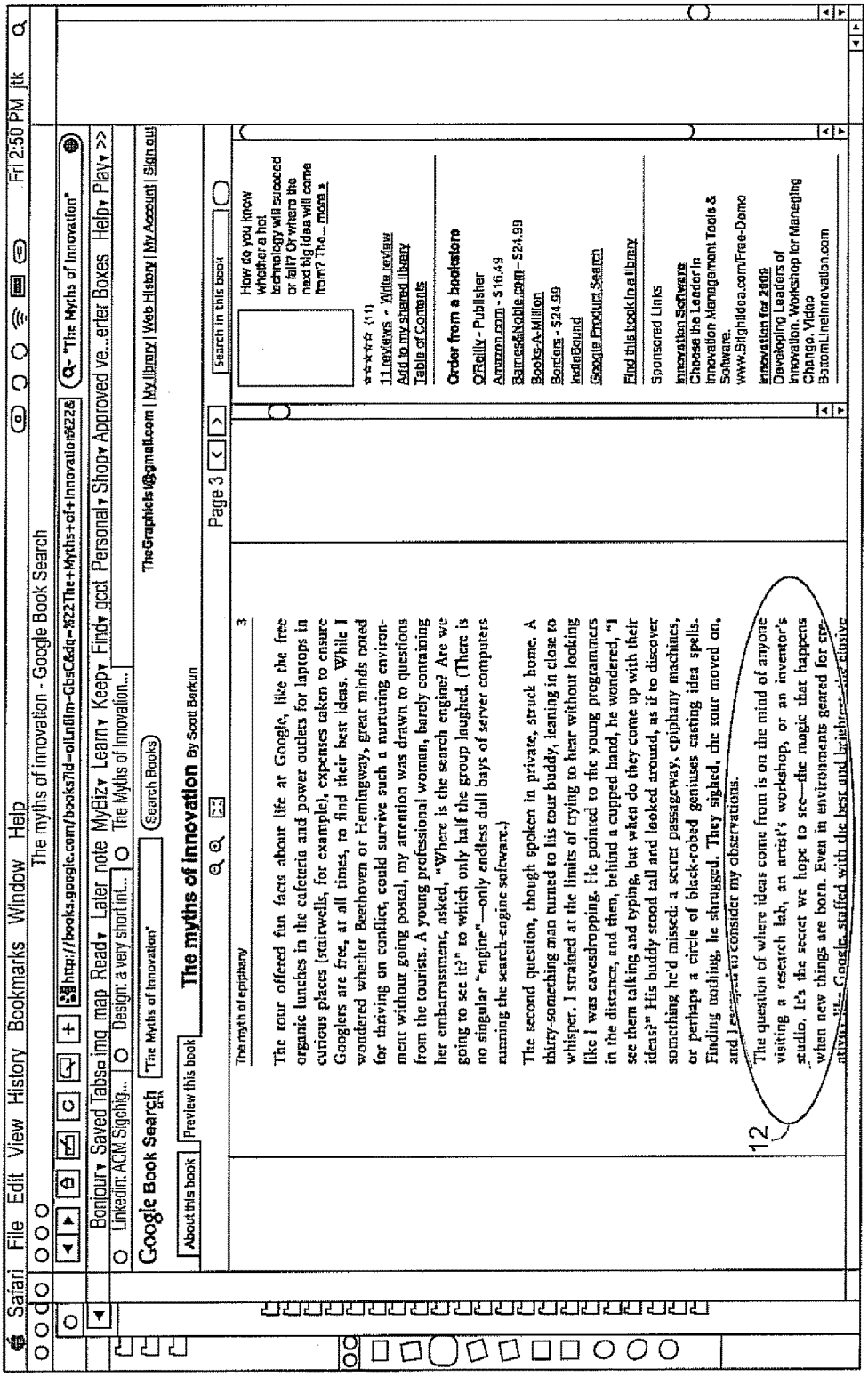
Figure 1C:
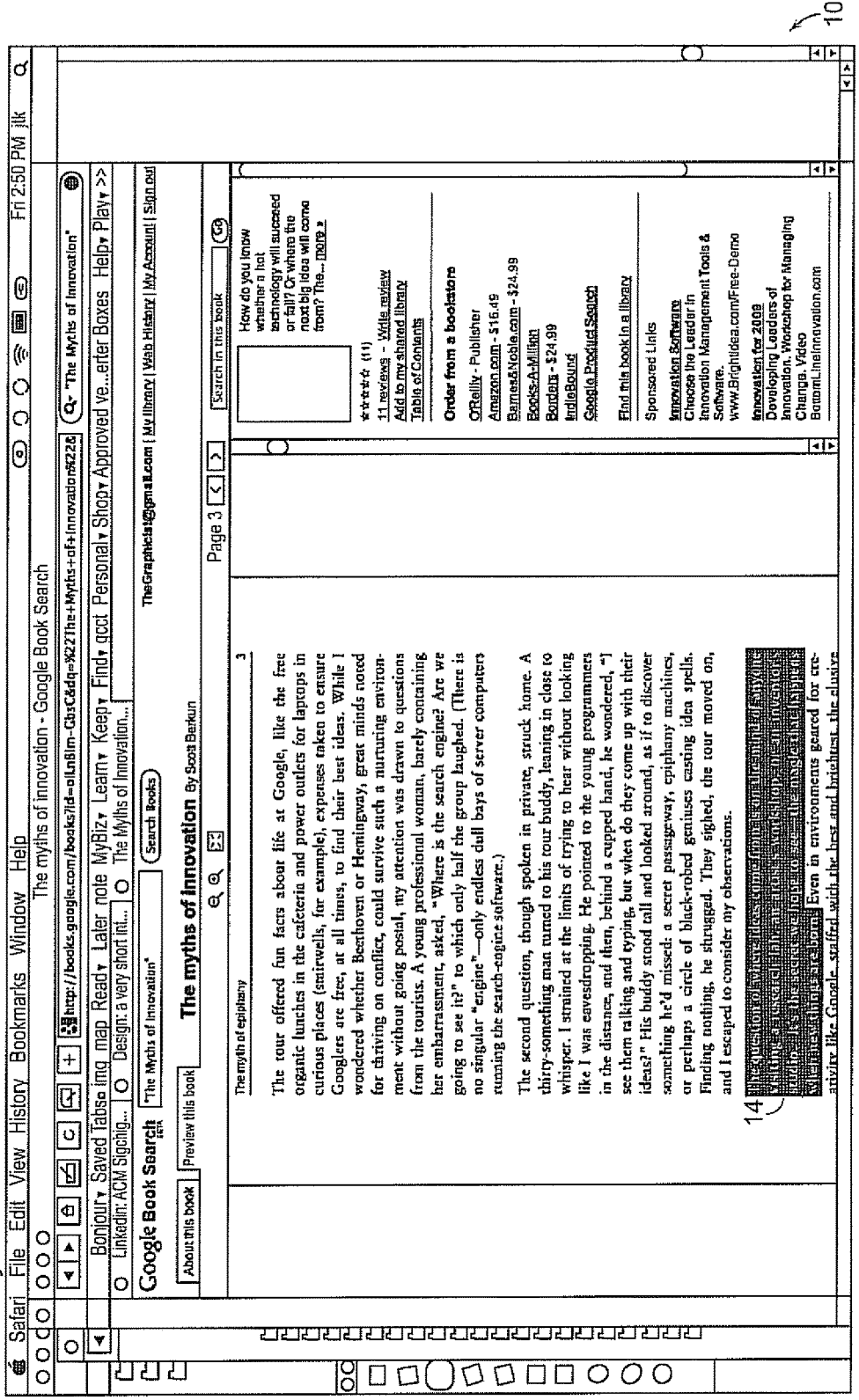

FIGS. 1A-1D show screen-capture depictions of a user display interface 10 in a system in accordance with an embodiment of the present invention while a user browses a document (FIG. 1A), identifies a section of the date to be tagged (FIG. 1B), and then highlights the section to be tagged (FIG. 1C). As shown in FIG. 1D, the selected text 14 is then centered in the viewing area. The document may, for example, be the text of a book through Google Books. In FIG. 1B, text of interest within the book is indicated within the ellipse as shown at 12. In FIG. 1C, the user has highlighted the text of interest as shown at 14. In FIG. 1D, the user has indicated that he or she wishes to convene a tagging tribunal, in which case the highlighted text becomes the information nugget to be tagged, and is automatically centered on the screen. In an alternate embodiment of the present invention, the information nugget to be tagged is placed in a position on the screen that is strategically relevant to the nature of the embodiment of the tagging tribunal, which may differ depending on the user's desire.

The user then convenes a tagging tribunal through entry of a defined keystroke as discussed above or by selecting such a command from a pre-defined pull-down menu bar as shown at 16 in FIG. 2A or a context (right-click) menu selection, or a keyboard short-cut. As shown in FIGS. 2B and 2C a shutter-like, time-sequenced, swift, computer screen animation of the convening tagging tribunal shutter blades 18 to appear in the display interface 10 in accordance with an embodiment of the present invention. In FIG. 2A, the user has just signaled his or her intent to convene a tagging tribunal, and the highlighted information to be tagged (or tagged and stored) is automatically centered on the user's computer screen. In an embodiment, if the information selected were already stored on the user's hard drive in other than a temporary information cache, then the information will be tagged within the tagging tribunal, but not redundantly stored. If the information is not already non-temporarily stored, it will be stored in a general tagged information repository on the user's computer, or in a tagged information repository on a web server on which the user has an account, or both. In an alternate embodiment, if the information is not already non-temporarily stored on the user's hard drive, the tagging tribunal creates a tag pointing to the original remote location (for instance on the web) where the user encountered the information of interest.

FIG. 2B shows the user's computer screen a short time after that shown in FIG. 2A. In FIG. 2B, animated shutter blades 18 come in from the edges of the screen and begin to surround the information of interest. FIG. 2C shows the user's computer screen a short time after that shown in FIG. 2B. In FIG. 2C, the shutter blade effect continues, so that the information to be tagged is more completely surrounded. In FIG. 2D, the shutter blade effect continues, and the information to be tagged is completely surrounded.

Figure 3A:
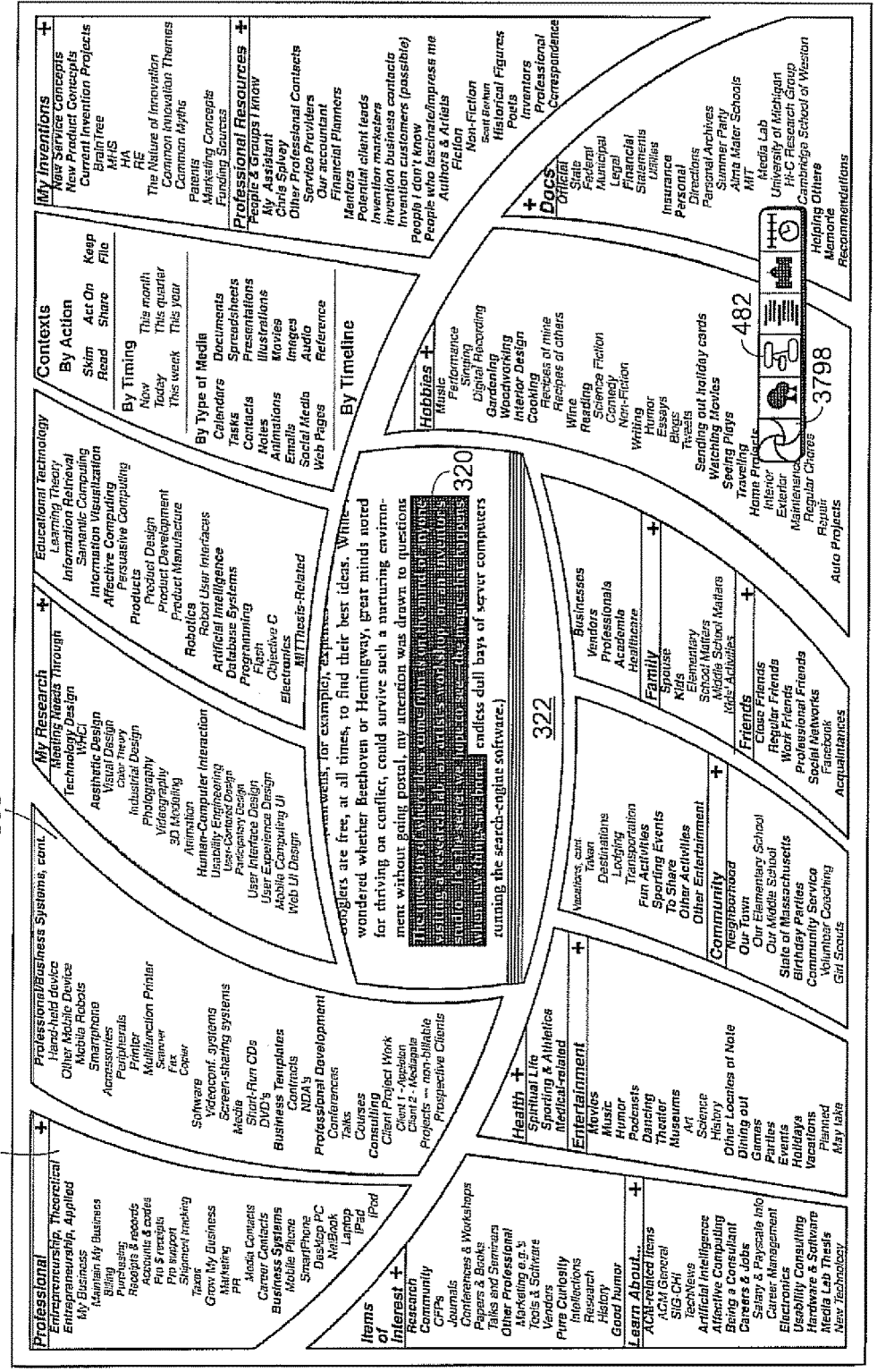
FIGS. 3A and 3B are illustrative diagrammatic depictions of user display interface screens employing a convened type-S tagging tribunal in a system in accordance with an embodiment of the present invention, including user-defined, associatively grouped tagging menus, and in particular.
Figure 3B:
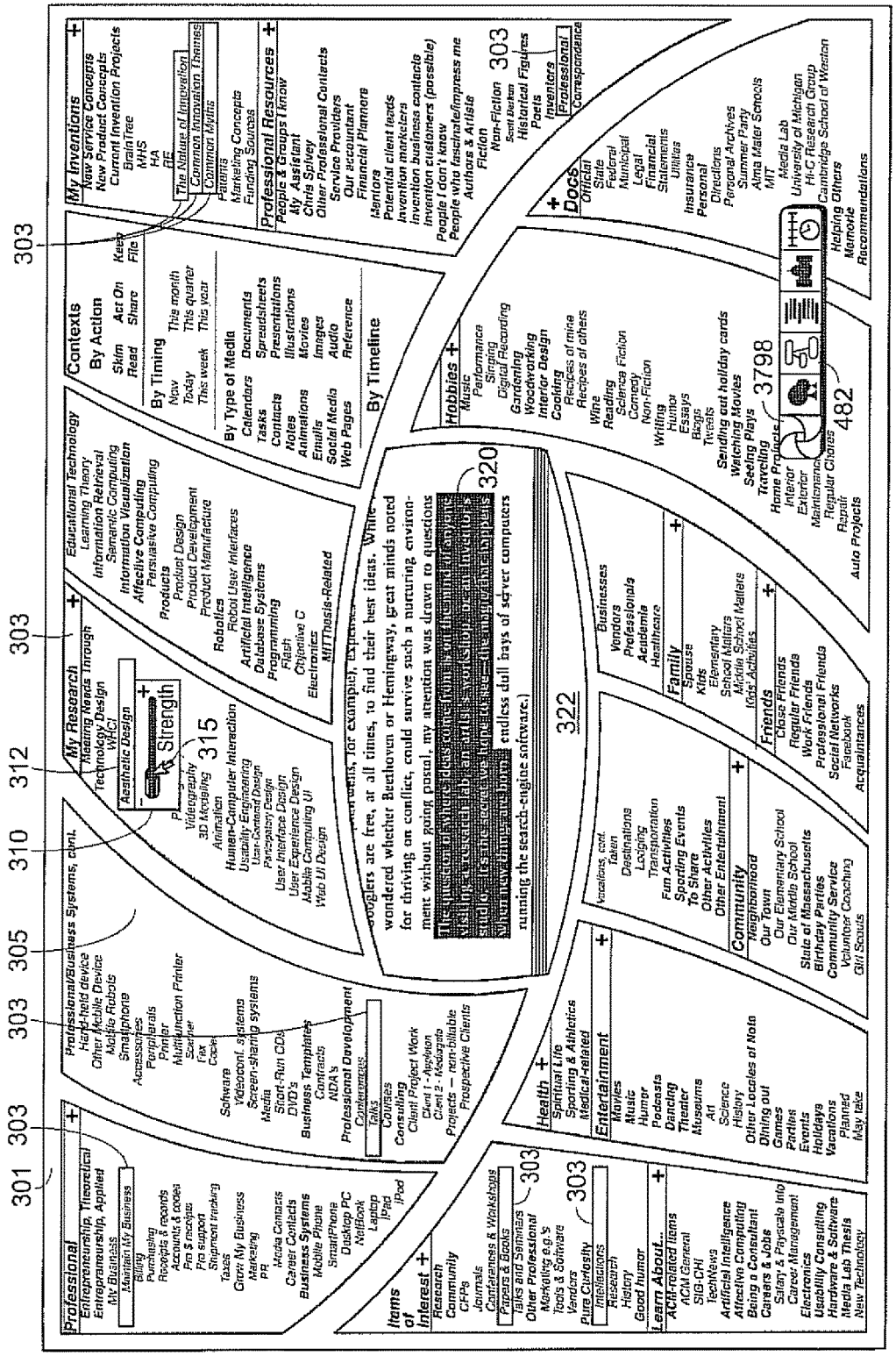

FIG. 3A shows a screen-capture 301 of a convened type-S-shutter tagging tribunal according to the present invention, including user-defined, associatively-grouped tagging menus displayed on the shutter blades which closed in around the highlighted or selected element or elements (320), surrounded by the tagging target area 322 as described above. The area surrounding the information to be tagged is broken into 10 sub-panels, each containing a group of tags. Some tags are also group headings for sub-lists of tags. For instance, sub-panel 305 contains the tags "Business Templates", "Professional Development", "Consulting", and "Client Project Work" (among others). The tag "Professional Development" also serves as a sub-heading for a sub-list of tags including "Conferences". "Talks" and "Courses". Likewise, the sub-tag "Consulting" also serves as a heading for a sub-group of tags including the tag "Client Project Work". FIG. 3B shows screen capture images of in a system in accordance with an embodiment of the invention during use of a type-S tagging tribunal once a user is nearing completion of his or her tagging as discussed further below.

Figure 4:
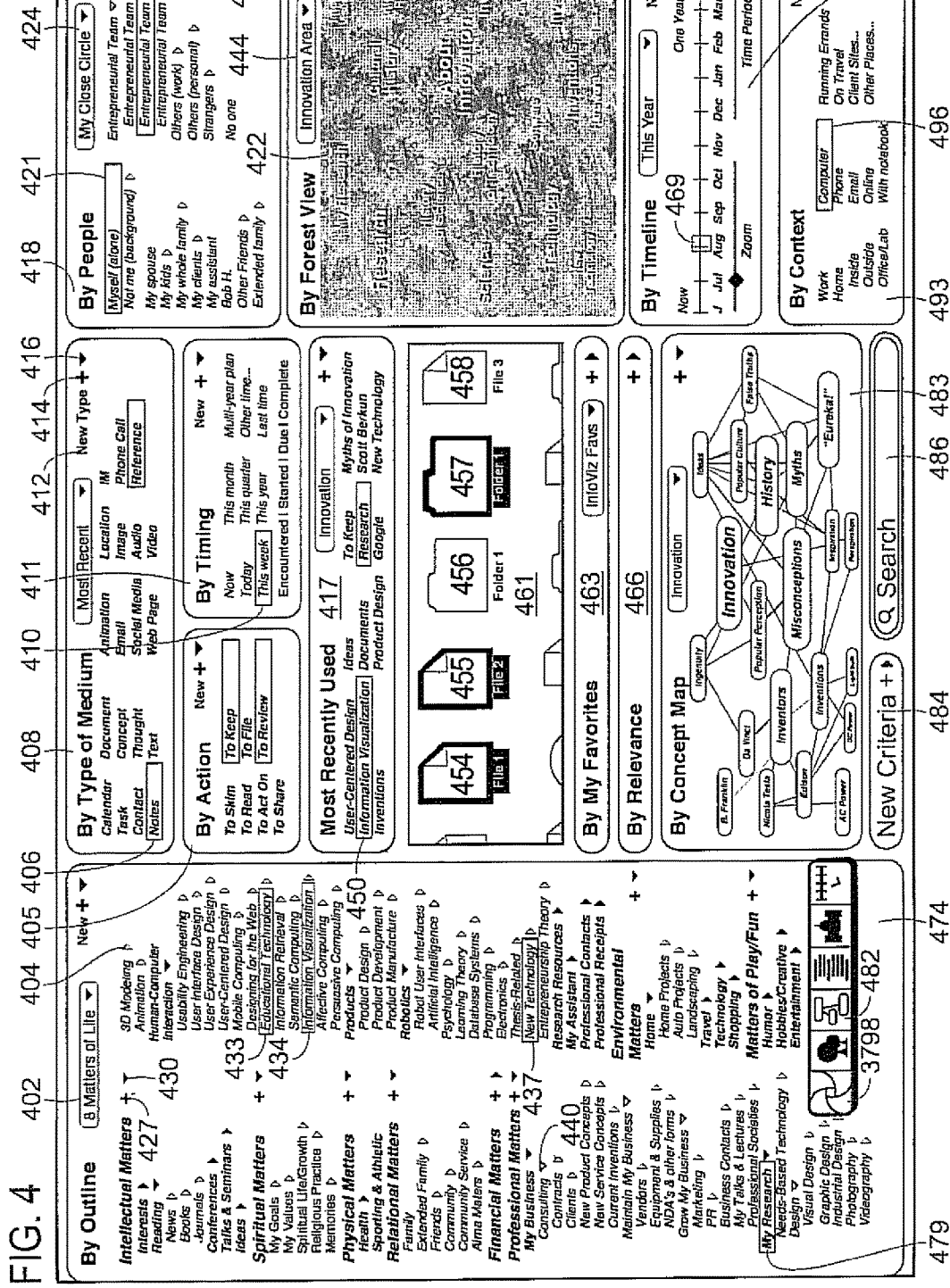
FIG. 4 is an illustrative diagrammatic depiction of a type-J tagging tribunal in a system in accordance with an embodiment of the present invention, including a concept map or mind map-type viewing world, and a forest-type viewing world.

FIG. 4 shows a type-J tagging tribunal in a system in accordance with an embodiment of the present invention. This tagging tribunal simultaneously offers a variety of associatively organized tags, one or more of which a user may associate (via drag and drop, or at the click of a mouse, or by similar graphical pointer selection, or by typing shortcut keys) with the information to be tagged. The information of interest that is to be tagged is represented in tagging target area window 461 in the center of the screen. This tagging tribunal is organized by sub-panels that enable the user to select tags based on a variety of criteria. Tag sub-panel 474 allows the user to select tags by subject. Tag sub-panel 408 allows the user to select tags by media type. Tag sub-panel 405 allows the user to select tags by action to be performed on the information nugget. Tag sub-panel 411 allows the user to select tags by timing. Tag sub-panel 417 allows the user to select tags from among those most recently used. Tag sub-panel 463 is a quick-select collection of favorite tags. Tag sub-panel 466 allows the user to select tags by relevance to the current information nugget (for example, with relevance determined and ranked based on comparison of current subjects of interest and/or other tags with words in the current information nugget, and/or suggesting new candidate tags to be created at the user's option).

The tag sub-panel 483 is a mind-map-style collection of tags. Tag sub-panel 444 enables the user to navigate and/or select tags in a forest of virtual trees that represent subjects of interest to the user. Tag sub-panel 418 allows the user to select tags by person, whether the person is in the user's contact list, or is a famous figure, or is an historical figure, or is someone the user or the computer system can name as a person and/or find additional information about. Tag sub-panel 498 allows the user to select tags by when they occurred on a timeline. Tag sub-panel 493 allows the user to select tags by a listing of contexts that are relevant to the user. Tag sub-panel 486 allows the user to perform a search on any tag or information nugget.

In certain embodiments, a number of interface elements enable the user to quickly exercise a great deal of control over any tagging tribunal screen. Just as in FIGS. 3A and 3B, a user may press any plus sign in FIG. 4, such as item 414, to create a new element of the type suggested by the title of the sub-panel. Clicking on plus sign 414, then would add a blank field in the By Type of Medium sub-panel 408, enabling the user to type in the new name of the medium, and continue working. If the user wished to reposition the new medium-type tag, or any other, she could simply drag and drop the un-highlighted tag and drag it to the desired new location. Label 412 is simply an additional clickable element that functions the same as plus sign 414, and also acts as an additional training cue for novice users that plus-signs mean add a new item of this type. Similarly, plus sign 427 would add a new By Outline entry under the outline header "Intellectual Matters." Selecting "New Criteria" sub-palette 484 will enable the user to create an entirely new subpalette, which the user would be able to rename, reposition by dragging across the screen, adding new elements to, expand or collapse, and begin using immediately.

Triangles that appear on the screen in FIG. 4 (items 404, 416, 430 and 440 are examples), enable the user to collapse or expand elements immediately beneath the triangle, showing or hiding more or less detail, as the user elects. Triangle 430, therefore, would collapse all tags beneath "Intellectual Matters," such that the next tag to appear beneath it would be "Spiritual Matters." In similar fashion, clicking the smaller outline triangle 440 would collapse all tags inset beneath the tag "Consulting." Conversely, clicking on triangle 404 would reveal a higher level of detail under the tag "3D Modeling," revealing all tags and sub-tags currently hidden under that heading. Triangle 416, accordingly, would collapse the "By Type of Medium" sub-palette down to the size of the collapsed sub-palette "By My Favorites" 463.

Drop-down menus, as shown in items 402 and 424, enable the user to quickly change the entire contents of a sub-palette depending upon the area of expertise, specialization, interest, aspect of the user's life, profession or hobby, or some other criteria. Clicking on drop-down menu 424 (currently labeled "My Close Circle"), for example, would reveal that label among a list of labels for different groups of people that might be relevant for one tagging purpose or another. For example, were the user interested in Modern European History, one such label in this list might be World War II, and reveal a list of historical figures such as Winston Churchill, Franklin Roosevelt and Joseph Stalin, in addition to the names of friends who share the user's interest in history, the names of the user's college history professors, authors of books the user has liked on the subject, and so on.

At the bottom of the list of labels that would appear beneath drop-down menu 424 are several other options: "Create A New List . . . " enables the user to specify a new label in the current drop-down list, select the new label, and begin adding names of people to the list from the user's master list of people (analogous to the user's Contact Manager application). A second option is "Edit My Lists . . . " which would yield a dialog box enabling the user to reorder, rename, delete, add and edit list labels, and the list of people that were associated with each list. Another In this way, the user is able to customize the tagging tribunal quickly and easily Navigation Palette 482, which is repositionable by the user via dragging on any part of it, floats over all interface screens in an embodiment of the present invention, and shows iconic representations of different "viewing worlds"—different ways the user can view her data—any of which may be clicked to take the user to see their data in that viewing world. FIG. 6D presents all the icons on floating Navigation Palette 482, together with clear descriptions of each viewing world. Tagging tribunal icon 3798 is shown in a highlighted state, indicating that this is the current screen.

Note that items 454, 455 and 457 have been selected as targets for tagging within the tagging target area, whereas items 456 and 458, and other items partially visible to the user have not. Once the user has closed the tagging tribunal, all highlighted target items will be linked to the tags selected on the screen. Tags that are in the process of being linked to these target items have been highlighted by the user around the screen, such as tags 406, 410, 421, 422, 433, 444, 437, 450 and 496. Tags that may be shown in more than one place are secondarily highlighted, such as in a lighter color, as shown for tags 434 and 445, which are duplicates of the user-selected tag 450, entitled, "Information Visualization." These secondary highlights inform the user that these elements, while redundant on screen (per the user's preference for what to show at any given time), have also been highlighted for tagging. Additional examples of secondary highlighting may be seen in tag 479, as well box 469 on the timeline around the start of August in By Timeline subpanel 498, after the user had selected tag 410 entitled, "This Week" in the By Timing sub-panel 411.

In an embodiment of the present invention, tags shown in FIG. 4 may have layers of tags under them that become visible (for instance, by a "Pop-Up" menu effect as is known in the art) when a user hovers a pointer briefly over a tag. Likewise, hovering over tags on pop-up menus may make visible pop-up sub-menus, and so on. In certain embodiments, tags to be associated with one or more highlighted information nuggets in the center of the tagging tribunal shown in the center of FIG. 4 may be associated by clicking on the tag to be associated, or by clicking on the information to be tagged, dragging it to the tag to be associated, or vice versa, or by hovering over the tag to be associated and selecting a tagging operation from a pop-up menu or a Context menu, as is known in the art, or any similar pointer-related selection method. In an embodiment of the present invention, the different tagging sub panels in FIG. 4 may be accessed through keyboard shortcuts.

In certain embodiments, each tag selected from within a sub-panel of FIG. 4 becomes highlighted as it is selected to be associated with the selected information in the center of the screen, and the sub-panel within which the tag sits becomes lightly highlighted as well. This gives the user an instant spatial feeling for what arenas of his or her life are associated with the information in the center of the screen, and likewise which areas of his or her life have not yet had a tag associated with the information nugget, and thus might be worthy of attention to see if a tag from that area of life should be associated with the selected information.

In an embodiment, a user may hover a pointer over any sub-panel (e.g., in FIG. 4) and (via contextual menu such as a right click menu, or via keyboard shortcut or the like) may bring up a dialog box to add a tag, or simply click on the "Add New Element" text or icon (shown as a plus sign on the relevant sub-pane in FIG. 4, as in icon 414 or 427). Floating palette 482, which floats over all interfaces screens in an embodiment of the present invention, shows iconic representations of the different ways the user can view her data. Tagging tribunal icon 3798 is highlighted on this palette, as in FIG. 4. FIG. 6D presents all icons together with clear descriptions of their meanings.

In some embodiments, tags shown in FIG. 3A may have layers of tags under them that become visible (for instance, by a context or pop-up menu effect) when a user hovers a pointer briefly over a tag, or right-clicks on the tag, or via similar means. Likewise, hovering over tags on context menus may make visible pop-up or context sub-menus, and so on. In further embodiments, tags to be associated with the highlighted information in the center of the tagging tribunal shown in the center of FIG. 3A may be associated by clicking on the tag to be associated, or by clicking on the information to be tagged, dragging it to the tag to be associated, or vice versa, or by hovering over the tag to be associated and selecting a tagging operation from a context menu, or any similar pointer-related selection method. In an embodiment, the different tagging sub panels in FIG. 3A may be accessed through keyboard shortcuts.

In certain embodiments, a list of tags that have been associated with the selected information in the center of the screen are displayed in one of the sub panels on the screen (for instance, sub-panel 305), or in a hover-box which appears to float movably above the screen depicted in FIG. 3A. Each tag may be selected from within a sub-panel of FIG. 3A becomes highlighted as it is selected to be associated with the information nugget in the center of the screen, and the sub-panel within which the tag sits becomes lightly highlighted as well, as shown in FIG. 3B. This disbursed highlighting gives the user an instant spatial feeling for what arenas of his or her life (or work, or schoolwork, or interests, depending on the application) are associated with the information in the center of the screen, and likewise which areas of his or her life/work/education/interests do not yet have a tag associated with the information, and might be worthy of attention to see if a tag from that area of life should be associated with the selected information.

FIG. 3B shows what the type-S tagging tribunal looks like once the user is nearing completion of her tagging. Highlighted tags 301, 303 and 312 show a representation of the highlighted tags. In an embodiment, the system allows the user to optionally specify the strength of association between a selected information nugget and a tag (or other nugget) selected for association with that information nugget. For example, the user may wish to express that a target item has an extremely strong connection to a tag, such as between two contacts in the user's contact list who are married, or between a research paper and the author who wrote it, or between two concepts that are closely linked in the user's mind, such as the link a researcher may wish to make between two tags, one representing the term obesity and another representing Type 2 Diabetes.

In FIG. 3B, a user may specify the strength of a connection, for example by right-clicking on highlighted tag 312 that the user has just linked to, selecting "association strength" from a context-sensitive pop-up menu (which would cause pop-up widget 310 to appear, that features a slider bar representing association strength) and then moving the slider to the right to make the connection stronger, or moving the slider to the left to make the connection weaker. In an embodiment, a number of properties of any given association (including user-definable properties) may be accessed and edited in a similar fashion. Later, when the user tries to find the information nugget in question, or visualize the relationships between information nuggets, the associative linking structure would reflect a higher degree of accuracy in recalling these stronger and weaker associations, such as by proximity in a 3D special viewing world embodiment, or a thicker connection line in a mind-map embodiment, thereby assisting in the associative information retrieval process.

In certain embodiments, a user may click on any plus sign icon in any of the headers and/or sub-panels in the interface to bring up a dialog box to add a tag to the subject area associated with that icon. Alternatively, the user may hover the cursor over any sub-panel in FIG. 3A and (via context menu such as appears upon right-clicking on an object, or CONTROL+click on a Macintosh PC, or via keyboard shortcut or the like) can bring up a dialog box to add a tag.

Figure 5A:
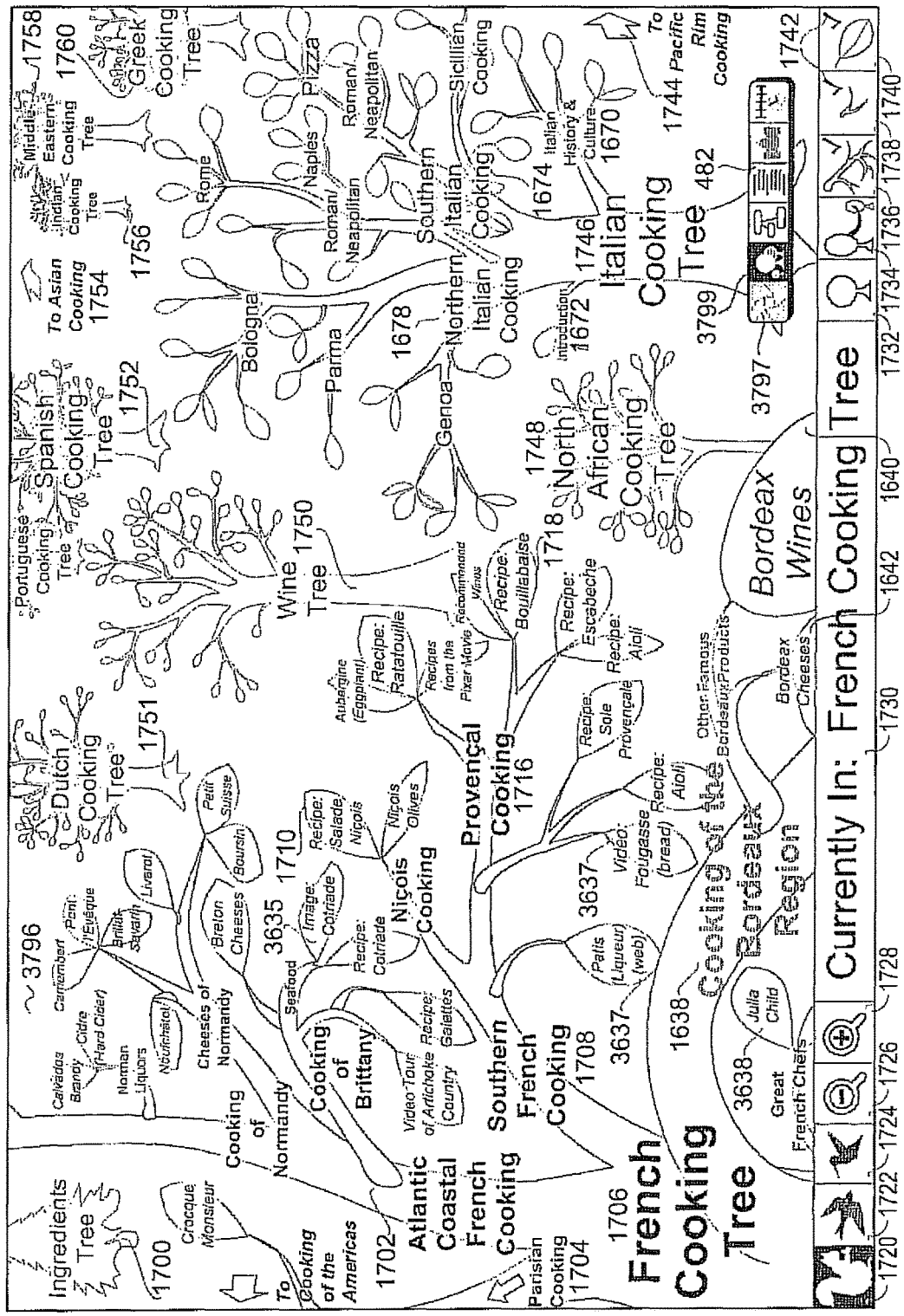
FIGS. 5A and 5B are illustrative diagrammatic depictions of a three-dimensional forest-type tagging tribunal in a system in accordance with an embodiment of the present invention, without (FIG. 5A), and with (FIG. 5B), an Associative Palette of information reflecting the associations the user has made for a specific information nugget.

Once tagged, the user's information may then be presented in a number of new and useful ways. For example, FIG. 5A is a representation of some of the user's information, shown in a mockup of a screenshot of a Forest-Type embodiment. The scene (3796) is of a forest of virtual, three-dimensional (3D) trees belonging to a user who has an interest in international cooking. Scene 7396, in particular, is focused on European cooking. Label 1642, centered at the bottom of the screen in a toolbar 1730, describes the user's location in this virtual forest: "Currently In: French Cooking Tree," Occupying much of the left side of scene 3796 is French Cooking Tree 1706, clearly labeled on its trunk.

The French cooking tree 1706 appears larger than any other tree in the scene because it is in the foreground in this 3D scene; in fact the user's vantage point may be said to be sitting on branch 1638, labeled "Cooking of the Bordeaux Region." Indeed, leaves 1640 and 1642, emanating from twig 1650 toward the bottom of the screen and representing Bordeaux Wines and Bordeaux Cheeses, respectively, are extremely large relative to other leaves on the screen. But from this vantage point, looking into the center of the tree, one can see a number of the tree's main limbs in addition to limb 1638, on which the user appears to sit.

The Parisian Cooking limb 1704 runs off the left side of the screen; Atlantic Coastal French Cooking limb 1702 rises vertically from the trunk, and Southern French Cooking limb 1708 emanates diagonally into the center of the screen. This vantage point of tree 1706 enables the user to see a number of its leaves up close, in addition to the woody structural parts of the trees. In an embodiment, leaves tend to represent information nuggets (or collections of information nuggets) while trunks, limbs, branches and twigs tend to represent tags. Leaf 1718, at the tip of Provençal cooking branch 1716, is a multimedia file containing text, images and a video to represent the recipe for the distinctive seafood stew from Provence known as Bouillabaisse. Leaf 3635 is an image of the Breton seafood dish Cotriade. Leaf 3637 is a web page about the Provençal liqueur Patis, and Leaf 3637 is a video about how to make the bread Fougasse. Leaf 3638 represents the person Julia Child, a famous American author and master of French cooking who, through various media, made the art of French cooking accessible to an American audience. In another embodiment, leaves may contain icons representing their file type or types.

The Limb 1708 splits off into two branches: Niçois Cooking branch 1710 and Provençal Cooking branch 1716. It should be noted that in the real world, there are many more regions in southern France with notable cuisines. However the world pictured here belongs to a single individual; the user. And to this user, these two regions represent the extent of her interest, her knowledge, her time, or some combination. Later on, the user may find other regions in southern France that are of culinary interest to her, and she may eventually add them to this tree. But this tree may be said to represent the user's current level of interest and/or knowledge on this subject.

To the right of French cooking tree 1709 is the small North African Cooking Tree 1748, and next to that is the much larger Italian Cooking Tree 1746. The comparatively smaller size of North African cooking tree 1709 in relation to Italian cooking tree 1746 represents the fact that the user has only recently discovered North African cooking, but has been interested in Italian cooking for a much longer time.

In a region of forest focused on European cooking, the presence of a tree representing a different continent (Africa) appearing in the middle of it might seem to be out of place. The user however, may appreciate the strong influence that North Africa and Southern Europe (particularly Italy, France and Spain) have had on each other's cultures—cooking being an integral part of those cultures—and after all, this forest represents the user's view of the world. The user may even misspell "Bordeaux" on the labels for leaves 1640 and 1642 at the bottom of the screen without adverse effect.

The Italian Cooking Tree is, in general, split into two main limbs: Northern Italian Cooking limb 1678, and Southern Italian Cooking limb 1674. The fact that northern Italian cooking limb 1678 is much thicker than southern Italian cooking limb 1674 indicates that the user may be more interested in, and/or more knowledgeable of, northern Italian cooking. Below these limbs are branch 1672, containing several introductions or overviews of Italian cooking that the user found interesting. To the right of trunk 1746 is limb 1670, entitled "Italian History and Culture," topics that also interest the user.

Off in the distance are other trees, representing other topics of interest to the user. Greek Cooking Tree 1760, Spanish Cooking Tree 1752, and Dutch Cooking Tree 1751 all represent European cuisines that the user is interested in, among others. In the center of the screen is Wine Tree 1750, representing the deep association that European cooking has traditionally had with wine made from fermented grapes. In the distance beyond the Greek cooking tree 1760 in the upper-right corner of the screen is Middle-Eastern Cooking Tree 1758; beyond that is Indian Cooking Tree 1756. These trees represent cuisines that are geographically further from Europe, and increasingly in Asia. Clicking on arrow 1754, labeled "To Asian Cooking," would take the user to that part of the forest. Similarly, arrow 1744 on the right edge of the screen, labeled "To Pacific Rim Cooking," would take the user to that part of her virtual forest. In the upper left corner sits an Ingredients Tree 1700. The user created this tree to give herself a virtual place to create an inventory of all cooking ingredients.

The Navigation palette 482 may be seen floating over the lower right corner of the scene, but Forest Viewer Icon 3799 is now highlighted. Tagging Tribunal Icon 3797 is no longer highlighted. The iconified tools on the left in toolbox 1730 on the bottom of the screen help the user to navigate around this forest-type viewer world, while the tools on the right help the user change what s/he is looking at. Icon 1720, which is highlighted here, shows a squirrel—a small woodland creature expert at climbing trees. In Squirrel Mode, the user may quickly scurry around a tree on its trunk, limbs and branches, visiting twigs at will, and jumping up or down to other branches or limbs in the same tree, as well as jumping to neighboring trees. Icon 1722 depicts a flying bird, and enables the user to fly over and through their world, navigating the virtual 3D world as a bird would. Icon 1724 shows a hummingbird—a creature expert at hovering in the air wherever they desire to do so, as well as flying swiftly when desired. Universally-recognized Zoom Out icon 1726 enables the user to appear to back away from the scene being viewed; similarly, A Zoom In icon 1728 lets the user appear to move closer to material on screen.

In Bird Mode the user may soar over the virtual forest, passing quickly (or slowly, as desired) over the landscape, seeing labeled trees and regions of her forest as they pass beneath, navigating to various regions without losing the context of a large swath of forest that represents the user's knowledge and/or areas of interest in the macro. In bird mode, the user may land on any branch of any tree, flit from branch to branch and tree to tree as desired, viewing leaves while maintaining the context of the connecting twigs, branches and limbs.

Context is also the goal of squirrel mode. In this mode, the user may rediscover a tree not visited in a long time. Scampering up from the virtual forest floor, the user may pass labeled "roots" of the tree, recalling what the intellectual or historical roots of a subject may be. Running up the trunk, the user may pass smaller branches that are low down on the tree, that represent quotes about, definitions of, or introductions to the topic (such as Introduction branch 1672 on Italian cooking tree 1746). Continuing up the tree, the squirrel user sees branching limbs, passing twigs and leaves along the way, and can regain a conceptual feel for the topic by rediscovering it visually, in this way.

On the right side of toolbar 1730, a Single Tree Mode icon 1732 gives the user the option to hide all other trees except for the one the user is currently viewing. This option may assist users in focusing their attention on the subject at hand, without distractions from nearby trees. Clicking this icon again returns all the rest of the trees in the forest to their original positions. Icon 1734 will show vines, rope-like objects connecting elements of a tree to other trees, showing tags or information nuggets that other trees may have in common with the current tree. Similarly, the Show Vines icon will display vines between identical items in the same tree. The description of FIG. 8B, below, describes the way duplicates are managed in an embodiment of the present invention, and the rationale for such duplicates in discussed further below.

The Icons 1740, 1738 and 1736 enable the user to show or hide all leaves, all twigs and all branches, respectively. In an embodiment, check marks such as 1742 on these last three icons might disappear when an icon was selected, or turn into "x" marks in another embodiment. Such showing and hiding capabilities may be useful when searching for an item by its context, as a great many leaves on a tree, for example, can occlude, or hide, the presence of other areas of the tree—especially from the perspective of the outside of a tree. Similarly, temporarily hiding the branches of a tree can make it easier to see leaves on the other side of a tree, etc.

Figure 5B:
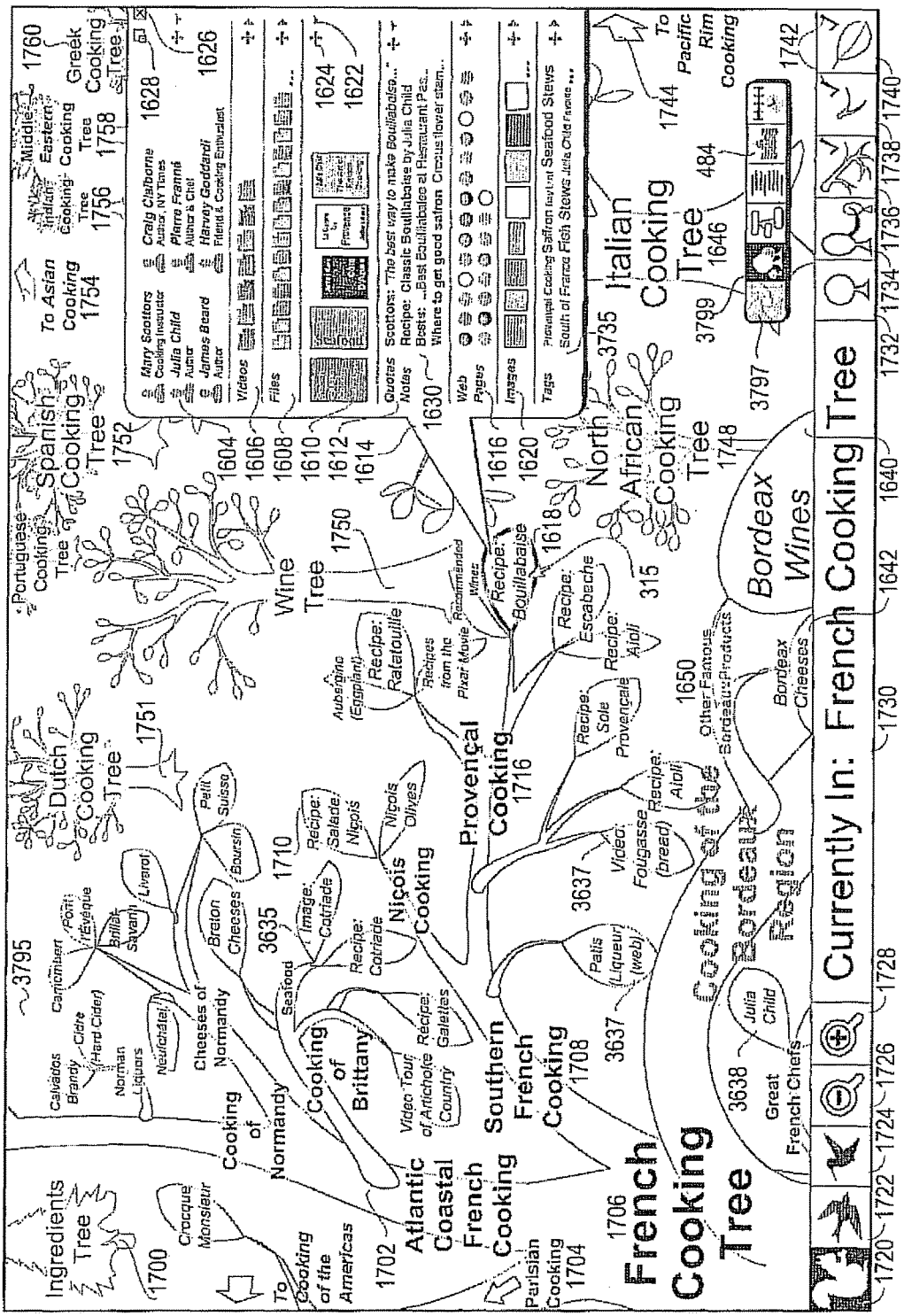

FIG. 5B shows the same scene as 5A, except that the user has clicked on leaf 1618, the recipe for the bouillabaisse stew mentioned earlier, to select it—making the leafs outline much thicker. While double-clicking on the leaf would open the file that the leaf represents, single-clicking on the leaf selects it, and selecting an item in an embodiment according to the present invention reveals the item's Associative Palette. An associative palette is defined herein as an interface element with a medium-large area that points to the item that is its base, and contains representations of many or all of the items that the user has associated with this item. In an embodiment, horizontal lines organize types of media together, and the familiar add item plus sign (such as 1624) appear to the right side of categories, next to the collapse/expand triangles (such as 1622) as described above. In another embodiment, items might be displayed chronologically, as they were added to the palette.

An associative palette 1614 for selected leaf 1618, for example, might feature the following elements: 1) an expand/collapse icon 1628 to enable the user to make the associative palette much larger or smaller; 2) a close icon 1626 that would make the associative palette disappear; 3) a list of people 1604 that the user has associated with this object (In an embodiment of the present invention, people that the user may store in her database of people include people and/or organizations that the user knows personally (as may be found in standard contact management applications), as well as people the user may not know. This database may include people who are living as well as those who are dead. An example of the latter is the chef, author and television personality Julia Child depicted in leaf 3638. Double-clicking on her icon or name would reveal her profile in the People database according to an embodiment of the present invention.); 4) a list of videos 1606 (shown here in an iconified, "collapsed" mode) that the user has deemed relevant to the Bouillabaisse recipe; even when items have been iconified and collapsed, rolling over any icon in an associative palette reveals names and details about that item; 5) a list of files 1608 associated with the currently-selected leaf (Such files might be text and/or image files such as Microsoft Word or Apple Pages documents, or presentations, or other kinds of documents. In this case, such files might contain alternate recipes for Bouillabaisse, or presentations about fish types native to the Mediterranean, or similarly related documents. An ellipsis (the " . . . ") at the end of a collapsed list such as shown here represents that there are more such items that are currently hidden. Clicking on the "expand" triangle (or "expand" icon 1628 might reveal all such documents, along with file names, etc.); 6) a list of books 1610 that the user has access to (or knows about), shown here in "expanded" mode; 7) a list of notes and/or quotes 1630; 8) a list of web page bookmarks 1616 that the user has associated with the currently selected item; 9) a graphical or textual display of images 1620; and/or 8) a list of tags 3735 associated with the selected object (In an embodiment as shown here, the tags are displayed as a collapsed version of a "Tag Cloud," in which the size of the tag corresponds to some other metric, such as the frequency of use system-wide, or the strength of the connection the user has established with that tag, etc.).

Associative browsing, as discussed above is greatly facilitated by associative palettes. In certain embodiment, associative palettes would appear on any screen in the system when any element is selected. In alternate embodiments, associative palettes would appear throughout the rest of the OS File System's user interface, as well as within the user's data-driven applications, when various elements were selected. In an embodiment, performing a key combination with a mouse click (such as option-clicking) on an element in an associative palette would bring that item to the center of the screen, and in turn reveal that item's associative palette. In this way, the user may follow an associative trail from one associative palette to another, with a high degree of speed, until the desired info cation is located—even if the user remembers few details about the desired information itself.

When an associative palette appears on the screen, the labels for items on the screen may adjust location and/or size to be maximally visible to the user. For example, in FIG. 5B the label for Greek cooking tree 1760 moved up from its position in FIG. 5A so it remains fully visible. Likewise, labels for Italian cooking tree 1646 and North African cooking tree 1748 have moved down and over to accommodate the presence of the palette. In an embodiment, graphical display logic built into the Viewer World rendering system helps to ensure that items and labels that can be shown at all are displayed as clearly and distinctively as possible.

In some embodiments, the viewer world representing the associative map of the present invention might be implemented as a 3-dimensional, virtual rendition of a place such as the U.S. Library of Congress. The Central Reading Room of the Library of Congress is a multi-level, domed cylinder, featuring myriad arched doors and access points. In this virtual-architectural-space-type tribunal, the Library of Congress is represented as a virtual 3D space, in which each door and access point can be a labeled, drag-and-drop repository with labels corresponding to the elements listed in the type-S or type-J tagging tribunals. Because it is a virtual space, the user's cursor mayfly to a portal spot. Hovering a graphical pointer over a region on the floor of the virtual Library of Congress may enable the room to rotate to reveal areas hidden in the current view. The domed ceiling may be flown to and used by the user, as each rectangular node on the domed ceiling may be labeled with relevant, associated information.

Three design affordances make the Library of Congress a useful secondary metaphor for strategically tagging information. 1) The physical nature of the Library of Congress suggests a permanence of location for a particular relationship of fields relevant to the user. This sense of trustworthy permanence is a hallmark of mental associations with physical locations or architecture—they don't tend to move around, and the user can find sought-after items based on the user's recognition of visual cues—landmarks of other items in the vicinity. 2) The interior of the Library of Congress building is large and complex, suggesting that there's room to scale and grow along with a user's interests and learning (in contrast to the type-J tagging tribunal, for example). 3) The Library of Congress interior has aesthetic value, and may be replicated virtually to a high degree of detail even on handheld devices. This sense of beauty in the process is central to the present invention's ethos, which is that the activity of associatively linking information, editing relationships and viewing or retrieving information can and should be fun and entertaining for the user. The senses of beauty, fun, exploration, excitement and enjoyment are vectors that can and should be exploited in everyday computing experiences. These senses nicely complement a sense of creativity, ownership and pride that users can and should be encouraged to feel about their information structures.

In certain embodiments, the spatial representation depicted by the graphical user interface allows the user to visualize the information tag groupings and sub-groupings of the present invention as branches on trees within a forest; retrieving the information the same way it came in—and the way the user thinks about the topic—are central themes of the present invention.

The elements of beauty and grace are also basic aesthetic properties of a natural tree. A sense of beauty and discovery is tightly linked to the user experience of the present invention, where the activity of linking information, editing relationships and retrieving information is not only associative, but should be fun and entertaining for the user. Despite work toward creating computer systems that automatically facilitate human-browsability with meaning to the user to organize vast seas of information, such as has been tried in the fields of Semantic Computing and Semantic Web, scalable systems of this kind have not yet been created. Indeed, since meaning is largely subjective to the user, it is quite possible that such a system will never be built—especially without the user playing a significant role in specifying the criteria for that meaning. Thus, it is up to the user to create organic structures that represent the way the user thinks about his or her information in accordance with certain systems and methods of the present invention. As with the Library-of-Congress embodiment described above, the forest view embodiment of the present invention can foster similar senses of beauty, exploration, and fun. Excitement and entertainment are vectors that can and should be exploited in these everyday computing experiences. And here again, these vectors complement a sense of creativity, ownership and pride that users can and should be encouraged to feel about the information structures that represent their knowledge.

Within a system of an embodiment of the present invention, the hierarchy and/or spatial location representation of tags and groupings of tags may be varied by the user over time as the user's preferences and visualization of how he or she would like to group information changes. For example, in a Bonsai Mode example, a user may think of the tagging information structure as a tree that can be pruned and reshaped by the user. In an embodiment, an interactive timeline such as may be found in the Apple Time Machine backup retrieval system would enable the user to iteratively see the development of the user's associative linking and information structures of the present invention over time, as they were iteratively modified by the user in the past.

Figure 7A:
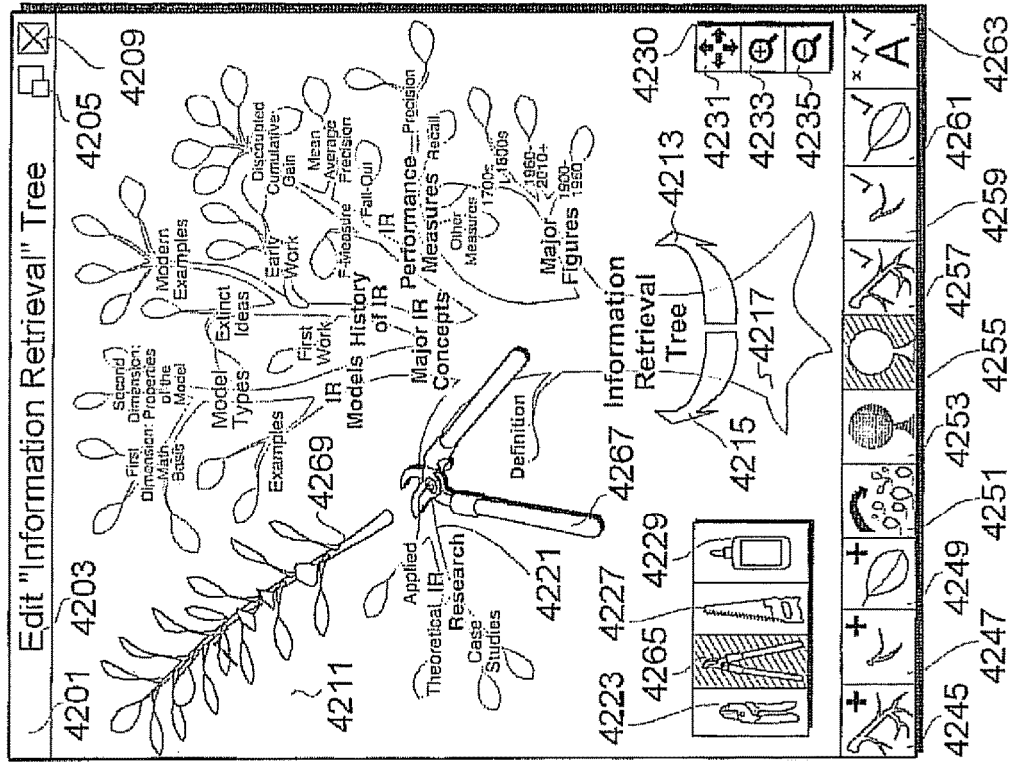
FIGS. 7A, 7B, 7C and 7D are illustrative diagrammatic depictions of user display interface screens of a three-dimensional tree editing interface in accordance with an embodiment of the present invention, showing a sequence of pruning and grafting branches and leaves from one part of a tree to another.

Exploring a tree one day, a user might find a "sucker" (a sub-branch of leaves on a tree that can be seen as sticking up vertically from a larger branch) conspicuously different from other branches that usually diverge at non-vertical angles, as shown in FIG. 7A. To an arborist, a sucker is a natural artifact of real trees—and is most often seen as a target for pruning. In an embodiment of the present invention, a sucker on a virtual tree would represent information nuggets that have been previously "dumped" onto the tree at a single connection point, and perhaps forgotten about. For example, the user may have recently found a large volume of 17 papers, each of which interested the user, where all are relevant to a general subject (say, for example, the topic of Personal Information Management, or PIM), that would be represented by an entire virtual tree according to the present invention. These papers, from a recent conference, were all stashed on the tree for later sorting—for example, the user may have used a type-S tagging tribunal to drag all these papers over to a Personal Information Management listing, which is a sub-category of Human-Computer Interaction.

Using such a virtual-tree-pruning-and-grafting graphical user interface, as shown in FIGS. 7A, 7B, 7C and 7D, the user may later prune the sucker branch off of the tree (FIG. 7B), clipping and distributing the new material (FIG. 7C) and placing the material into more relevant and appropriate areas around the tree (FIG. 7D), associatively linking the papers with the notes that the user took at the conference when the papers were presented, for example, any photos that the user took of the presenter's slides, and/or the presenters' presentations (if available). Then, based on sub-categories of the PIM field, and/or people working in the PIM field, and/or a host of other different ways of thinking about the field, the user can redistribute these papers or paper/note/image/presentation "twigs", linking them to the tree in ways that make intuitive sense to the user. Later, when the user seeks one of the papers from this conference, he or she will be able to go directly to the PIM tree, and leverage the visual representation of the conceptual sense he or she had made of the tree earlier to find the sought information, and refresh his or her memory as to the relationships, history and associations the user made in his or her mind prior to reshaping this tree.

In accordance with an embodiment, where the tagging taxonomy has a three-dimensional spatial representation, three-dimensional navigation is facilitated. For example, in FIGS. 7A through 7D, hovering over the two-headed arrow 4211 at the base of the tree rotates the tree in 3D space, revealing areas of the tree that may initially be occluded in the two-dimensional view. In an embodiment, the grid next to the tree may be either a calendar to associate the items with dates and/or times, or a grid filled with icons, each of which connotes a category of context (place, time, date, interest, priority, etc.) that, when an item on the tree is dragged to the icon, a contextual or fly-out menu pops up in spring-loaded fashion after a brief delay to reveal further choices, such as those shown in the type-S tagging tribunal.

Figure 7B:
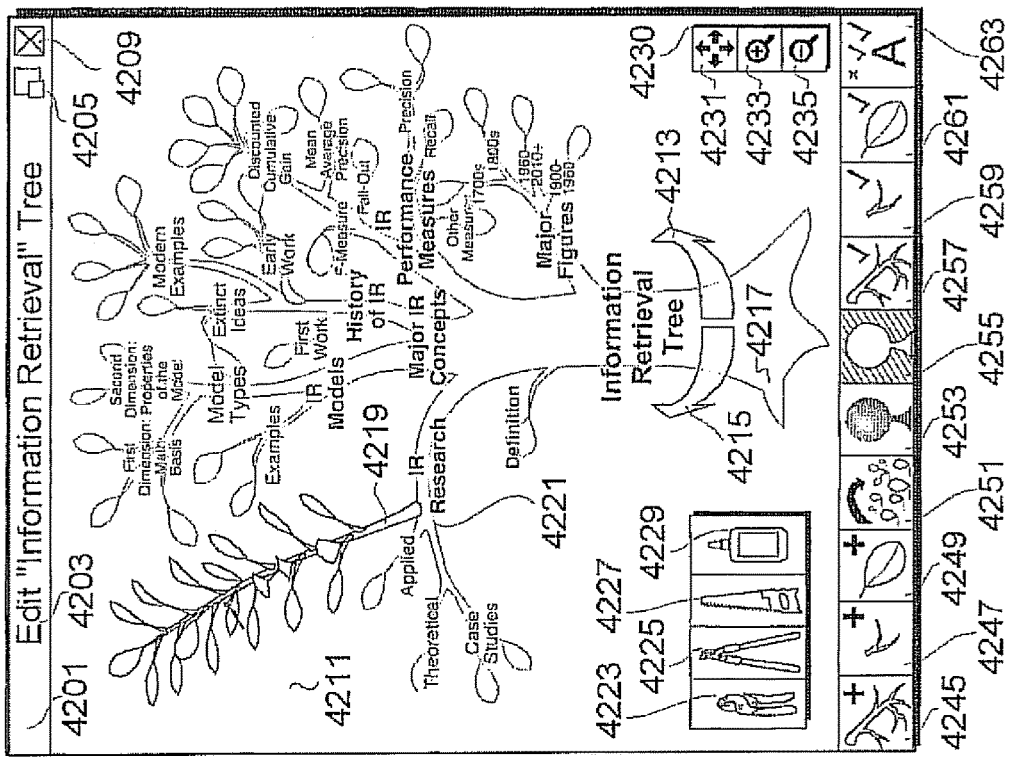
Figure 7D:
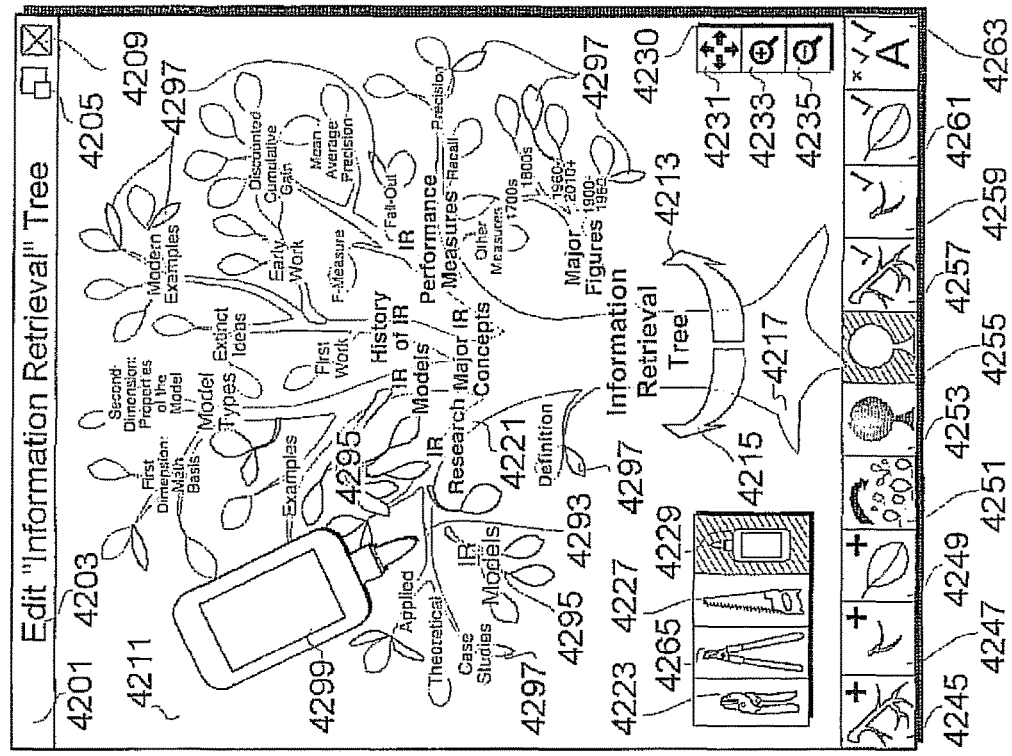

In the embodiments of FIGS. 5A and 7D, as the tag structures are altered by the user through pruning and/or grafting, trees are reshaped to maintain or enhance their natural beauty and elegance throughout the process, which may be made to visually correspond with a mature understanding of a topic or field. The end user may experience the satisfaction of nurturing the growth of his or her tree(s)—growth that represents the proliferation of informational complexity, which is mirrored by the aesthetic complexity of the virtual tree: A young, simply-shaped sapling, possibly representing the initial explorations of a subject that is new to the user, slowly transforms into a majestic shade tree with many branches, twigs, leaves and fruit—reflecting the growth process of the user's own learning, deepening understanding and/or knowledge of the subject matter.

In accordance with an embodiment, all data silos on a personal computer, web server and/or mobile phone converge; contacts, tasks, calendar items, projects, notes, documents, images, movies, audio files, web pages and/or other computer data types are intimately interlinked and visualizable via multiple means. Thus, a timeline viewer (in accordance with an embodiment) is equally adept at showing a timeline that displays the relationships of events and key Figs. in ancient Mesopotamia, a timeline that shows the birthdays of friends and family, a timeline that shows a family's lineage, or a timeline that shows items that need to be worked on in a project list (and are due in the near future).

Figure 6A:
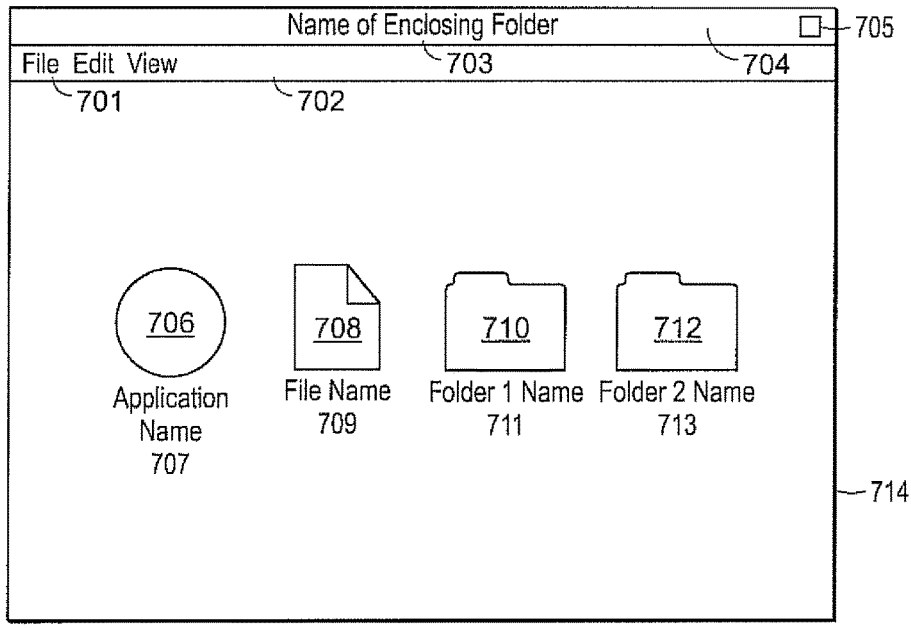
FIGS. 6A, 6B, 6C and 6D are illustrative diagrammatic depictions of a sequence of screens in a system of an embodiment of the invention that a user might see when first setting up a tagging and visualization system in accordance with an embodiment of the invention.
Figure 6B:
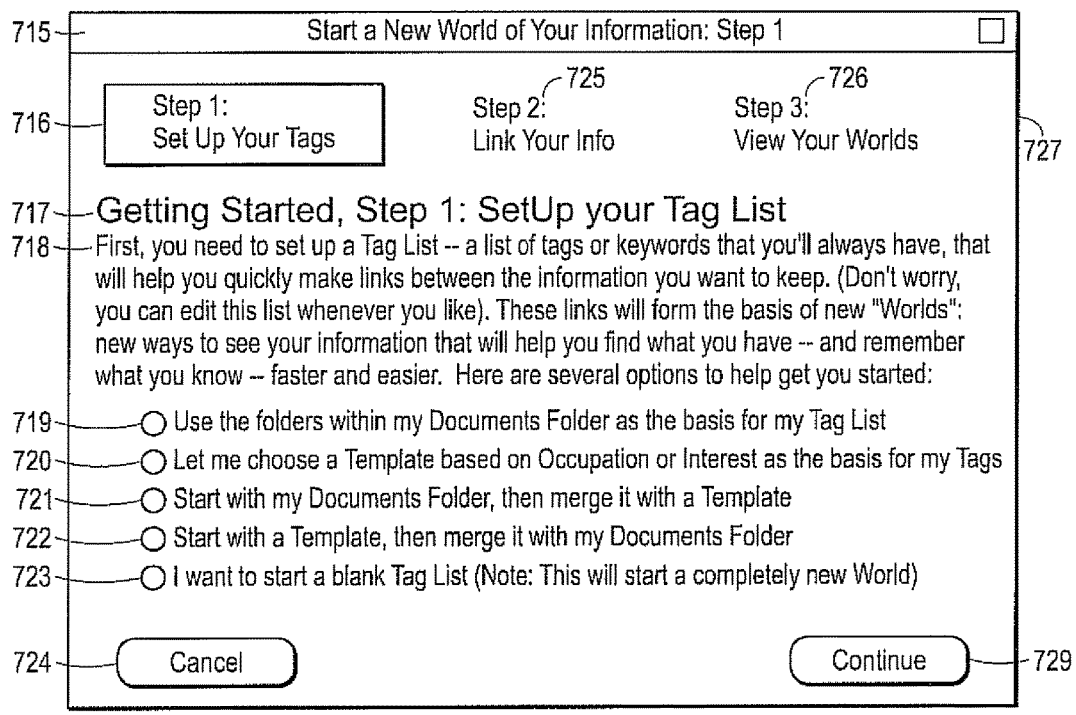
Figure 6C:
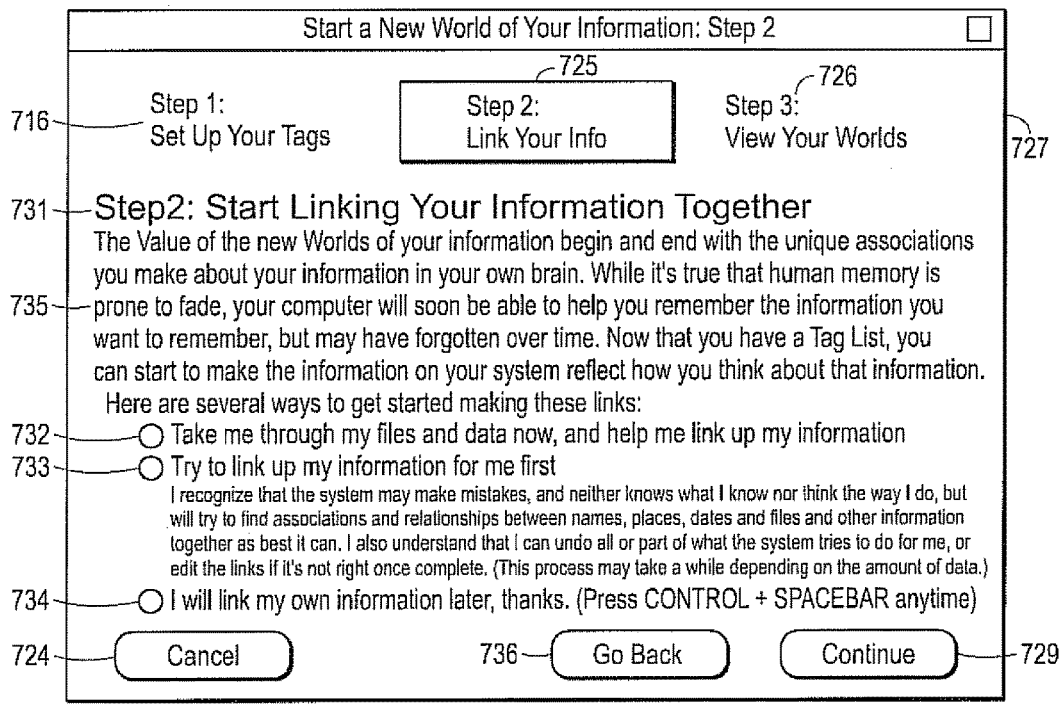
Figure 6D:
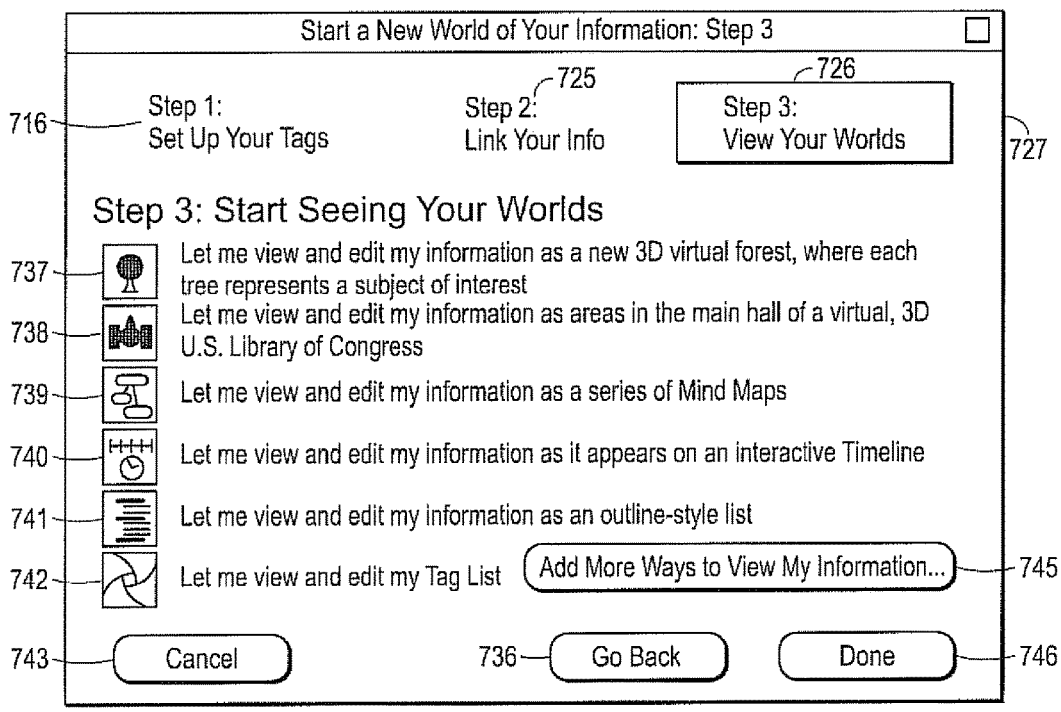

FIGS. 6A, 6B, 6C and 6D show a series of four graphical user interface (GUI) windows on a user's device in accordance with an embodiment that show how a user might first set up a new tagging and visualization system in an embodiment of the present invention. In FIG. 6A, a window drawn by the computer's native OS and File System shows a recognizable set of features of a GUI common to most modern operating systems such as Windows, Mac OS X, or Unix. Grabber bar 704 features the name of the folder 703 and a close box, 705 (representing the wide variety of icons and functionality of such window manipulation tools). Beneath the grabber bar is a menu 702, populated with standard menu items such as 701. Inside the window's display area 714, are displayed various icons—one for an application 706, a file 708, and two sub-folders 710 and 711. Beneath these items are their names; 707 709, 711 and 713, respectively. It is application icon 706 that, in this embodiment, represents the present invention. The user opens the application by double-clicking the icon, selecting the icon and selecting File Menu 701, and then "Open" from the revealed menu, or by any one of several alternate means.

FIG. 6B reveals the first of three dialog box-style windows 727, representing three major steps in setting up a new tagging and visualization system in an embodiment of the present invention. Across the top of the new dialog box window, beneath grabber bar 715 are 716, 725 and 726, textual representations of the three steps. Text box 716 is highlighted by a surrounding box, marking that the step name Step 1: Setting Up Your Tags is the current step, and the first step in a simple three-step process. The window's main header text 717 helps confirm and elaborate upon this three-step process for the user. Instructions 718 guide the user as to what needs to be done, why, and what the user will do with the results of this step, in which the user sets up their initial list of tags to be used by the system. In this embodiment, the user is presented with choosing one of five options via radio buttons 719, 720, 721, 722, and 723. Once the user makes a selection, s/he has the option of continuing to the next step by pressing button 729, or canceling the transaction by pressing button 724, that will have the effect of exiting the application, perhaps popping up an additional dialog box (not pictured) asking, "Are you sure you wish to cancel? Doing so will exit the application and lose any data you may have been working with," with another "Cancel" button highlighted, and a "Go Back" or "Continue" button in the dialog box as well.

The five radio buttons in FIG. 6B represent five options, each with a clearly worded label. The first option 719 enables the user to use the folders within the user's Documents Folder on their hard drive (assuming there is a hard drive) as the basis for her tag list. In this case, the folders found within the user's Documents folder are converted into tags, and any hierarchical structure is initially preserved. The tag list so generated becomes the basis for the user's tagging system, which can be edited by the user at will later on. The second option 720 lets the user choose a template based on an occupation or interest as the basis for the user's initial tag list. A list of available tagging templates would be subsequently shown to the user, and the user could browse from among templates of interest according to a taxonomy of fields, professions, specialties, interests and/or other criteria. In an embodiment of the present invention, such a browsable list of tag templates might ship with the software; in another embodiment, the list would be available via the World-Wide Web (Web), or via other means.

The third option 721 enables the system to start with the folder structure within the user's Documents Folder as a basis for the initial tag structure, and then add separate lists at the end of the initial tag list that structure with the one or more optional templates reflecting an occupation, field of specialization, hobby or special interest of the user as described above. The fourth option 722 enables the user to start off by selecting a tag template such as specified above, use that structure as the core of the tag list to be used throughout the system, and then have the system add in the folder structure found within the user's Documents Folder as an adjunct structure. The fifth option appearing in this embodiment enables the user to build a tag list from scratch, starting with a blank tag list. Such an option might be useful for a brand-new computer user who has no initial vocation, area of specialization, or folder structure on which to build. Even new users are encouraged to start with a template of tags, since the full list of templates may include templates for novice users as well.

FIG. 6C shows Step 2 of the process, after the user has selected an initial list of tags—or chosen not to do so in Step 1 as described above. In Step 2, the user is guided in starting the process of linking her information together to start building context and meaning to her information. Note that Label 725 is now highlighted, the window header 731 has changed, as have instructions 735 and the options below it. Here, the user is presented with three options, in the form of radio buttons. Selecting radio button 732 and pressing Continue button 729 may convene a tagging tribunal that includes a Continue button (similar to button 729), that takes the user sequentially through each element of their files and data, enabling the user to begin linking their most-used files, most-used contacts, most recent upcoming events, most pressing to-do items, and/or following some other option that the user elects. Using machine-initiated suggestions such as those found in FIG. 4's sub-panel 466, linking "By Relevance", in addition to sub-panels 417 and 463 (linking "By My Favorites" or "Most Recently Used," respectively, users are presented with concise, relevant options for linking that are close together in proximity, making for a potentially fast process. Depending on the amount of data and files the user opts to begin linking together in this initial process, the system may suggest that the user take a break after a while, and continue later on.

The second option (733) in Step 2 (FIG. 6C) enables the user to request that the system take an automated first try in linking the user's information together automatically. This option has its advantages and disadvantages. Among the advantage are the following: First, this process may free the user from the potentially long and tedious task of linking all of her data together exclusively manually. Second, there are many simple algorithms that may be employed to help the system begin the process of automated linking. Finding matching text and phrases in information nuggets and tags is a simple search process, even though it may take some time to execute. Once found, these matches may prompt the system to link these items together. Disadvantages include the fact that the user is not directly involved in this initial linking process, and thus may not have as much awareness of the associations being made on her behalf—leading to the possibility that some links may not reflect the user's desires or intentions. The user may of course edit these associations later, upon finding them, so this disadvantage may or may not be an issue. Another disadvantage is simply that the system may make incorrect links that the user would never make, leading to more work for the user undoing the errors later on. Still, for most users, this initial assistance with linking may make a net positive experience, especially in cases where the user would like many thousands of information nuggets linked together.

The third radio button 734 on the Step 2 screen features the option for the user to begin creating her own links manually at the user's convenience. The user is reminded of the keystroke presses to convene and end a tagging tribunal (for example, "Press CONTROL+SPACEBAR anytime").

If the user has selected either of the first two initial linking strategies 732 or 733 in Step 2, pressing Continue button 729 brings them to one or more windows in which they are able to perform the desired actions (not shown). Once these actions are complete, or (in the case that they select Radio Button 734, the system brings them to the Step 3 screen (FIG. 6D), which is essentially a launching point for using the system as a whole after the initial one-time set-up process. In window 727, the user is presented with a series of six icons (737, 738, 739, 740, 741 and 742) together with their descriptions. These same icons may be found on repositionable navigation palette 482 that is designed to float above the information on screen wherever the user may be in the system, as shown in FIGS. 3A, 3B, 4, 5A, and 5B. Icon 737 enables the user to view and edit their information as a new 3D virtual forest, where each tree represents a subject of interest. Icon 738 enables the user to view and edit their information as spatially dedicated areas in the main hall of a virtual, 3D U.S. Library of Congress building. Icon 739 enables the user to view and edit their information as one of a series of concept maps or mind maps. Icon 740 enables the user to view and edit their information as it appears on an interactive timeline, an example of which is shown in sub-panel 498 in FIG. 4. Icon 741 enables the user to view and edit their information as an outline-style list. Icon 742 enables the user to view and edit their tag list, as it will appear in the tagging tribunal and elsewhere. Pressing button 745 enables the user to add additional worlds to view their information, as new viewing worlds become available.

FIGS. 7A, 7B, 7C and 7D show a sequence of user actions to edit a 3D tree, within a screen mockup of a Tree Editing Window (referred to herein as Bonsai Mode, after the Japanese tradition of hobbyist-artisans who carefully prune and shape miniature trees) according to an embodiment of the present invention that includes a 3D forest-type viewer world as shown in FIGS. 5A and 5B. FIGS. 7A, 7B, 7C and 7D all feature a number of common tools and other elements. Each of these four figures features a grabber bar 4201, a title 4203 within the grabber bar displaying the name of the tree and the action being performed, and two icons 4205 and 4209, for expanding or shrinking the size of the window, and for closing the window, respectively. Each figure features an editing area 4211, and within it, two floating tool palettes: One palette 4230 features view-changing tools such as panning (moving horizontally or vertically) 4231, as well as zooming in (4233) and zooming out (4235). The second palette features pruning and grafting tools somewhat similar to those used by professional arborists. This pruning/grafting palette includes a shearing tool 4223 for clipping leaves and twigs (separating them from their current location for moving elsewhere), a lopper tool 4225 for clipping branches; a saw tool for cutting major limbs, and finally a glue bottle tool 4229 for grafting (attaching) leaves, twigs, branches and major limbs to desired new locations on the current tree or other trees.

The toolbar at the bottom of FIGS. 7A, 7B, 7C and 7D are also identical. These include, from left to right: 1) an add a new branch tool 4245; 2) an add a new twig tool 4247; 3) an add a new leaf tool 4249; 4) a place the currently-selected element on the ground for later sorting tool 4251; 5) a show this tree in three dimensions tool 4253; 6) a show this tree in two dimensions tool 4255 (which flattens the tree into a plane, so the user can see all leaves and limbs without having to rotate the tree; this option is currently selected, and shown on screen); 6) a show or hide all branches tool 4257; 7) a show or hide all twigs tool 4259; 8) a show or hide all leaves tool 4261; and finally a show or hide labels tool 4263. Note that the icon for this last tool features three small icons running across the top: Either an "x" or a check mark, small medium and large. In an embodiment, clicking on the smallest check mark or "x" will hide or show labels for the leaves; clicking the middle mark shows or hides labels on smaller branches; clicking on the largest mark shows and hides labels for major limbs. Clicking in the lower portion of this icon shows and hides all labels, including the tree name label on the trunk.

Two additional tools, arrows 4215 and 4213 that seem to partially wrap around the trunk of the tree, enable the user to dolly around the tree 4217, the focus of this editing task. The term dolly comes from the motion picture industry, and means rotating around an object at a fixed distance, always facing the object. This action is particularly useful when the tree is in full 3D mode, rather than in the flattened, 2D view as shown in FIGS. 7A through 7D.

In contrast to the hobbyist user's cooking forest in FIGS. 5A and 5B, the user that created the tree in FIG. 7 is a researcher in information systems. Accordingly, this tree represents the user's knowledge of the field of Information Retrieval. In the present scenario, imagine that the user has recently returned from a conference focusing on Information Retrieval. The user has a good deal of media s/he would like to keep, and keep in context, from the conference. The material, in the form of PDF papers from the conference, the conference schedule, notes the user took at the paper presentations, some of the slide-show presentations themselves, contacts the user met at the conference, photos the user took on her camera phone, and video s/he took of a key presentation. Also included here are action items the user wishes to execute, calendar events to remind her of the events s/he attended at the conference, and a few things of even greater value than all the others: 1) new ideas, 2) news of new research findings (complete with an understanding of the background and motivation of the research, the protocols and methods used, the apparent validity of the studies, and the scientists that conducted the research), and 3) new principles and examples of new information retrieval models and systems. These are the items of most value to the user; the information that will help the user be more effective at her job. These are the items s/he wants most to retain. The files, the media, the contacts—all of those artifacts reflect her new knowledge, but they do not currently exist in a form that will serve as a refresher course in this knowledge every time she looks at it.

On her laptop on the late-night trip back from the conference, the exhausted user convened several tagging tribunals, and associated all the new information nuggets in the Research tag within the Information Retrieval tag heading in the tribunal. She would sort through this material later, when she was rested. The process the user is undertaking now, reflected in the sequence of FIGS. 7A, 7B, 7C and 7D, is unpacking these data, notes and media from her trip. In her forest-type viewer world, all the new material from her trip is represented as a single, leafy stalk 4219, sticking more or less straight up, attached to the limb labeled "IR Research" (4221) on the Information Retrieval tree 4217.

To arborists, the vertical, leafy appearance of stalk 4219 is a common occurrence on real trees. As discussed above, such vertical branches on fruit trees (suckers) do not bear fruit; instead, they draw the tree's energy away from fruit production. From an aesthetic perspective, a well-pruned tree devoid of suckers is often regarded as a thing of beauty; conversely, a fruit tree not pruned for a long time often yields many suckers, giving the tree a wild, spiky, unruly appearance. Consequently, arborists and landscapers that prune real trees professionally try to remove these suckers whenever they encounter them. One of the many benefits of a forest-style metaphor for information storage and retrieval as depicted in an embodiment of the present invention is that many such parallels may be found between the appearance of well groomed trees and the order of well-organized information—just as parallels exist between wild-looking trees and disorganized information.

Figure 7C:
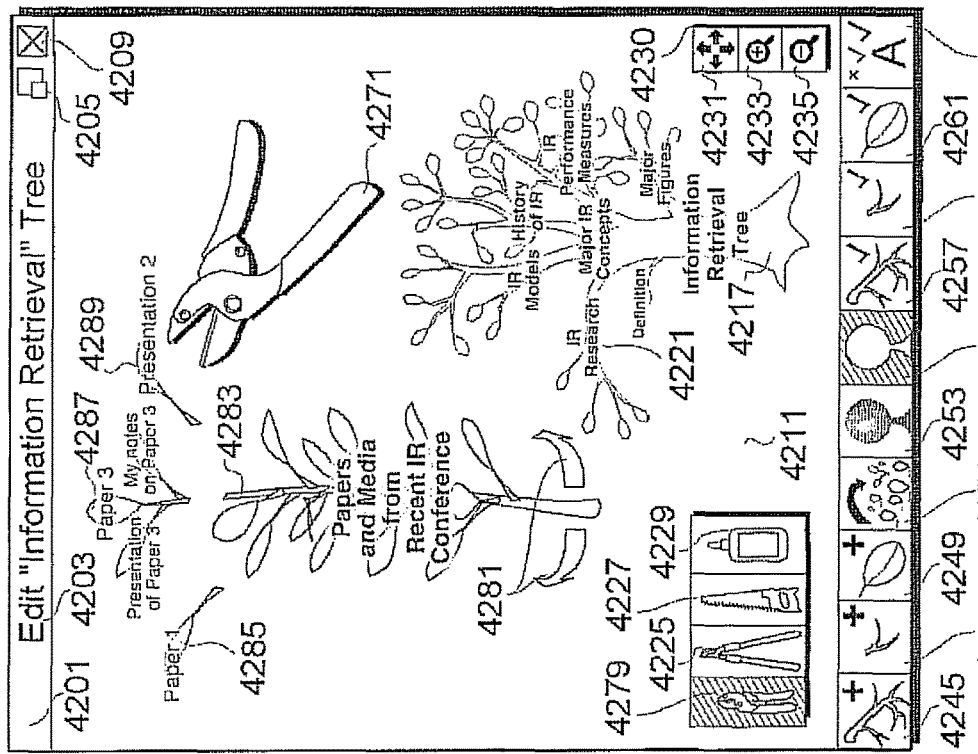

As the user enters the editing window, the first thing she may notice is the sucker 4219. Her first task is to prune it off of branch 4221. In FIG. 7B, the user has selected the Lopper tool, now highlighted in the tool palette 4265, and visible in the editing window as large Lopper tool 4267. The user has used tool 4267 to prune off the sucker, which is now item 4269, independent as it is from tree 4217. In FIG. 7C, the user has selected the pruned sucker 4283, making it the object to be edited, with new dollying arrows 4281 appearing at its base. Tree 4217 has receded into the background with the focus having changed to the pruned stalk. The user has selected the shears 4279 in the tool palette, which stowed the large lopping tool back in the tool palette, revealing large pruning shears 4271 to be used for partitioning the pruned stalk 4283. In this figure, the user has begun to prune leaves and twigs off of stalk 4283 in meaningful associations, such as twig-and-leaf cluster 4287, as well as pruning off individual leaves 4289 and 4285.

In FIG. 7D, the user has completed the shearing process and has stowed tool 4271. Instead, the grafting glue tool 4229 in the tool palette has been selected, and the user is nearing completion of her task. A wide variety of various leaves and twigs 4297 have been added to various areas around the tree. In fact, the user is manipulating the large grafting glue tool 4299 to specify precisely the spot 4293 where the last piece of the sucker, new branch 4295, representing recent research in IR Models, will be grafted onto limb 4221. (Note that the user may at some point choose to modify that name, as it might be confused with the limb "IR Models" already on the tree.)

The differences in both underlying structure and resulting capability between the user interface (UI) of a conventional operating system's file system and those of embodiments of the present invention are significant. FIGS. 9A and 9B contrast the structure of the file system between these two systems, while FIGS. 8A, 8B and 8C illustrate some of the advantages in the capabilities of an embodiment of the present invention over a conventional OS file system UI.

Figure 8A:
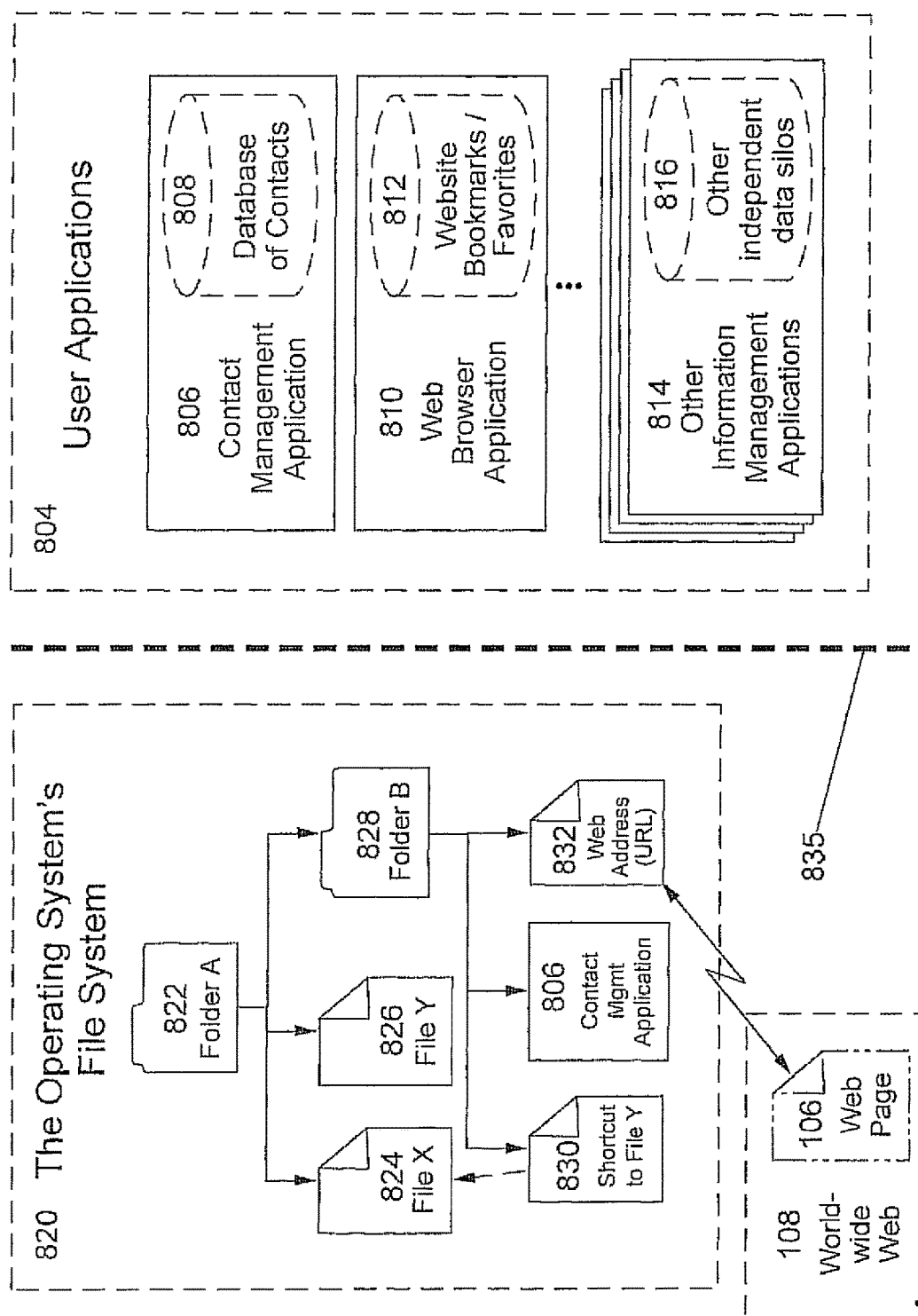
FIGS. 8A and 8B are diagrammatic illustrative file-relational diagrams of a file system in a conventional graphical user interface (FIG. 8A) and in a system in accordance with an embodiment of the present invention (FIG. 8B)
Figure 8B:
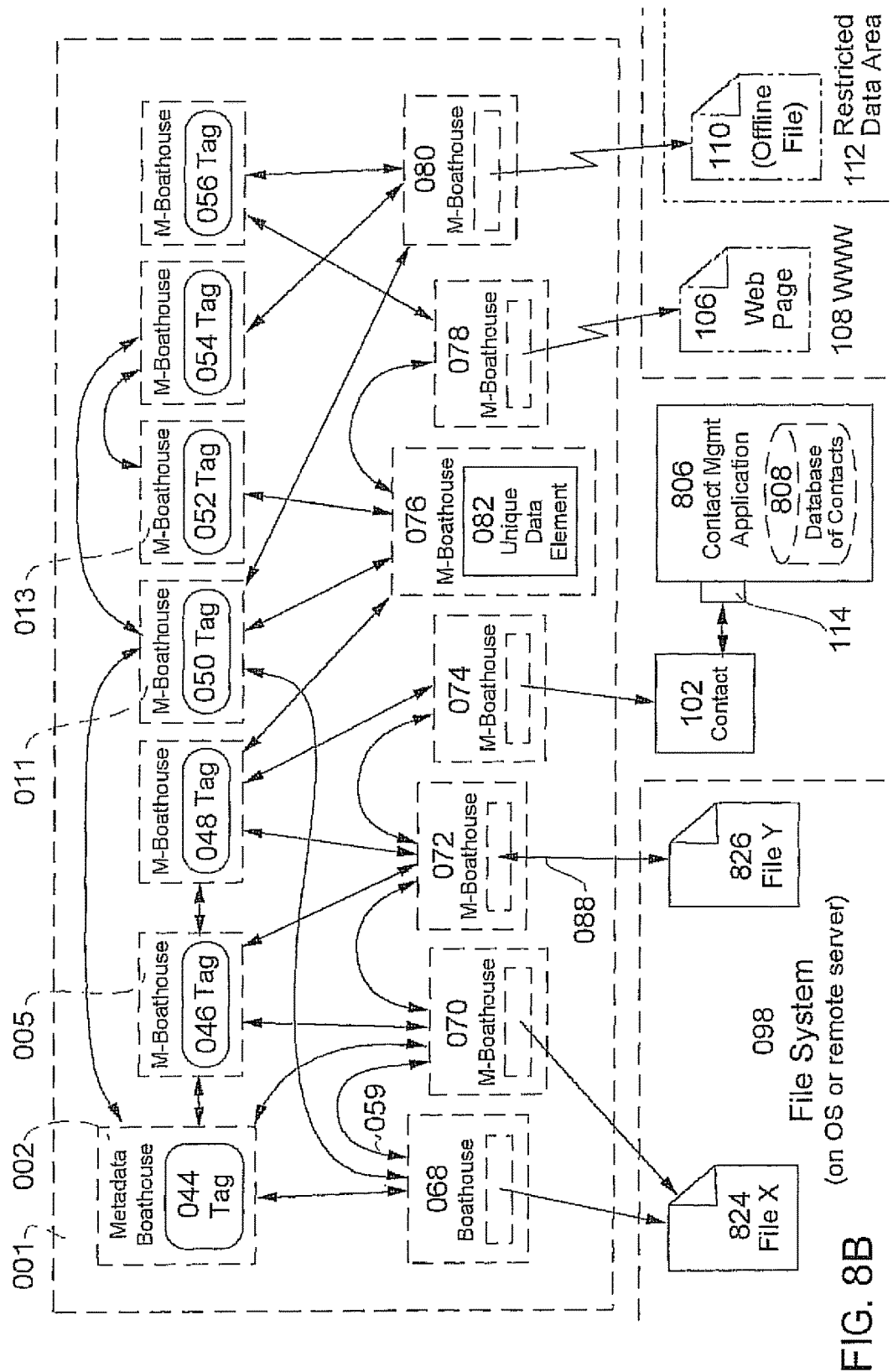
Figure 9A:
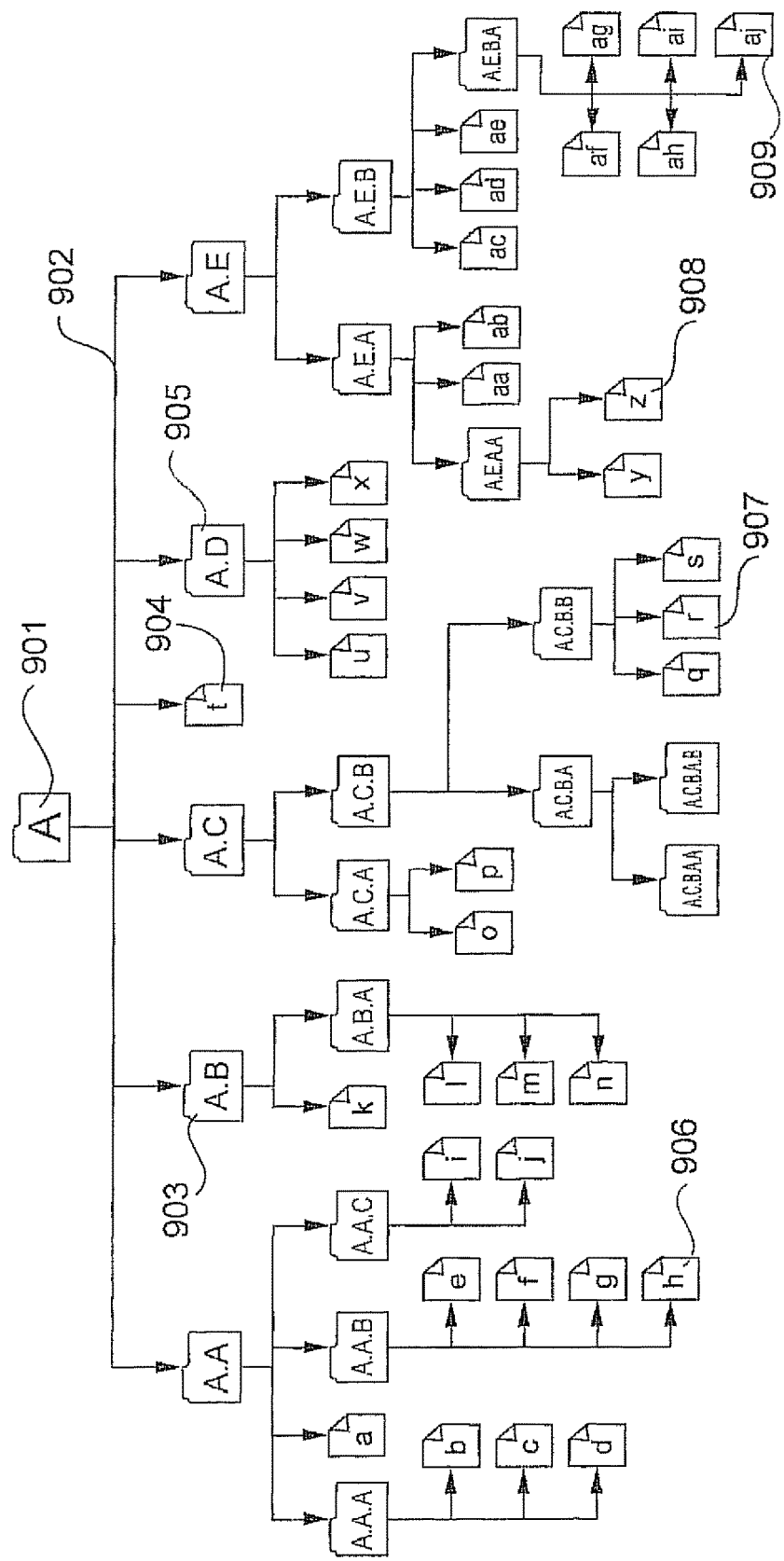
FIGS. 9A, 9B and 9C are diagrammatic illustrative information-associative diagrams regarding how information is made available to a user in a conventional operating system's file system (FIG. 9A) and in system in accordance with an embodiment of the present invention (FIG. 9B) as well as an augmented version of a system of an embodiment of the present invention that includes enabling architecture (FIG. 9C)

In FIG. 8A is box 820, representing a simplified version of a typical OS file system structure before it is presented to the user. Folder A (820) contains three items: File X (824), File Y (826), and Folder B (828). Folder B (828) in turn also contains three items: File 830, which is a shortcut to File Y (824), similar to an alias file on the Mac OS; a Contact Management Application icon 806, and file 832, which is primarily a web address (or URL) in the form of a file. The user opens the file, which in turn opens a web browser with Web Page 106 appearing on it, as web page 106 is available on the World-wide Web (108). It is assumed, for the purposes of this abstract and simplified illustration, that the file system maintains a registry of each item in box 820, along with a limited amount of metadata for each item as is typical of modern-day file systems, such as the file's name, access privileges, date created, date last modified, file type, possibly a checksum, and perhaps a few other pieces of information about that file.

To the right of this simplified representation of a typical OS is another dashed-line box 804, representing a similarly simplified set of user applications or programs. Inside this box, accordingly, is the contact management application 806 that was represented by icon in box 820 on the left. Application 806 is said to contain a database of contacts 808, although such dedicated databases are often stored outside the program itself. Because application 806 is the primary, if not sole user of database 808 (or one of the few, as shall be discussed later), it is shown inside application 806. Web browser application 810 similarly is shown to contain database 812, as database 812 was designed specifically to store the browser's website favorites or bookmarks—although the file or files containing the actual database is usually stored separately from the application file. Other applications that store and manage data for the user are shown in a stack of boxes 814, each of which "contains" its own database of user information, as is represented by database 816. Applications that perform roles other than managing databases of information for the user are certainly present on nearly any given personal computer (PC) system or other personal digital device of sufficient complexity, are not pictured in user application box 804.

There are elements in common between elements in file system box 802 and those in user applications box 804. For example, contact management application 806 is shown as an application in box 804 and as an icon representing that application in box 820. But on typical modern digital systems, there is a functional wall between data from user applications on one hand, and the operating system's file system on the other. The thick vertical dotted line 835 between boxes 820 and 804 represents this wall. It marks the fact that, by their nature, neither file systems nor user applications on modern day operating systems support a fluid interchange between files on the one hand, and data managed by user applications on the other. While there are, technically speaking, exceptions to this rule (as illustrated here by Web Address file 832 in file system 820), in general it is rarely easy for users to place elements of data from user applications into the file system. Nor do users have a great deal of motivation to do so. Conventional hierarchical file systems, represented by windows with icons and/or lists of files in them, simply do not offer much reason to clutter them up with data that is already represented neatly in one or more applications that use that data and keep it in a single database. It should be noted that many applications of the present invention feature the ability for the user to associate files from the OS file system with one or more elements of data within the application. Examples of this capability may be found in many concept-mapping tools such as MindManager, MindView and PersonalBrain, available for Windows, Mac OS and Unix platforms. Another example is OmniFocus, a To Do management application for Apple Mac OS X that enables users to drag and drop a file icon onto a task to create a link to the file and an iconic representation of the file within OmniFocus. Double-clicking the file's icon in the OmniFocus window will open the given file (and the file's application, if not already open), providing the user with a shortcut to the desired file. The link however, is unidirectional; only OmniFocus points to the file. The file itself is unassociated with OmniFocus or the task that links to it.

While shortcut files or aliases may be made by users in the file system of most PCs, they are seldom generated by users in practice. It is, in fact, primarily applications that create such aliases for the user, whether on the Windows desktop or in the Mac OS X Dock, upon installation of new software.

The potential benefits of being able to comingle such files and data together, as well as to casually make multiple representations of information nuggets, are manifold, are discussed below with reference to FIGS. 9A, 9B and 9C. In addition, the benefits of enabling the user to quickly and easily make multiple links between information nuggets, as well as multiple links between folders (or rather, more abstractly, between tags that are linked to files and other information nuggets), as well as between information nuggets and tags, are also great, as will be shown.

FIG. 8B shows an architecture for enabling such comingling, as might be seen in an embodiment of the present invention, in a form similarly simplified for comparison to that of FIG. 8A. In FIG. 8B, the concept of a Metadata Boathouse, or M-Boathouse for short, is introduced, and shown throughout the figure. A metadata boathouse is essentially a small file containing additional metadata for each information nugget that is inducted into an embodiment of the present invention, whether manually or automatically, as suggested in FIGS. 3, 4, and 6C. An M-boathouse either includes the information nugget itself, if the nugget is very small (such as textual tags 052, 054 and 056, or a brief textual quote or similar item, as shown in unique data element 082) or a robust pointer to the file or other information nugget that the M-boathouse represents, whether or not the actual information nugget is available to the system at the time.

The key here is availability: A metadata boathouse such as 048, 072 or 078) acts as a reliably persistent item within the system for other items to point to, even if the information nugget it represents is unavailable. As information is increasingly available online, and access to that data is either not reliable (as on a laptop or cellphone without access to the Internet) or specifically restricted (as sensitive financial information may be restricted to being available only on an office computer system where the user works, and only when the user is on the premises), the need for systems that can gracefully account for unavailable information only grows. The information nugget, therefore, is the boat in this metaphor. Whether or not the information boat is available, the metadata boathouse is always there, on the user's system. In a compact and stable package, therefore, the metadata boathouse is the item that other information nuggets and tags (or more accurately, the M-boathouses associated with those information nuggets and tags) can reliably link to. Likewise, the M-boathouse is also the repository of links to other M-boathouses that represent information nuggets or tags that have been associated with this information nugget.

In FIG. 8B, the top row of objects in box 001 are metadata boathouses that all represent (and in this case, contain) rounded-cornered textual tags. The middle row of box 001 is comprised of M-boathouses that point to the bottom row of items, which are all data nuggets residing in various locations. The M-boathouses representing tags on the top row link variously to one another, as well as to M-boathouses representing information nuggets below. For example, metadata boathouse 002 contains tag 044, and contains bi-directional pointers (in this document known heretofore as Bi-directional Links, or simply Links) to four other M-boathouses: 005, 011, 068 and 070. M-boathouse 070, in turn, links back to M-boathouse 002 as well as to M-boathouse 005, which contains tag 046. The boat for M-boathouse 070 is File X (824), which resides in file system 098—the same file 824 shown in file system box 820 in FIG. 8A. Note that M-boathouse 068 also points unidirectionally to File X (824), and that M-boathouses 068 and 070 link to one another (arrow 059). If not already clear, the reason for the redundancy of M-boathouses 068 and 070 will be made apparent in FIGS. 9A, 9B and 9C. M-boathouse 078 points to web page 106 on the world-wide web 108, as any URL file such as 832 in FIG. 8A would do. M-boathouse 080 points to offline file 110, which is in a secure, restricted data area 112 on the web that the user, working from home for example, may lack access to.

M-boathouse 072 points to a single File Y (826), as well as linking to its M-boathouse neighbors. Note that pointer 088 to File Y (826) is bi-directional. This link suggests an embodiment of the present invention in which some or all files have, as part of the metadata built into the structure of the files (and/or the file system), a pointer to one or more M-boathouses. Such a scenario would provide an additional layer of robustness to the linking system. The neighbor to the right of M-boathouse 072, M-boathouse 074, does not point to a file per se, but to contact 102, which is an element of data from contact management application 806—or, more specifically, from the database of contacts 808 associated with application 806. Contact 102 is made available to the system via a plug-in (a piece of software code written to work with an application to extend its functionality and/or access to its information) 114, or via the software architecture of the application 806 and/or the database 806 itself, or by a plug-in to an embodiment of the present invention, or by some combination, or by some other means.

The file M-boathouse 072 links to data M-boathouse 074—and both file and data element are seamlessly linked by means of M-boathouses to various tags and/or other information nuggets, cannot be overstated. This ability to link seamlessly from one information nugget to another, regardless of file type, data type and/or availability, provides the underlying information architecture that enables one or more embodiments of the present invention, providing substantial value to the user.

An additional benefit to the user is that, with an information architecture such as is represented in FIG. 8B, the system is able to more effectively manage duplicate files. It is not technically difficult for a modern operating system to include a utility program that automatically checks for the many duplicate files that are stored among the tens of thousands, and in some cases, millions of user files that may be found on a typical PC, comparing even the limited metadata included in the code of the files themselves, and culling duplicates. At the very least, such as a system could sequester potential duplicate files, and alert the user to their presence. Once deleted, such a utility could potentially free up gigabytes of the user's drive storage space. However, the user interface model underlying all modern command-line and graphical user interface (GUI) file systems does not currently support such efficiency. Even known Spring Cleaning utilities often do a poor job of duplicate file management, often leaving users with applications that no longer function due to utility's inability to differentiate between critical system files and others that are more expendable. Similarly, such duplicate file management utilities fail to take into account the myriad applications that depend on brittle links to files in the file system for their proper function. In an embodiment, either the operating system, or a utility application, or an element of the present invention, or some other subsystem could be made to go through the user's files, regularly and automatically, culling duplicate files, reassigning all pointers to those files to M-boathouses that point to a single copy of the file, placing the duplicates in the trash or recycling bin, and alerting the user that these files may be safely discarded.

FIG. 9A graphically represents a conventional hierarchical file structure for a file system. Folder A (901) may, for example, represent the top-level folder of the C: drive on a Windows PC, the Hard Drive on a Mac OS X system, or the root directory of a Unix file system. Folder A (901) contains various folders and files (in this case a single file, 905), represented by network of arrows 902. Each of the folders is uniquely identified by a capital letter and period scheme. Files, likewise, are uniquely identified by lower case letters. As with typical file systems, some folders are shallow, such as Folder A.D. (905) containing no further sub-folders; other folders are more deeply nested, such as Folder A.B. (903). Note that FIG. 9A is in a familiar pattern to engineers and scientists.

FIG. 9B shows the same file structure as FIG. 9A, but displayed in a structure resembling a real tree, in an embodiment of the present invention. In contrast to the structure shown in FIG. 9A, the tree in 9B is upside-down, more compact and, arguably, more aesthetically pleasing to the eye. FIG. 9B's tree is actually shown flattened—that is, in two dimensions, as if flattened by a steamroller, so that all leaves on the tree are visible to the user. Tree trunk 915 is analogous to folder 901 in FIG. 9A; note that each is marked with an "A". All second-level folders on the FIG. 9A tree, such as folders 903 and 905, are represented as major limbs on the FIG. 9B tree (following the example, limbs 917 and 914, respectively); subfolders in FIG. 9A are represented as smaller branches in FIG. 9B, and are so labeled. Files in FIG. 9A are represented as leaves in FIG. 9B. Note the precise correspondence between files 1 (904), h (906), r (907), z (908) and aj (909) in FIG. 9A, and their counterparts in FIG. 9B, namely leaves 1 (916), r (910), z (913), and aj (912).

Figure 9C:
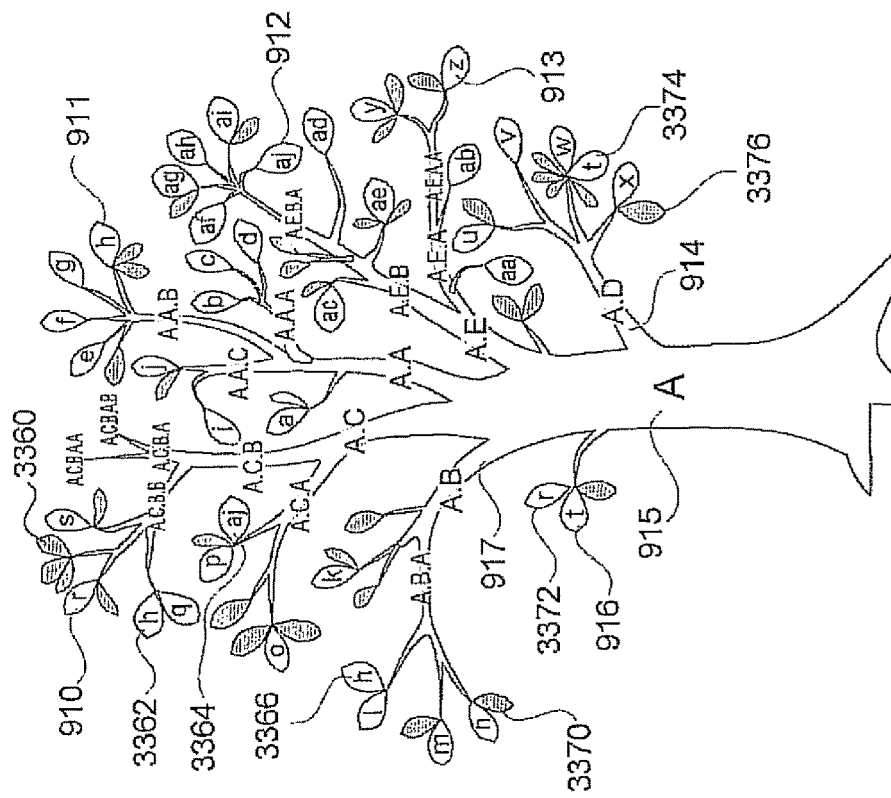
Figure 9B:
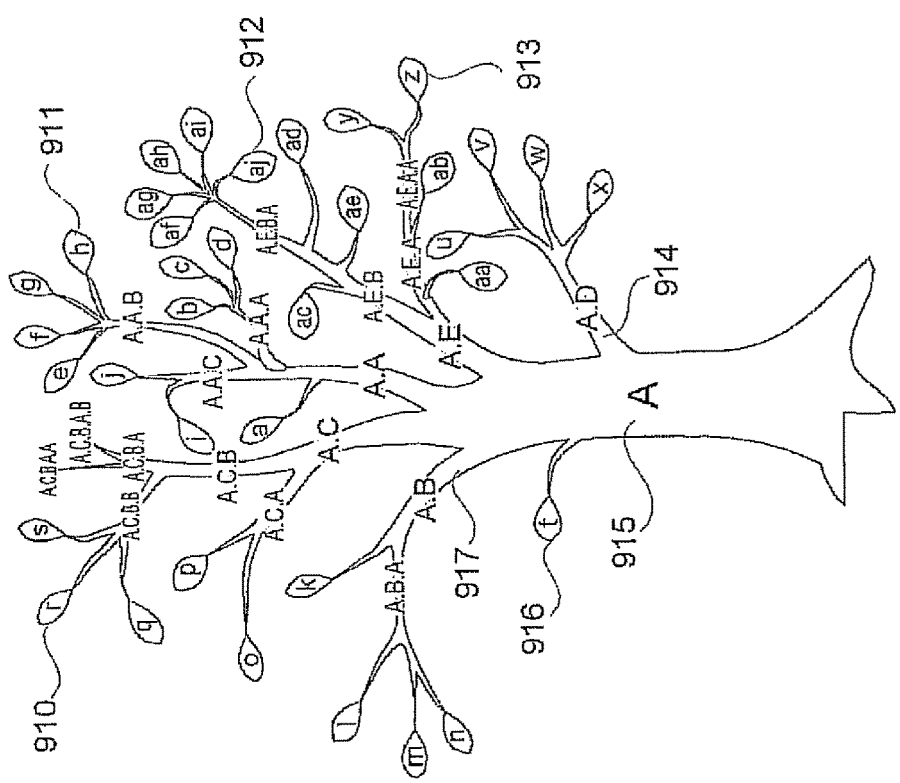

FIG. 9C is essentially a copy of FIG. 9B, but includes some extra information that starts to show some of the benefits of the flexible M-boathouse linking architecture that is an embodiment of the present invention, as shown in FIG. 8B. First, the M-boathouse architecture enables data elements such as contacts, calendar events, bookmarks, etc. (shown here as dark leaves such as 3360, 3370, and 3376) to be displayed together with files, thus supporting the flexible visualization of associative linking systems described above. Second, files (represented here as white leaves) may appear to the user as duplicates on different branches of the same tree, thus enabling the user to group her files associatively on a given tree. For example, leaf 910 and leaf 3372 are both M-boathouses that point to file "r". Leaf "h" (911) is replicated as leaves 3362 and 3366. Leaves 916 and 3374 are both the same "t" leaf. Unique leaves (such as 913) also remain, but the same leaf is now free to be represented not only on different branches of the same tree, but on different trees in the forest. Indeed, in an embodiment of the present invention, whole branches of trees may be replicated throughout the virtual forest, or a large limb laden with branches and leaves may be duplicated to become the trunk of a new tree, as the user's expertise in a given field grows.

Figure 10:
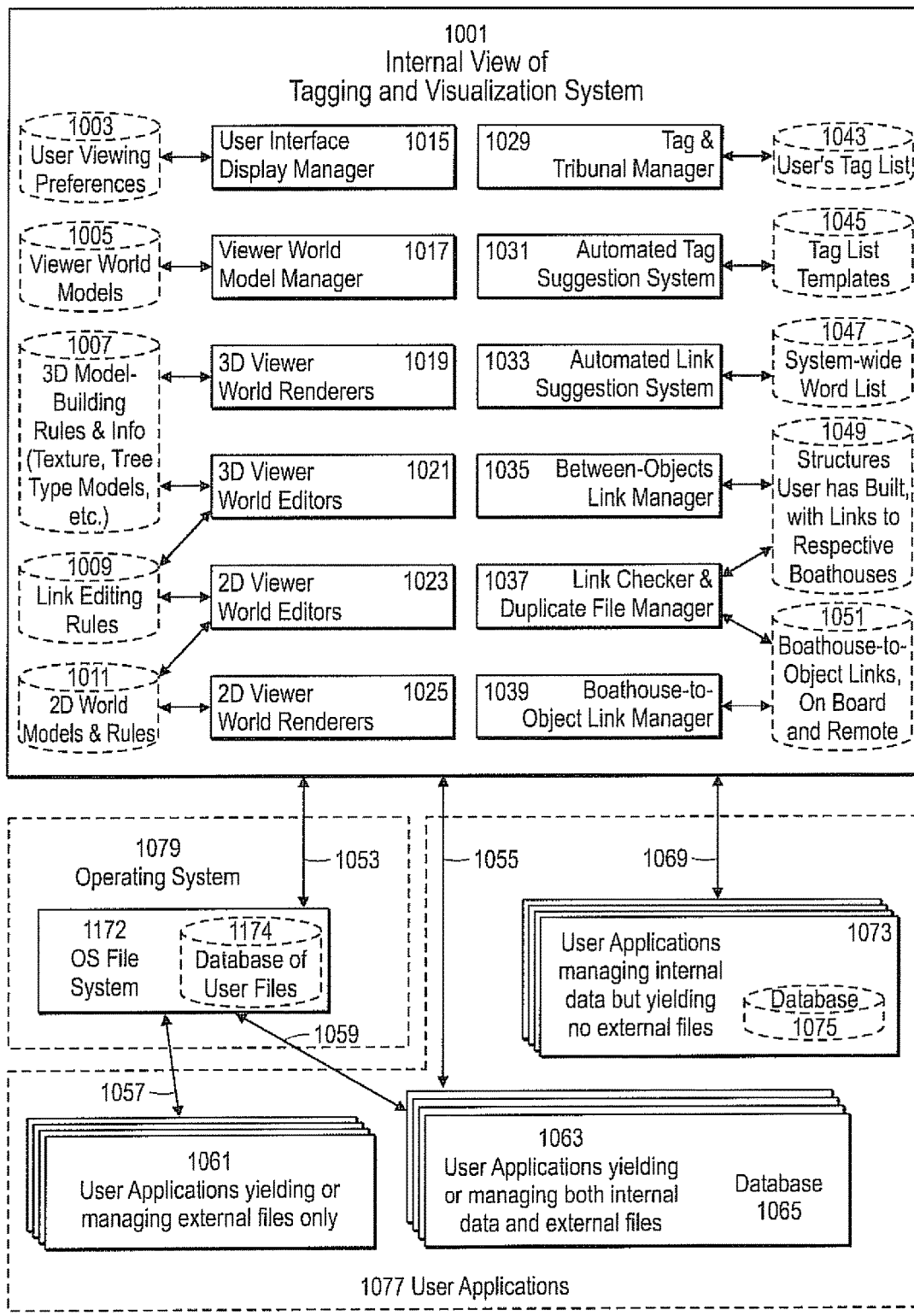
FIG. 10 is an illustrative diagrammatic functional view of a tagging and visualization system in accordance with an embodiment of the invention together with elements of the operating system and user applications of a digital device with which the tagging and visualization system interacts.

FIG. 10 shows a view of the overall internal architecture 1001 of one of many possible embodiments of the present invention, along with simplified representations of other systems with which the tagging and visualization system may likely interact. Major components of the system may include: 1) a user interface display manager 1015 that references a database of user viewing preferences 1003; 2) a viewer world model manager 1017 that acts as a supplier of frameworks for the different viewer worlds that may be offered by an embodiment of the present invention (Such a manager might logically reference a database of viewer world models 1005); 3) one or more 3D viewer world renderers 1019 to display the world for each 3D viewer viewer offered (Each renderer would reference a database 1007 containing myriad rules of physics and tree growth as well as ensuring optimal visibility of identifying labels, texture maps, models of different tree types, landscapes, etc.); 4) one or more 2D world renderers 1025, which would assume the task of displaying 2D concept maps, outline views, one or more tagging tribunals, and/or other visualizations to the user, referencing one or more databases of models, display rules and other features 1011 for each such 2D world; 5) one or more 2D and/or 3D viewer world editors 1021 and 1023, respectively, to enable the user to edit relationships in each viewer world (as shown in FIGS. 7A, 7B, 7C and 7D, as well as in the editing tools inherent in a tagging tribunal, such as those shown in FIG. 4 (Such editors would likely need to reference their relevant world models and rules, whether 3D (1007) or 2D (1011). In addition, both editor modules would likely need to reference a common set of link editing rules, ostensibly stored in a database 1009); 6) a tag & tribunal manager 1029 would assist in maintaining the user's tag list 1043; 7) the automated tag suggestion system 1031 might not only access and display templates from the tag list template database 1045 (as described in options 720, 721 and 722 in FIG. 6B), but might also suggest tags to the user by cross-referencing the system-wide list of words and phrases 1047 with the words in the data and/or metadata of the information nugget, such as in a "Tag By Relevance" sub-panel 466 of a tagging tribunal such as that shown in FIG. 4; 8) an automated link suggestion system 1033 could help automate linking for the user during initial setup, as described in option 733 in FIG. 6C, based in part on referencing a system-wide list of words and phrases 1047; 9) a between-objects link manager 1035 would help ensure that links between M-boathouses remain up-to-date, and that any missing links are promptly repaired, by referencing user structure/link database 1049; 10) as mentioned above, a link checker & duplicate file manager 1037 could assist in making sure that links to external files are sound and duplicate files are found, re-linked, and eradicated, using both a database of structures the user has built 1049 as well as a database of boathouse-to-object links 1051; and 11) a boathouse-to-object link manager 1039 would help ensure that all such links were up-to-date, cross-checking M-boathouse-to-object link database 1051 with the database of user files 1174 of the operating system 1079 and its File System 1072 (Manager 1039 could either inform the user when links with important offline files were reestablished, or simply re-establish the links automatically).

With some or all of these components, and possibly others, the system 1001 could perform its duties for the user, and interacting with user applications 1077. In general, an embodiment may interact with applications 1073 that manage internal data only, as well as those that manage internal data and yield external files (1063). Such interactions might be managed via plug-ins such as 114 as shown in FIG. 8B, or by other means as described above. Applications 1061 that only yield or manage external files would interact solely with the Operating System 1079 and its File System 1172.

Figure 11A:
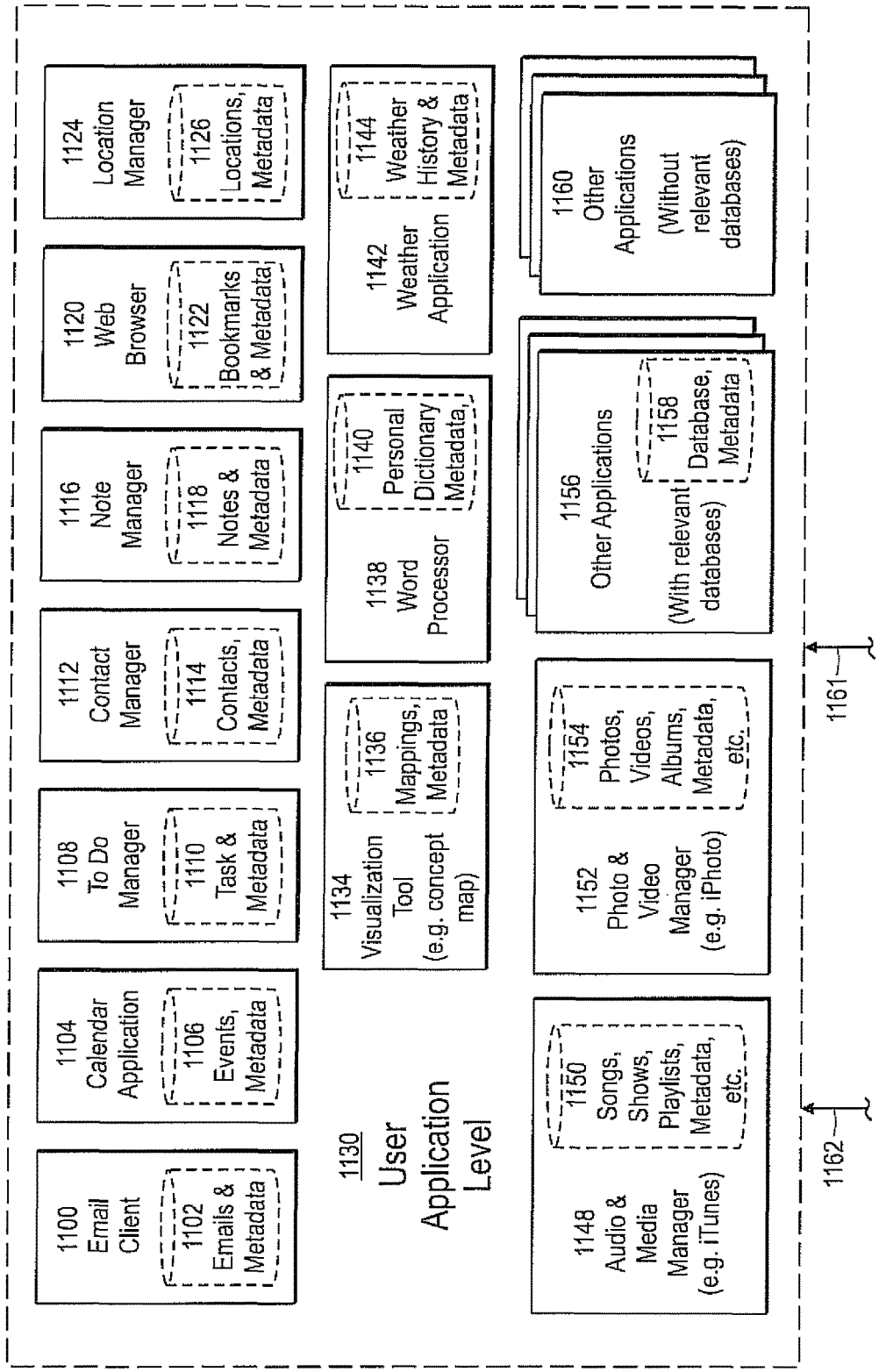
FIGS. 11A, 11B and 11C are illustrative diagrammatic functional views of various embodiments of systems in accordance with the present invention, including as a component of the operating system of a PC or other digital device (FIG. 11A), as an application on a PC, tablet computer or other digital device (FIG. 11B), and on a mobile device such as a cellphone or smartphone (FIG. 11C)
Figure 11A:
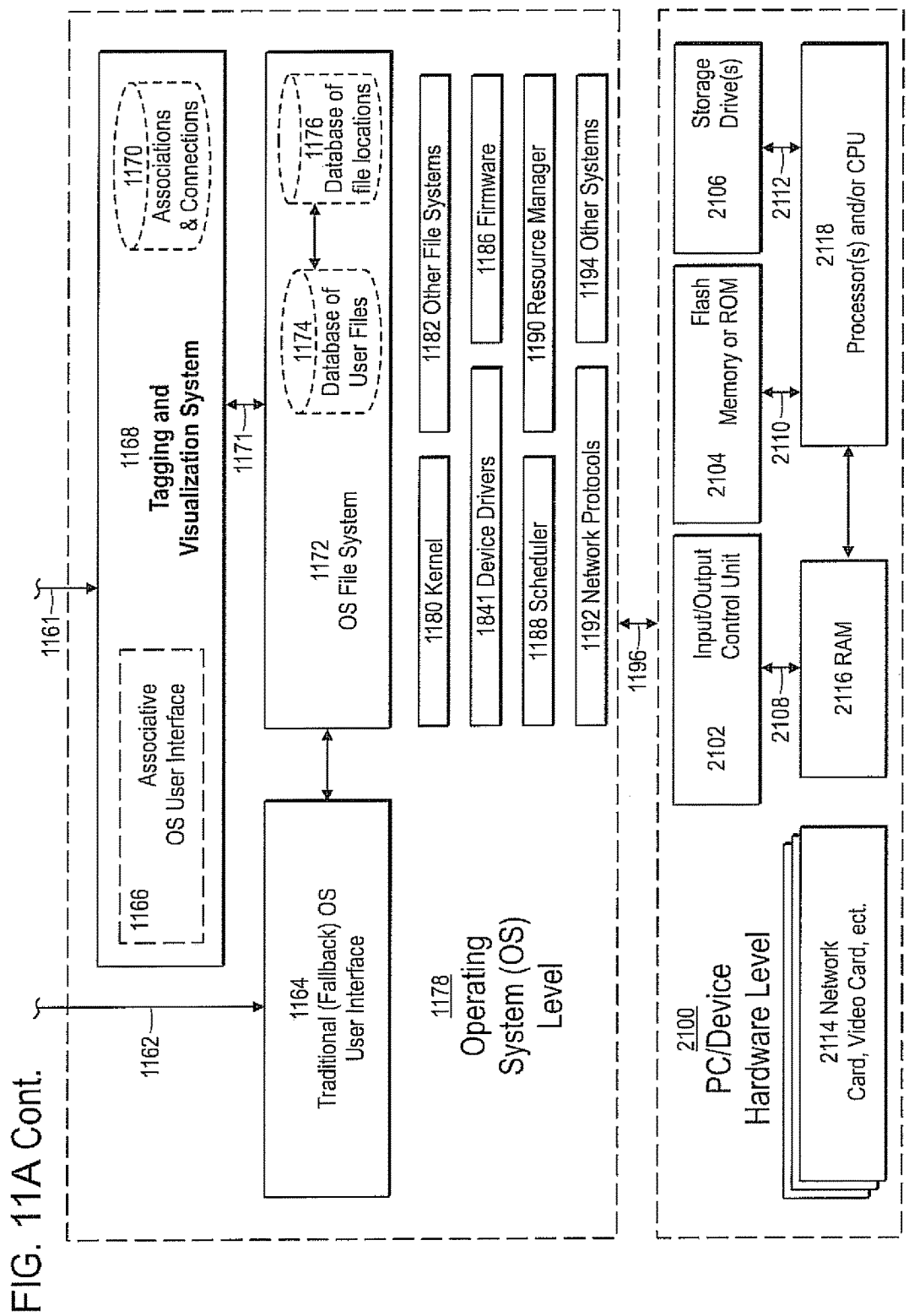
Figure 11B:
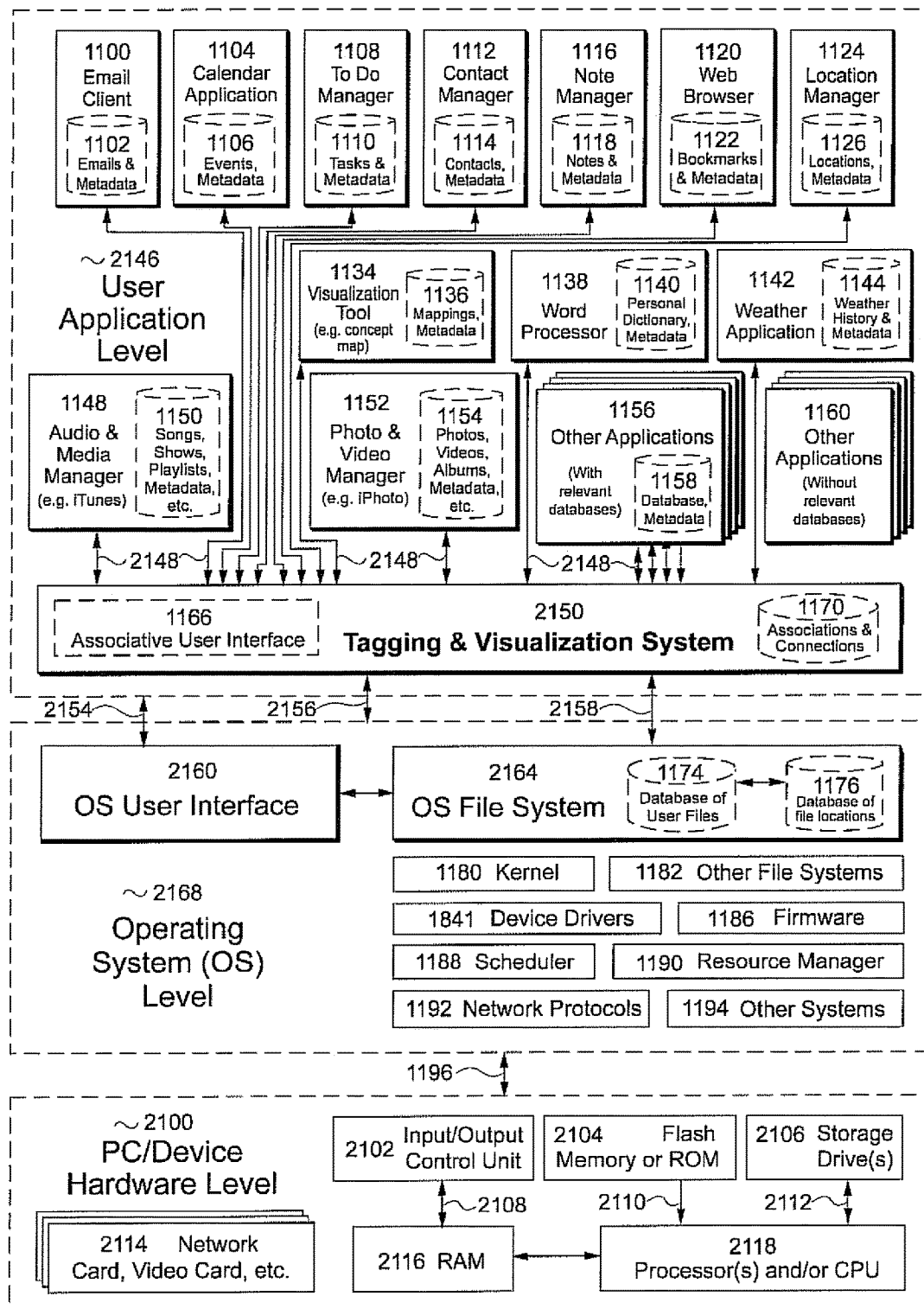
Figure 11C:
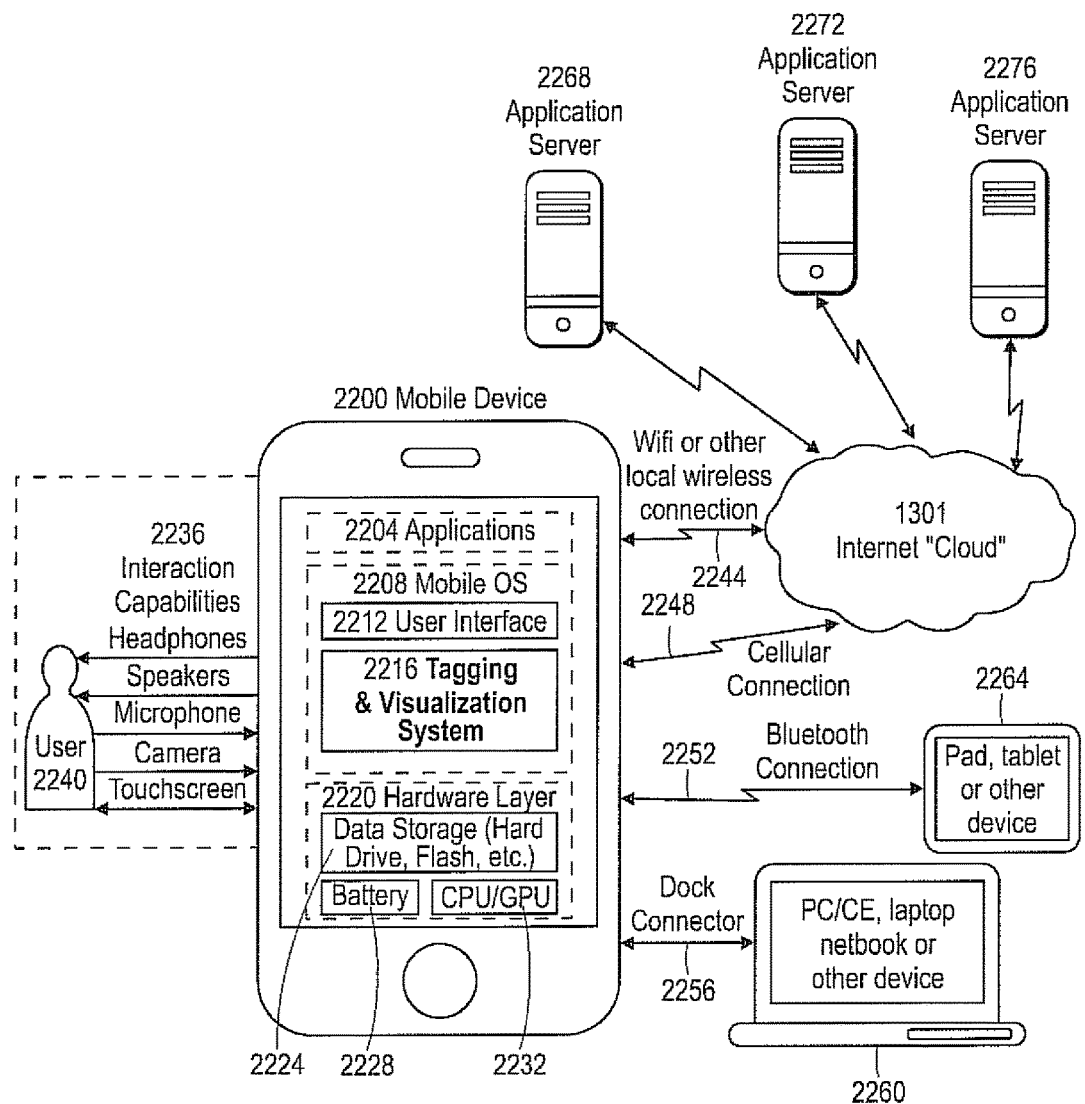

FIGS. 11A, 11B and 11C show three possible embodiments of the present invention in a larger context, focusing on how they interact with PC-type systems as well as mobile, tablet and other devices. FIG. 11A shows a tagging and visualization system 1168, according to an embodiment of the present invention, as an integral part of operating system 1178. The details of system view 1001 in FIG. 10 are condensed down in FIG. 11A to two components: An associative OS user interface 1166, and a database of associations and links 1170.

In this embodiment, the hardware level 2100 of the PC or similar device may vary considerably, but tends to feature at least a minimal subset of components: one or more microprocessors on the central processing unit (CPU) 2118 use Flash memory or ROM 2104 and the software stored in partitions on one or more storage drives 2106 to engage the RAM 2116, which interacts with input/output control unit 2102. Various network cards, video cards, cameras, microphones, speakers and/or other hardware components 2114 may augment the system's capacity to display, play, listen, connect, etc. The hardware level 2100 interacts intensively with the operating system level 1178, and that interaction is represented by multidirectional arrow 1196.

The device's operating system 1178 typically features a kernel along with other subsystems such as a standard user interface 1164 (here described as a fallback system, since the associative user interface 1166 of the tagging and visualization system 1168 may be presented to the user as the preferred means of OS interaction). The OS UI 1164 works closely with the user application level 1130 of the device, with a bidirectional conduit 1162 continuing to manage and display open applications, etc. The OS UI also works closely with the OS file system 1172, which features a database of user files 1174, and potentially a database or registry of file locations 1176. Additionally, other file systems 1182, device drivers 1841, firmware 1186, scheduler 1188, resource manager 1190, network protocols 1192 and/or other systems 1194 may round out the OS.

At the user application level 1130 at the top of FIG. 11A may be some or all of the following applications: 1) one or more email clients 1100, that tend to access a database of emails and metadata 1102 gleaned from email headers; 2) one or more calendar applications 1104, accessing a database of events 1106; 3) at least one to do (task) manager 1108, with its database of tasks 1110; 4) a contact manager 1112, relying on a database of contacts and metadata 1114; 5) often there is a note manager 1116, as often accompanied by a database of notes and metadata 1118; 6) at least one web browser 1120, each complete with a database of bookmarks 1122.

Often, these applications come bundled together; Microsoft Outlook, Mozilla Thunderbird, Apple's iCal and other systems feature various combinations of the above applications, often to the benefit of users. Email and phone systems that leverage the data in a contact manager can prove invaluable, as Thunderbird, Outlook, Apple Mail and the iPhone have done. Additional applications that may be commonly found on digital devices are the following: 1) a word processor 1138, which often features one or more personal dictionaries and other metadata 1140; 2) a location manager 1124 such as the iPhone's built-in Maps app, which enable a user to save locations and other metadata 1126; 3) an audio and media manager 1148, such as Apple's iTunes and similar applications on Windows and Unix machines (As mentioned previously, such systems offer a rich variety of media to play, store, retrieve, manage, rearrange and access, using a flexible system of playlists and nestable folders, enabling users to create different permutations of the files in their media libraries 1150); 4) a photo manager 1152 such as Apple's iPhoto, which may also enable videos to be stored, managed and played; such systems may be offered as native applications or as online, cloud-based services such as Picasa and Flicks' (Invariably, there is a database of images and metadata 1154); 5) increasingly, users are experimenting with standalone visualization tools 1134 such as the concept-mapping or mind-mapping tools mentioned previously; and 6) weather applications 1142, found both in local application form (usually leveraging the Internet to retrieve current local forecasts) as well as online versions, have access to a great deal of information such as weather history for various areas, precipitation levels and other metadata 1144.

With regard to item 5) above, while such systems often prove useful, their inability to solve challenges such as those articulated in this document (and solved by the proposed embodiments of the present invention) make them prone to failure, as users try them for a while, only to later abandon them when users see that the resources they invest in building concept maps are not rewarded with a system-wide experience that supports users in bringing all of the data in the aforementioned applications, along with their files, to bear in the process. Nevertheless, the rich networks of associations and other data 1136 produced by the user with such visualization systems would prove extremely valuable in various embodiments of the present invention. And, of course, the potential for mind-map-style visualizations to show users aspects of their information, and associations between it, is great. Thus, as discussed above, mind mapping would be incorporated as a viewing world in an embodiment of the present invention.

With regard to item 6) above, while such applications are in their infancy, the potential to provide relevant weather data with which to cross-reference with a great deal of other history information (such as is stored in photo databases 1154, calendar databases 1106, web bookmark databases 1120 and other relevant databases 1158) in pursuit of an effective associative user experience is extremely powerful.

Other applications 1156 with still more relevant databases 1158, as well as applications 1160 without a relevant database component, round out the list of applications that form the user application level 1130 of this system. In the embodiment depicted in FIG. 11A, the tagging and visualization system would interact intensively with the OS file system 1172 by means of bidirectional information conduit 1171, as well as with all the applications in layer 1130 that it could connect with, via conduit 1161. Information nuggets from the databases could be edited either within the nugget's native application, or from within the editable display system of an embodiment of the present invention; in such cases, data would flow back up to the applications, presumably via the plug-ins associated with each application (not pictured here), or by some other means as mentioned above.

FIG. 11B shows a system of an embodiment of the invention as an application 2150, rather than as a component of the operating system. The hardware level 2100 and its subcomponents are unchanged from FIG. 11A, and all of the user applications represented in FIG. 11A are represented here too, at the user application level 2146. The primary difference is, of course, that the tagging and visualization system 2150 is a part of the user application layer 2146. It is thus not in the operating system, which is different from that shown in FIG. 11A and is thus renumbered in FIG. 11B to be 2168. Much of the rest of the Operating System is unchanged from FIG. 11A, including kernel 1180, and other sub-systems mentioned previously. The OS user interface 2160 however, still communicating with the user application level (now 2146 with the addition of tagging and visualization system 2150) via conduit 2154, is now designed as the primary means of interaction with users. Similarly, the OS file system 2164 is still interacting extensively with OS user interface 2160, as well as with the tagging and visualization system of the present invention 2150. Other elements of the OS that are together as part of an integrated OS in FIG. 11A however, are here communicating directly with tagging and visualization system 2150 via conduit 2156.

Explicit, bidirectional conduits 2148 are now connecting tagging and visualization system 2150 directly with each application with a relevant database. Again, this interaction may occur via a variety of means, such as plug-ins at the individual application level, plug-ins at the tagging and visualization system 2150, or some other means.

FIG. 11C shows a system in accordance with another embodiment of the present invention, that focuses on a smaller and/or lower-powered digital device 2200 such as a cellphone, netbook, tablet or pad computer, personal digital assistant (such as an iPod Touch, or iTouch). In this embodiment, tagging and visualization system 2216 is depicted as an element of the mobile operating system 2208. The hardware layer 2220 features a similar subset of components as those shown in FIGS. 11A and 11B, but simplified and modified to feature hardware elements more common to such small devices. For example, in addition to core features of a mobile device such as a CPU/GPU (2232), and data storage 2224 such as hard drive, flash drive, etc., this system features a battery 2228. In addition under the rubric of "interaction capabilities" 2236 are such additional hardware elements as a stereo headphone jack, one or more speakers, one or more microphones, and increasingly, a camera and a touchscreen (although some or all of these components are absent on some systems). Rather than the hundreds of gigabytes or a terabyte or more of disk space on a typical modern PC however, portable mobile devices may have mere gigabytes of storage in the single digits, possibly into the low-to-mid double digits and, rarely, in the low triple digits. Such devices rely less on a massive hard drive, and more on connectivity with more powerful devices—and, in particular, the Internet.

Thus, of particular interest in FIG. 11C is the question of how the mobile device 2200 receives (and/or transmits) the information it carries with it and displays. For example, Blackberry, iPhone, iPod Touch and many other devices sync via USB cable or similar conduit 2256 with a secondary device, such as a PC, laptop, or netbook 2260. Many such devices feature short-range wireless communication systems such as Bluetooth, with which users can connect their small devices to PCs, tablet computers and a range of other devices. Wifi and/or other longer-range wireless connections 2244 enable the device to interface with the Internet 1301, where a cloud of online applications, services, data and other information may be downloaded from a wide range of remote application servers all over the world (three of which are represented here as 2268, 2272 and 2276) to the device 2200 and put at the user's fingertips in seconds. Cellular connections 2248 represent a large and increasing means of connection to the Internet 1301, and the servers beyond.

Even with much smaller storage drives, Mobile devices such as iPhone, Blackberry, Android mobile phones and others feature versions of some or all of the applications described in the user application level 1130 of FIG. 11A, often slimmed down to accommodate the smaller storage requirements of drives 2224, but often augmented with data and/or services from the Internet. Due to such substantial storage constraints, one embodiment of the present invention particularly suited to small, digital devices with cellular or other reliable wireless connection(s).

In an embodiment, the mobile device carries the entire structure of the tagging and visualization system as may be found on the user's work hard drive, for example. But while the M-boathouse nodes of the system may be populated with calendar, contact, to do and other critical information, most other M-boathouse nodes are not. Assuming a cloud computing-style embodiment (shown in FIG. 12B) however, the user may simply set the device and cloud to interact seamlessly, such that if and when the user desires one or more files or other data element(s) that are not present on the device, the system simply finds and downloads them in seconds from the Cloud.

Figure 12A:
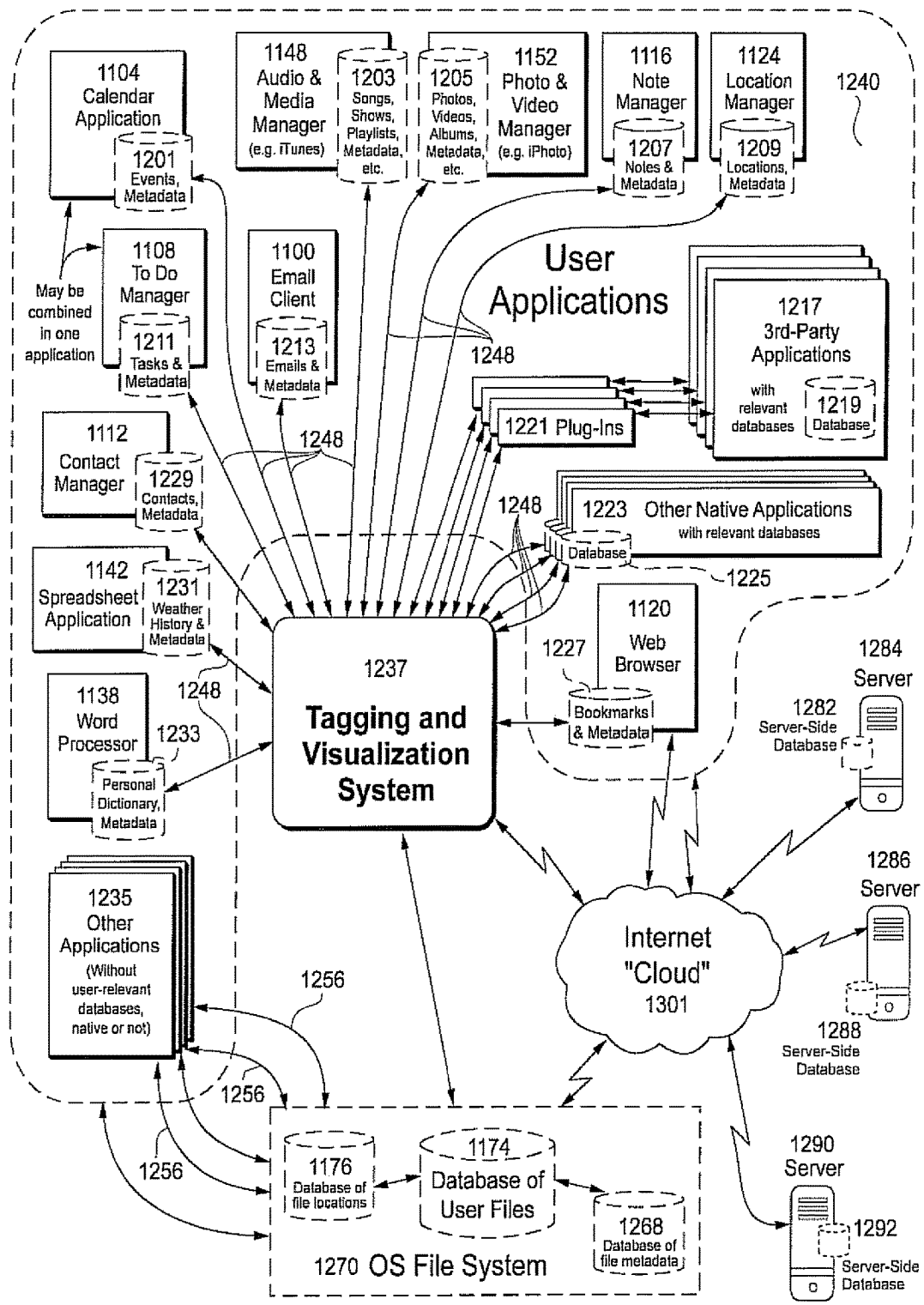
FIGS. 12A, 12B, 12C and 12D are illustrative diagrammatic block diagrams depicting data communication in systems and methods in accordance with various embodiments of the present invention, including a thick-client Internet-enabled digital device (or one without access to the Internet) such as a PC (FIG. 12A); a thin-client device suited for Cloud Computing or a web-hosted suite of applications such as a PC, netbook, mobile device or tablet computer (FIG. 12B); an operating-system-based, client-server model typical of Internet-enabled devices such as a cellphone, tablet computer or other mobile device (FIG. 12C); and an application-based client-server model typical of Internet-enabled devices such as a cellphone, tablet computer or other mobile device (FIG. 12D)

FIGS. 12A, 12B, 12C and 12D focus on various embodiments of the present invention, and specifically how the system communicates with the databases and other key components of the system. FIG. 12A, for example, contemplates a system in which an OS manufacturer, that also happens to manufacture a suite of native applications as shown in shape 1240, for its own devices or for other devices, also manufactures the tagging and visualization system, shown here as item 1237. For example, the manufacturer creates its own web browser 1120, email client 1213, IM client, audio and media manager 1148, image manager 1152, to do list and calendar application 1104, contact manager 1112, word processor 1138, and other native systems. In this embodiment, the manufacturer directs that all databases be made directly available to the tagging and visualization system. In such a scenario, conduits 1248 are used throughout the system to connect to all native applications with relevant databases, with seamless access to and from these databases. Third party developers creating applications 1217 that feature databases 1219 with relevant information for system 1237 might either be directed by the manufacturer to write their applications with similar database access, or plug-ins might be built or made available to enable the tagging and visualization system 1237 to interact with and leverage these data as well. The OS file system 1270 and its various components still interact with the tagging and visualization system 1237, as do other applications 1235 that yield files but no data, via conduits 1256.

The tagging and visualization system communicates with the Internet 1301 to obtain and send tag list templates to and from the server-side database 1282 residing on server 1284. Additionally, the manufacturer may also market a variety of devices, from handheld mobile devices to tablet-like devices, to personal computers. The manufacturer may also provide one or more cloud-based applications from various servers such as 1286 and 1290, whether for a fee or for free, to either replace some or all of the current PC-based applications, or to am in parallel with these local applications. In the latter case, the user may sync her databases in various applications of the local systems with analogous applications on the cloud (and associated databases, such as server-side databases 1288 and 1292) to help keep all of the user's related systems in sync. Such an embodiment would make it especially easy for the manufacturer's developers, or a third party, to develop and market the tagging and visualization system, whether as an application or as part of the device's operating system, whether in tandem with or in place of the existing operating system, and help users keep all their devices constantly in sync.

Figure 12B:
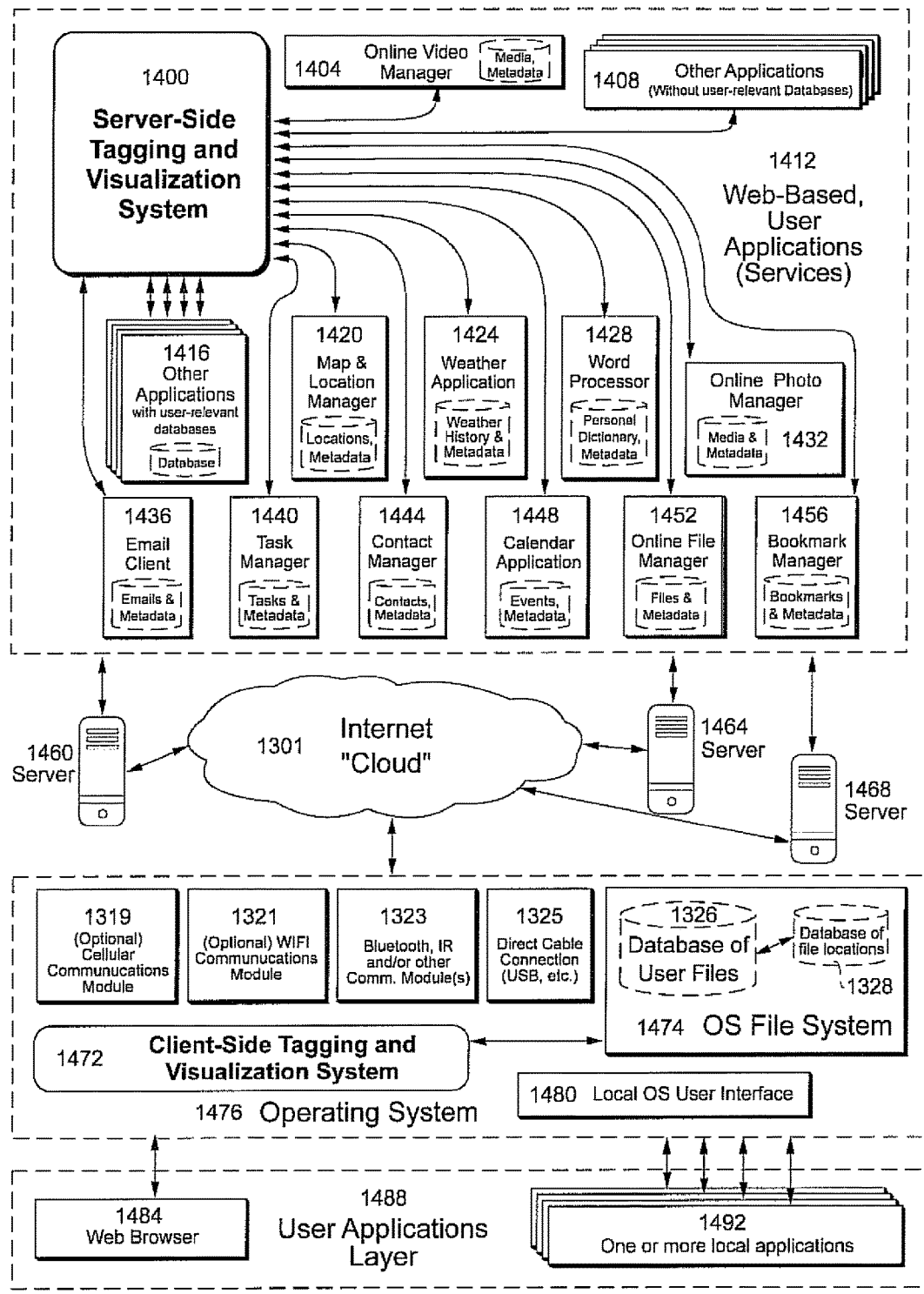

FIG. 12B shows an embodiment of the current invention in which most or all of the applications relevant to the embodiment are available as web-based, user applications, or services 1412. In such a configuration, a large company may provide most or all of these services, for free (with advertising) or for fee, primarily through a web browser of the company's own manufacture or another, for use on PCs, notebook computers, netbooks, tablet computing devices and other mobile devices. In such a configuration, there might be two components to the tagging and visualization system: One on the client side 1472, and one on the server side 1400. On the server side, similar to FIG. 11B, all applications with relevant databases would be made, whether by design or by plug-in or some other method, to interact directly with the server side system 1400. A mapping and location manager 1420, a word processor 1428, an online photo manager 1432, an online video player and manager 1404, an email client 1436, a task manager 1440, a contact manager 1444, a calendar application 1448, an online file manager 1452, and a bookmark manager 1456, together with other potentially relevant applications and services 1416, might communicate their relevant information nuggets to the server-side tagging and visualization system. Then, this system (along with the other individual application services 1408), might communicate via server (represented here by servers 1460, 1464 and 1468), through the Internet cloud 1301, to the client-side tagging and visualization system 1472 (assuming all needed services are not handled quickly and gracefully by the server-side part of the system 1400, in tandem with the local web browser 1484, and that there is still relevant need for locally-stored files in a file system 1474) on the user's local device. The data communication components on the device side consists of one or more of the following: A cellular or other long-range wireless communications module 1319, a Wi-Fi or other medium-range communications module 1321, a Bluetooth or other short-range wireless module 1323, and/or a direct USB or other cable connection 1325. These elements, including a local operating system 1476, its local OS UI 1480, and one or more local applications 1492 on the user applications layer 1488, round out this embodiment.

Figure 12C:
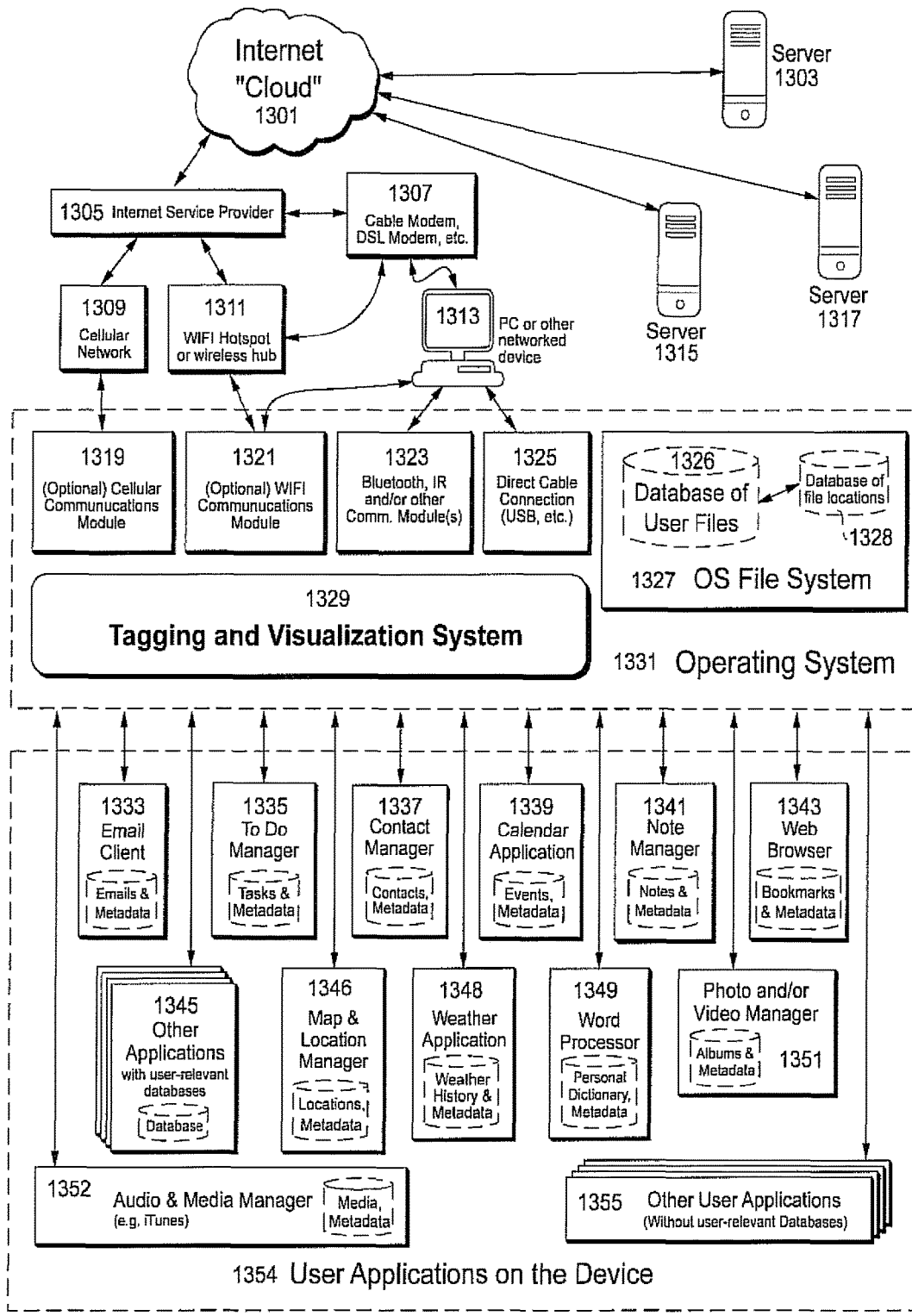

Two additional embodiments of the present invention adapt themselves particularly well to smaller, portable digital devices as well as netbooks, pad or tablet-style computing systems, and other lighter-weight device configurations—in addition to heavier-duty PC and laptop configurations. In FIG. 12C is shown an embodiment suitable for a lighter-weight device in which, like FIG. 11A, the tagging and visualization system (1329 here) is implemented as part of the operating system 1331. In this configuration, web servers represented here by servers 1303, 1315 and 1317 communicate with the device through the Internet cloud 1301, and down to the local system via one or more intermediate means. In general, an Internet service provider 1305 provides Internet services either to a cable modem, DSL modem or similar device 1307 to a PC or other networked device 1313, and/or a Wi-Fi hotspot or wireless hub 1311, and/or through a cellular network 1309.

On the device site, the data communication components are identical to those in FIG. 12B, consisting of one or more of the following: A cellular or other long-range wireless communications module 1319, a Wi-Fi or other medium-range communications module 1321, a Bluetooth or other short-range wireless module 1323, and/or a direct USB or other cable connection 1325. In the user applications part of the device 1354, versions of some or all of the previously discussed applications appear here, all of which communicate with the Operating System 1331, and the UI offered by its tagging and visualization system, or the OS's own UI. Applications include: An email client 1333, to do manager 1335, contact manager 1337, calendar application 1339, note manager 1341, web browser 1343, map & location manager 1346, weather application 1348, word processor 1349, photo manager 1351, audio and media manager 1352 and/or other applications managing user-relevant data 1345 as well as without such data 1355, all contribute to providing rich fodder for an effective associatively-related system.

Figure 12D:
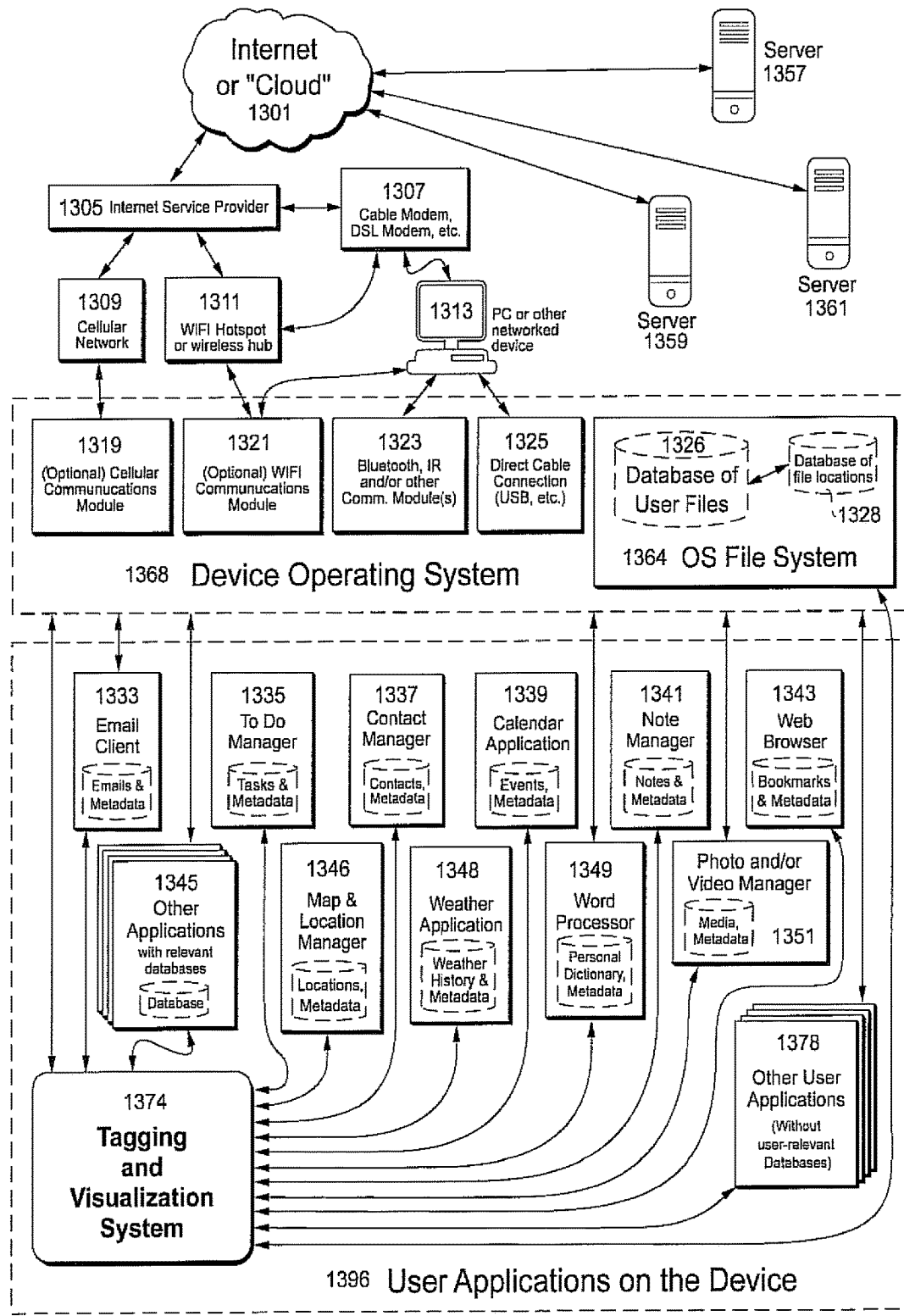

FIG. 12D shows an embodiment of the present invention similar to 12C, except that the embodiment (now 1374) is not within the device's operating system (now 1368), but is instead implemented as an application in the applications section (now 1396). As noted above, in such an application-to-application configuration, most applications (e.g., email client 1333, to do manager 1335, contact manager 1337, calendar application 1339, note manager 1341, web browser 1343, map & location manager 1346, weather application 1348, word processor 1349, photo manager 1351, audio and media manager 1352 and/or other applications managing user-relevant data 1345) must communicate directly with the tagging and visualization system according to the present invention. However, only certain applications, such as applications that manipulate files in the OS file system 1364, such as user applications without relevant data 1378, a word processor 1349, a photo and/or video manager 1351, an email client 1333 and potentially other applications that manipulate both internal databases and files (1345) need also communicate directly with the operating system 1331, and the OS file system therein.

Figure 13:
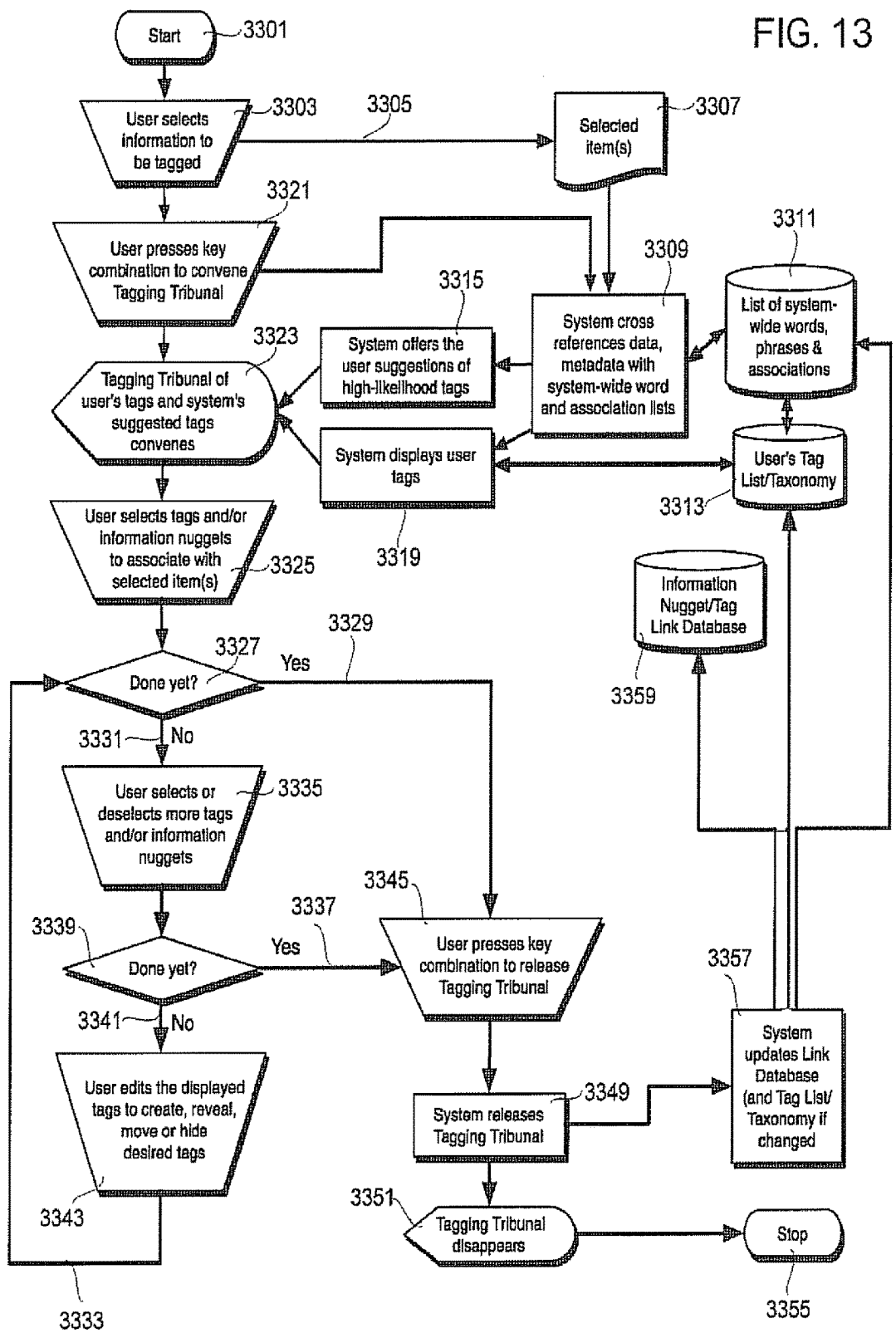
FIG. 13 shows an illustrative diagrammatic flowchart of processing steps in accordance with an embodiment of the present invention.

FIG. 13 shows a flow chart that represents the process a user might execute when convening a tagging tribunal in an embodiment of the present invention. At the start of the process 3301, the user selects information to be tagged 3303. Once the user is satisfied with her selection or selections, the user presses a key combination or otherwise performs a unique action to convene a tagging tribunal 3321. Once a tagging tribunal is called by the user to be convened, two things happen: First, the system accesses the user's current tag list and taxonomy 3313 and prepares these data to be displayed on screen (3319). Second, a message is sent to the system for the user's selected items 3307, sent as data 3305 to be processed by the system, to cross-reference the tags and words associated with selected items 3307 with the database 3311 of words, phrases and associations in the entire system, to create a list (3309). The tagging tribunal 3323 is convened with the user's taxonomy of tags from process 3319 as well as an optional list of tags and/or information nuggets recommended by the system for tagging from process 3315.

The user then selects the tags from among existing and optionally system-recommended choices, to be associated with the target (selected) item or items in user action 3325. The user then decides (3327) if the selection of tags is sufficient for her purposes. In the case 3341 that the user is still not satisfied, however, s/he performs user action 3343, where s/he may create one or more new tags, reveal subsets of tags not previously viewed in this session, and otherwise move or hide tags as desired to edit her tagging taxonomy as s/he sees fit. Once the user has completed this process (3333), s/he arrives back at decision point 3327 to decide if s/he has completed her goal. In the case 3331 s/he is not, then the user repeats task 3335 and so on until s/he is satisfied. In the case 3329 or 3337 that the user is satisfied, s/he presses the necessary key combination or performs the unique action to release the tagging tribunal in user action 3345. The system releases the tagging tribunal per process 3349, which executes two steps. First, it triggers the system to perform action 3357 to update the link database 3359. If the user edited the tag taxonomy in this session, the user's tag taxonomy database 3313 would also be updated; if new associations were made, and/or new words were introduced to the system, or existing words were deleted, then the database of words, phrases and associations 3311 would also be updated. Second, system process 3349 triggers the screen 3351 to display the tagging tribunal disappearing from view to complete the process at end state 3355.

As used herein, the term information includes (on the user's PC or other computing device, or on the web) text, graphics, photographs, audio, video, web links, and files. Within this document, the term "icons" shall be construed to include graphical elements that symbolically represent pieces of information.

As used herein, the term information nugget means any coherent unit of information or data that is of value to the user. Information nuggets may be documents or files (whether text, image, video, audio, web link, etc.) or a piece of a file (such as a phrase, quote or chapter of interest from a text file, a clip from an audio or video file, a part of an image with a face of interest, etc.). This term may also apply to one or more units of data from a data silo, such as one or more calendar events, one or more contacts from the user's contact management software system, one or more bookmarks from the user's web browser, a playlist or song from the user's audio file management system, a note, etc.

As used herein, the term data silo means an application on a computer, a website, a mobile phone or another digital device that contains a database of coherent elements of data.

As used herein, the term metadata means a set of data that describes and gives information about other data, as well as information that gives additional meaning, context, information, notes or other details about a given information nugget. For example, while an image viewer may display an image along with the image's name, the image's metadata may include a name the user or someone else has given the image, the name of the file, the type of image file it is, the image's size and resolution, the location of the file on the digital storage drive, the names of digital photo albums to which the image may belong, associated events, ratings, image manipulation information such as lightening, darkening, sharpness, cropping, rotation, etc. that the image may have undergone, names of faces in the image, the date and time the image was taken, the location where the image was taken, additional notes the user and/or photographer may have made, the name and/or brand of the camera the image was taken on, etc. While the information nugget a user has captured may be interesting to the user, the metadata associated with that nugget may provide a rich background of information, some or all of which may prove interesting and relevant to users in their efforts to provide their data with associative context that can help give the information nugget more meaning to the user.

The term Metadata Boathouse or simply Boathouse means the linking architecture used in systems and methods in accordance with certain embodiments of the present invention. In this model, the actual information nuggets are rarely, if ever, linked together per se; that is to say, the information nuggets themselves do not point at one another. Instead, metadata boathouses, data structures that contain robust pointers to the information nuggets, are used as the functional "nodes" that other information boathouses link to, and that in turn link to other boathouses. The term metadata boathouse is used in place of other language because of the nature of some or much of the information nuggets that a user may wish to link to. In particular, information nuggets may be found on hard drives, servers, or other systems that the user's device may or may not be connected to. For more details of this term, see the description of FIG. 8A, above.

The step of creating an association between selected information and a tag can be assumed to include either selecting the tag from a menu, typing the tag name into a text field, specifying a tag by using a keyboard shortcut, or pointing at the tag with a graphical pointing device such as a mouse or track ball or track pad or the like. In creating an association, a graphical representation of the selected information may be dragged with the pointing device to the tag or vice versa, or the selected information may be highlighted, and then the pointer may be aligned with the text or icon representing the tag to be associated with the information nugget, and clicked after alignment, thus creating an associative link. A tagging tribunal can be convened by keyboard shortcut or menu selection or clicking an icon.

A spatial schema may be a graphically represented two-dimensional or three-dimensional virtual world, such as a representation of the Library of Congress, or a representation of a tree or a forest of trees, or other representation of physical space. The step of creating an association between selected information and a location on or within a spatial schema can be assumed to include navigating through the virtual schema (which might for instance be done the way one navigates through the virtual landscape of a video game).

As used herein the language defining a tag includes entering the tag in textual form and/or graphical form, and/or audio form. For example, defining a friends tag could include typing in the word "friends" and/or specifying an icon which consists of a photo or cartoon of two people standing side by side, each with one arm around the other person's shoulders. Similarly, an audio recording of the word "friends" could also serve as a tag that may be linked to information nuggets.

In a system in accordance with an embodiment, a user may not see a tag in the tagging tribunal he or she is using that would fit a new information nugget. More precisely, the user thinks of a new tag that applies to the current information nugget, but also applies to other nuggets, past and future. In this case, the user may right-click (or Control-click) on a section of the tagging tribunal where he or she would like for the new tag to appear. So clicking causes a text field to appear in the new location, and the user types in the name of the new tag, as well as optional attributes of the tag in labeled fields in proximity, or of the nature of the links that can be made with the new tag. Once complete, the user presses the Enter key, and the new tag appears in the tribunal. In an alternative embodiment, a New Tag button ubiquitously appears on the tribunal area, and may be clicked by the user. The new field appears and, once labeling is complete and/or attributes are set, the new tag appears in the tribunal. The new tag may then be dragged to the desired location within the tribunal area, and dropped to take its place at that location.

In accordance with certain embodiments, the present invention not only provides a framework with which the user may manually construct associative memory aids (using the principle of associative linking), but also features aspects in which the computer system may help automate and/or assist in this process. For example, when convening a tagging tribunal, in addition to the user's own subject headings, the present invention may automatically suggest others by means of word matching, or automatic image identification, or other means. As another example, if the user engages in repetitive actions of linking items in similar ways, the present invention may automatically detect the repetitive pattern on the part of the user, and offer to assist the user in performing the rest of the actions.

An additional element of value of the present invention lies in the creation, editing, maintenance, growth and viewing of the associative linking structures. Visualized as virtual trees in a forest, or as a mind map of concepts, these associative linking structures become a record of learning, and reflect, by their very nature, the understanding of (for instance) a given topic or the user's exploration into a field of inquiry, or the multi-dimensional aspects of a relationship with a friend.

As an editable, manipulable representation of the user's knowledge, an associative linking structure can show the extent of knowledge, as well as the gaps in knowledge, to others. A chemistry teacher, for example, can examine the associative linking structure that a student has built based on his understanding of principles such as entropy and enthalpy, and correct misconceptions made visible by the graphical (or textual) representation of the associative linking structure, or see from the student's representation important elements of the topic that the student may not have learned, thereby knowing to discuss these missed aspects of the topic with the student, or reinforce teaching of these aspects to the class.

Alternatively, a person new to a field of inquiry might learn from viewing a graphical representation of the associative linking structures created by an expert in the field of interest. Imagine being interested in the field of Artificial Intelligence (AI), for example, and being able to view a representation of the way AI pioneer Marvin Minsky thinks about the subject of AI, or the subfield of creating an agent-based ecosystem of intelligence.

Similarly, a hobbyist new to the field of woodworking might benefit greatly by viewing an associative linking structure made by a master carpenter such as PBS' Norm Abrams, who would focus on matters of wood shop safety while displaying associative knowledge of a vast array of woodworking machines and techniques.

Further, personal associative linking structures may help reinforce a user's knowledge of a subject by simply maintaining a persistent representation of that knowledge over time, enabling the user to periodically reflect on various representations of the associative linking structure, or by refining relationships, pruning and shaping a virtual tree, or by learning new material that relates to the old, and editing the tree to correct misperceptions or build new branches of inquiry.

A system of an embodiment of the present invention may be shared with others over the Internet or other network, such that another user can learn about a field of study or interest from the way someone knowledgeable in the field views it. In this shared embodiment, a user may choose to release a representation of his or her associative linking structure or structures (for instance on the web or via email). Thus, other users can co-construct a shared understanding of a topic, or simply copy the original user's representation of their understanding, and then modify it as they wish.

The present invention facilitates an array of useful applications for a diverse set of potential users. Uses for the present invention may include: 1) an integrated personal information management system for a PC, smart phone and/or other mobile computing device to manage a user's information, applications, documents and/or data; 2) a web-based personal information management application to manage a user's information, web links, applications, documents and/or data; 3) a shared knowledge management system for an Internet, intranet or other networked system of multiple users and/or multiple machines; 4) an educational tool to show learners representations of how experts think about subjects, fields or topics, and/or to enable learners to modify these representations, and adapt them for their own purposes; 5) an educational tool to build understanding of a topic, subject or field, and show educators the extent (and/or gaps) in their current knowledge of the topic, subject or field; 6) a primary (or secondary) file storage and retrieval system for a computer operating system, whether for a kiosk, desktop, laptop, palmtop, mobile robot, mobile device or other hybrid system containing computer technology; 7) an entertainment device to gather together data, information and/or media about a given hobby or subject of interest, and/or build understanding and knowledge about the subject; 8) a research tool to assist scholars, scientists, professionals and/or trades people in helping to build, solidify, and grow their understanding of a given field; 9) a business tool to help companies and/or salespeople manage clients, customers, product lines, marketing information, strategic goals and other forms of data and information; 10) a project management tool to help project managers track development, people, time, resources, artifacts and other information in a single coherent place; and/or 11) a system to replace or enhance databases in any field in which information input or retrieval might benefit from the properties afforded in the present invention. The above list represents only a small sampling of the applications and systems for which the present invention could provide substantial utility and value over present-day systems.

In certain systems and methods of the invention, a tag may not only be an icon or a textual keyword or phrase, but a tag may be any information nugget (for instance a contact in a user's contact list, or an address on a map, or an image or a PDF file or other document on the user's hard drive, or an application, or a mathematical formula, or a quote from a textbook). Any item of information or of data that can be pointed to may be a tag. For example, a user may wish to tag a famous quotation of for example, Winston Churchill with the person who first related the quotation, whom the user finds in his or her contact list. Further, the user may wish to tag the quotation with the user's file on Winston Churchill himself, as well as the date and time the user first heard it, the date of the quote, the restaurant and its address where the user heard it, the domains of knowledge to which it belongs (history, leadership, etc.), as well as related quotations, and a data model of the history of World War II made from the present invention.

Embodiments of the present invention also have application in assisting users with disabilities as an accessibility aid. In an embodiment, the ability of the system to link to audio representations of tags presents users with visual impairments with a means to construct their own associative linking systems. A text-to-speech system could then provide the user with an audio representation of browsing the associative system, thereby helping to jog the user's memory, and/or reinforce relationships in the information matrix that may be key to learning or understanding a given concept.

As shown in the comparison between a conventional OS File System architecture (FIG. 8A) and that of an embodiment of the present invention (FIG. 8B), among user applications on traditional operating systems on traditional PCs and other devices (801), it is rare for one application, such as a contact management application (802) to exchange data with others (804, 806). Some applications, such as Microsoft Outlook or Palm Desktop, will combine multiple capabilities (such as calendar, address book, notes, tasks and/or email) into a single package. This some-in-one approach has given the designers of such packages the opportunity to make use of some data exchange that users find quite useful. A desired email address, for example, may be more quickly found and selected from a short list of email address, when the user beings typing the recipient's first name in the To field when composing an email. The application, meanwhile, is simply showing the results from among the user's contact list. Apple Computer, Inc., in its OS X operating system in use on its iPhone, iPad, laptop and desktop computer systems, has begun a similar limited implementation of data sharing between it's own suite of applications that come with each system; its Address Book application (called "Contacts" on the iPhone and iPad), for example, offers similar cross-functionality with Mail, its email client. Such features may be employed in systems of various embodiments of the present invention.

Those skilled in the art will appreciate that numerous modifications and variations may be made to the above disclosed embodiments without departing from the spirit and scope of the present invention.

What is claimed is:
1. An information organizing system comprising:
a computer database comprising a plurality of metadata boathouses, each of said metadata boathouses comprising a core, and at least one pointer to another metadata boathouse, each said core comprising either an information nugget stored within a non-transitory computer-readable medium, or a pointer to an information nugget stored within said computer-readable medium;
wherein each given metadata boathouse also contains pointers to each metadata boathouse that contains a pointer to said given metadata boathouse;
an associative tagging graphical user interface facilitating user selection of a first information nugget stored within a non-transitory computer-readable medium;
wherein said associative tagging graphical user interface comprises a first plurality of user-selectable association tags, each of which represents a user-selectable metadata boathouse within said database, wherein each association tag selected by a user symbolizes a said user's association of said information nugget with said association tag;
wherein said associative tagging graphical user interface acts to facilitate user selection of a first set of tags comprising at least one tag, from said user-selectable tags, wherein said first set of tags comprise tags not previously associated with said information nugget in said database prior to said user selection;
link data transforming means acting to transform link data within the metadata boathouse corresponding to said first information nugget, and acting to transform link data within each metadata boathouse corresponding to each tag in said first set of tags selected by a user within said associative tagging graphical user interface; and
induction means responsive to said user selecting said at least one user selectable tag, said induction means acting to create one new metadata boathouse and inducting said new metadata boathouse into said database as a result of said user selecting said first set of tags, if no metadata boathouse within said database was previously associated with said first information nugget prior to said user selection of said first set of tags;
wherein said associative tagging interface and said database and said data transforming means and said induction means function together to improve the usability of a computer by facilitating a user retrieving a file through remembered associations even if the name of said file has been forgotten.

2. The information organizing system of claim 1, further comprising:
means for displaying a second plurality of user-selectable tags, each tag of which represents a user-selectable metadata boathouse;
second selection means facilitating use selection of at least one of said second plurality of user-selectable tags;
means responsive to said second selection means, for displaying a third plurality of user-selectable tags, each corresponding to a metadata boathouse whose core either contains or points to an information nugget stored in non-transitory computer-readable media, said third plurality of tags symbolizing information nuggets associated with each of said at least one of said second plurality of tags;
third selection means for facilitating user selection of one of said third plurality of user-selectable tags;
means responsive to said third selection means, for retrieving from a non-transitory computer-readable medium at least one information nugget corresponding to said one of said third plurality of user-selected tags.

3. The information organizing system of claim 2, further comprising:

association editing means responsive to said second selection means, for performing an altering operation such that said second plurality of user-selectable symbols is different after said altering operation, such that a different set of metadata boathouses is pointed to by said second plurality of symbols after said altering operation, but wherein no contents of said metadata boathouses other than the pointers to said second plurality of user-selectable tags are changed by said altering operation.

4. The information organizing system of claim 2, further comprising:

means responsive to said second selection means, for performing an altering operation such that said third plurality of user-selectable tags is different after said altering operation, such that said third plurality of user-selectable tags corresponds to a different set of information nuggets after said altering operation, but wherein no contents of said information nuggets are changed by said altering operation.

5. The information organizing system of claim 1, further comprising:

navigation means comprising a 3-dimensional interface based on a displayed graphical user interface, said navigation means facilitating user selection of one of a plurality of graphically displayed icons, each of which is located at a different position within said 3-dimensional interface, and each of which is associated with only one metadata boathouse;

icon selection means facilitating user selection of at least on of said graphically displayed icons;

information nugget retrieval means responsive to said icon selection means, operative to retrieve from a non-transitory computer-readable medium at least one information nugget pointed to by the at least one metadata boathouse symbolized by said at least on selected icon; and information display means, operative to display said at least one retrieved information nugget subsequent to said at least on information nugget being retrieved by said information retrieval means;

wherein said database and said navigation means and said icon selection means and said information nugget retrieval means and said information display means function together to improve the functioning of a computer by allowing a user to browse and retrieve files or other information nuggets that have been stored through association with different positions in said 3-dimensional interface.

\* \* \* \* \*